(12) United States Patent
Wang

(10) Patent No.: US 10,275,948 B2
(45) Date of Patent: Apr. 30, 2019

(54) METHOD AND SYSTEM FOR REFILLING A PARKING METER

(71) Applicant: Kevin Sunlin Wang, Flushing, NY (US)

(72) Inventor: Kevin Sunlin Wang, Flushing, NY (US)

(73) Assignee: OPERR TECHNOLOGIES, INC., Flushing, NY (US)

(*) Notice: Subject to any disclaimer, the term of this patent is extended or adjusted under 35 U.S.C. 154(b) by 0 days.

(21) Appl. No.: 15/953,053

(22) Filed: Apr. 13, 2018

(65) Prior Publication Data

US 2018/0232958 A1 Aug. 16, 2018

Related U.S. Application Data

(63) Continuation-in-part of application No. 15/645,079, filed on Jul. 10, 2017, now Pat. No. 9,972,201, which is a continuation-in-part of application No. 14/859,274, filed on Sep. 19, 2015, now Pat. No. 9,704,392, which is a continuation-in-part of
(Continued)

(51) Int. Cl.
*G08G 1/14* (2006.01)
*G06Q 20/10* (2012.01)
*G07B 15/02* (2011.01)
*G06Q 20/32* (2012.01)
*G06Q 20/42* (2012.01)
(Continued)

(52) U.S. Cl.
CPC ........... *G07B 15/02* (2013.01); *G06Q 20/102* (2013.01); *G06Q 20/127* (2013.01); *G06Q 20/325* (2013.01); *G06Q 20/42* (2013.01); *G07F 17/24* (2013.01); *G08G 1/146* (2013.01); *G08G 1/147* (2013.01)

(58) Field of Classification Search
CPC ........ G07F 17/42; G08G 1/142; G08G 1/145; G08G 1/017; G08G 1/148; G08G 1/147; G08G 1/146; G07B 15/02; G06Q 20/325; G06Q 20/42; G06Q 20/127; G06Q 20/102
See application file for complete search history.

(56) References Cited

U.S. PATENT DOCUMENTS 9,704,392 B2* 7/2017 Wang .................... G08G 1/0112
9,972,201 B2* 5/2018 Wang .................... G08G 1/0112
(Continued)

*Primary Examiner* — Hoi C Lau
(74) *Attorney, Agent, or Firm* — Monte, Wang & Associates, PLLC

(57) ABSTRACT

A method and system for remotely seeking assistance to timely refill an expiring parking meter and generating notifications thereof. Data indicative of a vehicle being parked in a parking space and parking meter time limit information are received for a parking meter associated with the parking space. An approaching expiration of the parking meter time limit is detected and sent to the first user. The first user may then transmit a request to additional users in the area for assistance with refilling the parking meter. Upon acceptance of the request by a second user, the first user is notified. An escrow account is established for the first user to deposit payment for the refilling, and notification of the deposit is sent to the second user. Upon completion, the second user transmits proof of the refilling and the deposit payment is transferred from the escrow account to the second user.

20 Claims, 27 Drawing Sheets

Related U.S. Application Data application No. 15/617,881, filed on Jun. 8, 2017, which is a continuation-in-part of application No. 14/859,274, filed on Sep. 19, 2015, now Pat. No. 9,704,392.

(60) Provisional application No. 62/150,118, filed on Apr. 20, 2015, provisional application No. 62/104,510, filed on Jan. 16, 2015, provisional application No. 62/092,100, filed on Dec. 15, 2014, provisional application No. 62/086,560, filed on Dec. 2, 2014, provisional application No. 62/210,701, filed on Aug. 27, 2015.

(51) Int. Cl.
*G07F 17/24* (2006.01)
*G06Q 20/12* (2012.01)

(56) References Cited

U.S. PATENT DOCUMENTS

| | | | | |
|---|---|---|---|---|
| 2003/0010821 | A1* | 1/2003 | Silberberg | G06Q 20/127 235/382 |
| 2004/0035643 | A1* | 2/2004 | Dev | A47F 10/06 186/36 |
| 2005/0270178 | A1* | 12/2005 | Ioli | G06Q 20/40 340/932.2 |
| 2007/0136128 | A1* | 6/2007 | Janacek | G07B 15/02 705/13 |
| 2010/0090865 | A1* | 4/2010 | Dasgupta | G08G 1/14 340/932.2 |
| 2010/0205053 | A1* | 8/2010 | Shuster | G06Q 20/102 705/14.17 |
| 2016/0012726 | A1* | 1/2016 | Wang | G08G 1/0112 340/932.2 |
| 2016/0071172 | A1* | 3/2016 | Shangguan | G06Q 30/0284 705/13 |
| 2017/0148230 | A1* | 5/2017 | Richard | G01S 13/86 |
| 2017/0178414 | A1* | 6/2017 | Neubecker | G06Q 20/3255 |
| 2017/0309170 | A1* | 10/2017 | Wang | G08G 1/0112 |
| 2018/0018618 | A1* | 1/2018 | Groseclose | G06Q 10/08 |
| 2018/0232958 | A1* | 8/2018 | Wang | G07B 15/02 |
| 2018/0315313 | A1* | 11/2018 | Klochikhin | G08G 1/144 |
| 2018/0357900 | A1* | 12/2018 | Wang | G08G 1/144 |

* cited by examiner

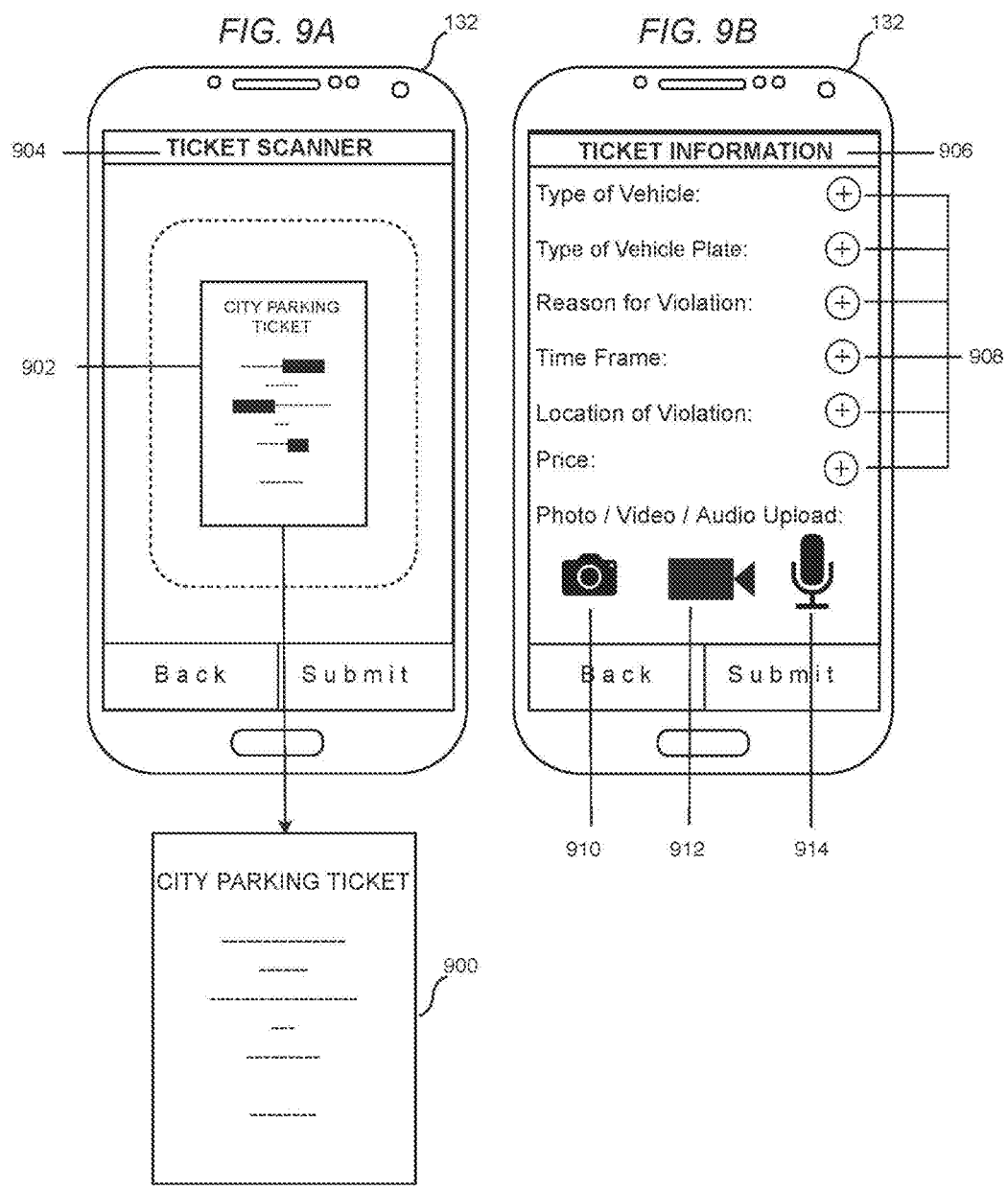

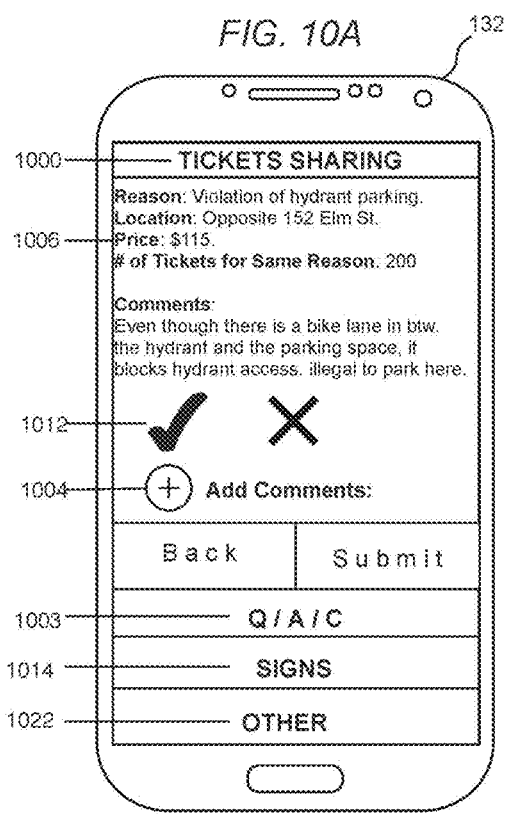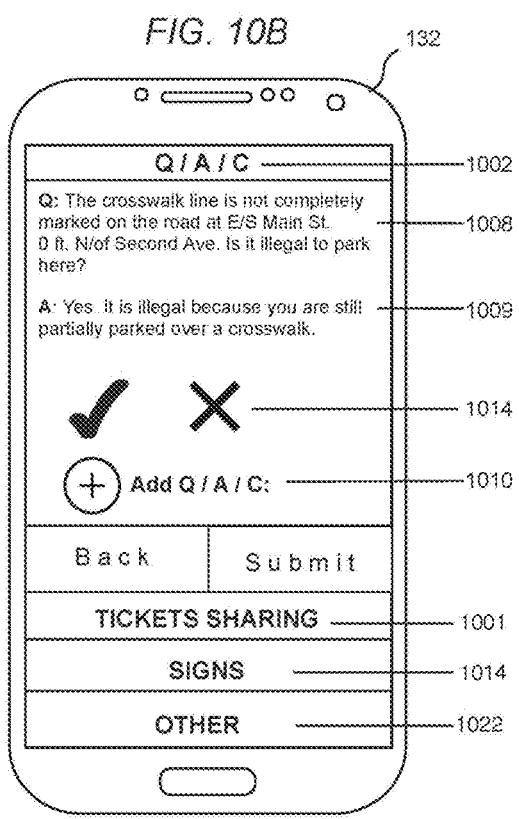

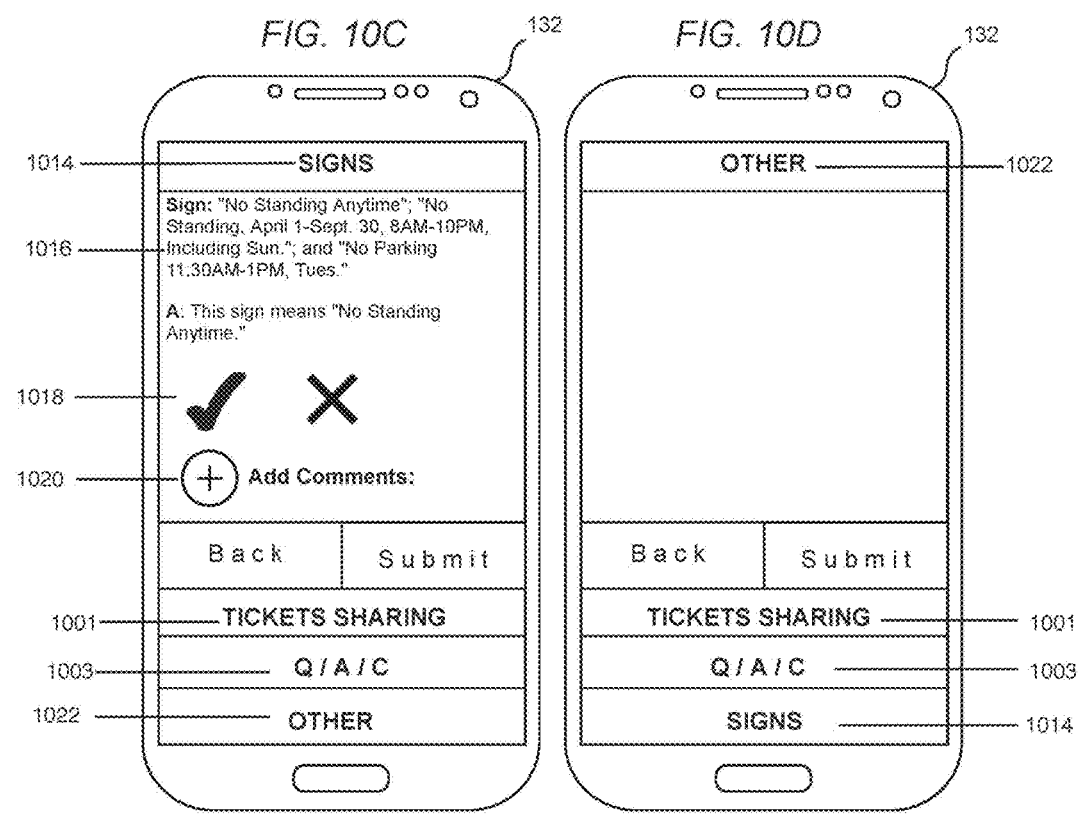

METHOD AND SYSTEM FOR REFILLING A PARKING METER

CROSS-REFERENCE TO RELATED APPLICATIONS

This application is a continuation-in-part of application Ser. No. 15/645,079, filed on Jul. 10, 2017, which is a continuation of application Ser. No. 14/859,274, filed on Sep. 19, 2015, now U.S. Pat. No. 9,704,392, issued on Jul. 11, 2018, and this application is a continuation-in-part of co-pending U.S. patent application Ser. No. 15/617,881, filed on Jun. 8, 2017, which is a continuation-in-part of U.S. patent application Ser. No. 14/859,274, filed on Sep. 19, 2015, now U.S. Pat. No. 9,704,392, issued on Jul. 11, 2018, each of which claim the benefit of provisional application Ser. No. 62/086,560, filed on Dec. 2, 2014, provisional application Ser. No. 62/092,100, filed on Dec. 15, 2014, provisional application Ser. No. 62/104,510, filed on Jan. 16, 2015, provisional application Ser. No. 62/150,118, filed on Apr. 20, 2015, and provisional application Ser. No. 62/210,701, filed on Aug. 27, 2015, the disclosures of which are incorporated by reference herein in their entireties.

BACKGROUND OF THE INVENTION

The present disclosure relates to a method and system for legal parking and, more specifically, to a method and system for remotely seeking assistance to timely refill an expiring parking meter and/or to request assistance in finding legal parking spaces.

DISCUSSION OF THE RELATED ART

Because public parking is generally cheaper than private or commercial parking, many drivers prefer to look for public and/or on-street parking. However, parking goes beyond merely finding an unoccupied space, and includes finding a legal unoccupied space. Therefore, to guide a user to a parking space or location, part of the process may involve understanding which spaces or locations are legal or illegal and when for certain drivers or vehicles.

Numerous local parking ordinances and rules exist that apply to parking, and +frequently regulate where and for how long a vehicle may be parked. A driver who parks a vehicle in a manner that is not permitted under such ordinances and rules may be described as having committed a parking violation. When a law enforcement officer such as a police officer or other traffic enforcement officer finds a vehicle parked in an unpermitted manner, a ticket or citation for a parking violation may be issued. Tickets issued for parking violations may be difficult to contest successfully and may carry a significant monetary penalty or penalty points toward a license. These penalties can result in an increase in the cost of vehicle insurance or even suspension or revocation of a driver license.

Additionally, improperly parked vehicles can impede the flow of traffic, interfere with the operation of public transportation and sanitation services, and block emergency and essential services from being effectively delivered. Accordingly, it is in the public interest to increase adherence to parking rules and ordinances. Roadway congestion and lack of parking spaces, combined with the inherent difficulty in knowing where to look for an open space and the continuing increase in the number of vehicles on the road further challenge a driver's ability to find appropriate legal parking in a timely manner.

Parking rules, regulations, laws, citation codes, etc. (hereinafter, "RRLC") can be very complex, especially in large cities where there may be many reasons for restricting where drivers can park as well as a high demand for parking spaces with many vehicles. Attempts to centralize all legal parking related data seem to be held back by rules that constantly undergo changes, revisions, etc., by those who make and enforce them. Furthermore, they are sometimes enforced by law enforcement irregularly many times, parking rules may be clear individually, but might not be clear enough when multiple rules overlap or contradict each other in real parking situations.

Due to a lack of understanding or confusion about the parking rules and signs at specific locations, it is common for drivers to commit parking violations when parking in unoccupied spaces, even when they have no intention to violate the rules. In such cases, drivers simply cannot understand or might not have the time to understand all the rules, and which, if any, apply to them. Drivers would be well served if they could see information (e.g., parking rules) that only applied to them as well as to potentially available parking spaces, with unrelated information and illegal parking spaces precluded. Such functionality would enhance understanding and adherence to parking rules through simplified delivery of information.

Also, legal parking locations often utilize parking meters to collect fees for parking in those spaces for certain time durations on certain days. These meters generally come in two main types, including multi-space parking meters and/or single-space parking meters. Conventionally, the parking meter is operated by inserting payment (e.g., coins, credit cards, chip cards, electronic purse cards, etc.) directly into the parking meter, which then displays and counts the amount of the purchase in increments, each of which corresponds to the allowed parking time period. More recently, however, parking meters have been equipped for wireless communication with a parking management system. One such system includes a computerized parking management system in wireless communication with at least one single-space parking meter so as to communicate parking data therebetween. The system also includes a mobile citation unit in communication with the parking management system to communicate parking enforcement data via the wireless network.

However, many parking meters today, either single-space or multi-space, are not equipped with such wireless communication for enabling notification of meter expiration, or for enabling replenishment thereof. Thus, the user must return to the parked vehicle, often a considerable distance away from the user's location, in order to refill or replenish the funds in the meter. This is often impractical, inconvenient or sometimes not possible, and the end result is accepting a parking citation, which can be rather costly. There is therefore a need for a system and method for remotely seeking assistance to have an expiring parking meter refilled.

As discussed herein, the method and system of the inventive disclosure overcomes many of the limitations of prior art. The method and system disclosed provides a unique combination of attributes for assisting a user in finding potentially available legal parking, including a database sorted to deliver applicable and targeted information to users that is dynamically updated based on changes from data sources. In addition, changes can be incorporated from a user engagement panel, where users can rate and discuss legal parking related data and information and communicate in order to request legal parking spaces and/or request assistance with refilling an expiring parking meter. Other objects, features, and characteristics of the inventive disclosure, as well as the methods of operation and functions of the related structural elements, and the combination of parts and economies of development and manufacture, will become more apparent upon consideration of the detailed description below with reference to the accompanying drawings, all of which form a part of this specification.

SUMMARY OF THE INVENTION

The summary is not intended to identify or point to essential features or limit the scope of the subject matter claimed herein. The inventive disclosure relates generally to a system for identifying potentially available legal parking, and more specifically, to establish a system and method for remotely seeking assistance to timely refill an expiring parking meter and/or to request assistance in finding legal parking spaces, with at least the following objectives:

To establish a system in which data can be categorized by data type, which corresponds to at least a user type, so that a user receives data that is relevant to at least the user's user type and applicable to at least the user's location to not overload the user with excessive notifications.

To establish a system to identify one or more potentially available legal parking locations for the user by precluding one or more illegal parking locations from identification as the one or more potentially available legal parking locations based on one or more parking prohibitions directly applicable or applicable by inference to the user.

To establish a system where users can contribute one or more suggestions relating to finding legal parking, one or more recommendations relating to avoiding parking violations, one or more real-time updates relating to a street cleaning start time, one or more real-time updates relating to a street cleaning end time, one or more photos of parking signs, and one or more redesigns of parking signs relating to plain language meaning, content clarification, or language translation to help other users understand parking rules and regulations.

To establish a computing system in which legal parking related data comprises historical legal parking related data correlated to real time legal parking related data dynamically to keep one or more databases up to date.

To establish a system where data submitted by users can be used to update, correct, and supplement the one or more databases dynamically, where users can be given a monetary or non-monetary reward as consideration for submitting data.

To establish a route plan for a user to guide the user to one or more locations which have more potentially available legal parking, as well as notify a user of one or more locations with no potentially available legal parking.

To establish a system in which users can seek assistance from another user to refill a parking meter, and in which another user can offer to refill another user's parking meter.

To establish a system which detects the geo-location of other users that are within a certain distance of the user's parked vehicle or the parking meter associated with the location of the parked vehicle in order to send meter refill or replenishment requests to such other users most likely to accept the user's request.

An exemplary embodiment of the inventive disclosure provides a computer-implemented method for seeking assistance with timely refilling a parking meter comprising receiving data indicating that a vehicle of a first user is parked in a parking space associated with a parking meter, storing the data in a database, receiving parking meter time limit information for the parking meter, identifying an expiration time at which the parking meter time limit expires, notifying the first user of the expiration time of the parking meter during a predetermined time period prior to the expiration time, transmitting a request from the first user to one or more additional users for assistance with refilling the parking meter, identifying an acceptance of the request by a second user selected from the one or more additional users, and transmitting the acceptance of the request from the second user to the first user.

Another exemplary embodiment of the inventive disclosure provides a computer-implemented method for seeking assistance with timely refilling a parking meter comprising receiving data indicating that a vehicle of a first user is parked in a parking space associated with a parking meter, storing the data in a database, wherein the data includes a location of the parking meter associated with the parking space, receiving parking meter time limit information for the parking meter, identifying an expiration time at which the parking meter time limit expires, determining whether the parking meter associated with the parking space requires refilling at the expiration time, in response to determining that the parking meter associated with the parking space requires refilling at the expiration time, notifying the first user of the expiration time of the parking meter during a predetermined time period prior to the expiration time, transmitting a request from the first user to one or more additional users for assistance with refilling the parking meter, identifying an acceptance of the request by a second user selected from the one or more additional users, and transmitting the acceptance of the request from the second user to the first user.

Yet another exemplary embodiment of the inventive disclosure provides a computer-implemented system for seeking assistance with timely refilling a parking meter comprising at least one server, a database for dynamically storing parking meter data, a plurality of remote computing devices associated with a plurality of users in connection with a communication network, at least one non-transitory computer-readable storage medium for storing computer-readable instructions, wherein the at least one non-transitory computer-readable storage medium is in connection with the communication network and resides on the at least one server, and at least one processor for executing the computer-readable instructions to receive data indicative of a vehicle associated with a first user being parked in a parking space, store the data associated with the parking space in a database, receive parking meter time limit information for a parking meter associated with the parking space, identify an expiration time at which the parking meter time limit expires, determine whether the parking meter associated with the parking space requires refilling at the expiration time, in response to determining that the parking meter associated with the parking space requires refilling at the expiration time, notify the first user of the expiration time of the parking meter during a predetermined time period prior to the expiration time, transmit a request from the first user to one or more additional users for assistance with refilling the parking meter, identify an acceptance of the request by a second user selected from the one or more additional users, transmit the acceptance of the request from the second user to the first user, establish an escrow account for the user to deposit payment for the refilling of the parking meter, notify the second user of the deposit payment in the escrow account, receive information from the second user indicative of proof of the refilling of the parking meter, and transmit the deposit payment from the escrow account to the second user.

BRIEF DESCRIPTION OF THE DRAWINGS

A further understanding of the inventive disclosure can be obtained by reference to a preferred embodiment set forth in the illustrations of the accompanying drawings. The drawings are not intended to limit the scope of this invention, which is set forth with particularity in the claims as appended or as subsequently amended, but merely to clarify and exemplify the invention. Accordingly, a more complete appreciation of the inventive disclosure and many of the attendant aspects thereof may be readily obtained as the same becomes better understood by reference to the detailed description when considered in conjunction with the accompanying drawings, where:

FIGS. 9A-9B are schematic diagrams of a remote computing device further illustrating a user's interaction with the computing system using the remote computing device when reporting a parking ticket according to an exemplary embodiment of the inventive disclosure;

FIGS. 10A-10B are schematic diagrams of the remote computing device shown in FIGS. 9A-9B further illustrating a user interface of the user engagement panel showing a "Tickets Sharing" panel and a "Q/A/C" (i.e., questions, answers, comments) panel based on a specific location according to an exemplary embodiment of the inventive disclosure;

FIGS. 10C-10D are schematic diagrams of the remote computing device shown in FIGS. 9A-9B further illustrating a user interface of the user engagement panel showing a "Signs" panel and "Other" panel according to an exemplary embodiment of the inventive disclosure;

DETAILED DESCRIPTION OF THE INVENTION

Figure 1:
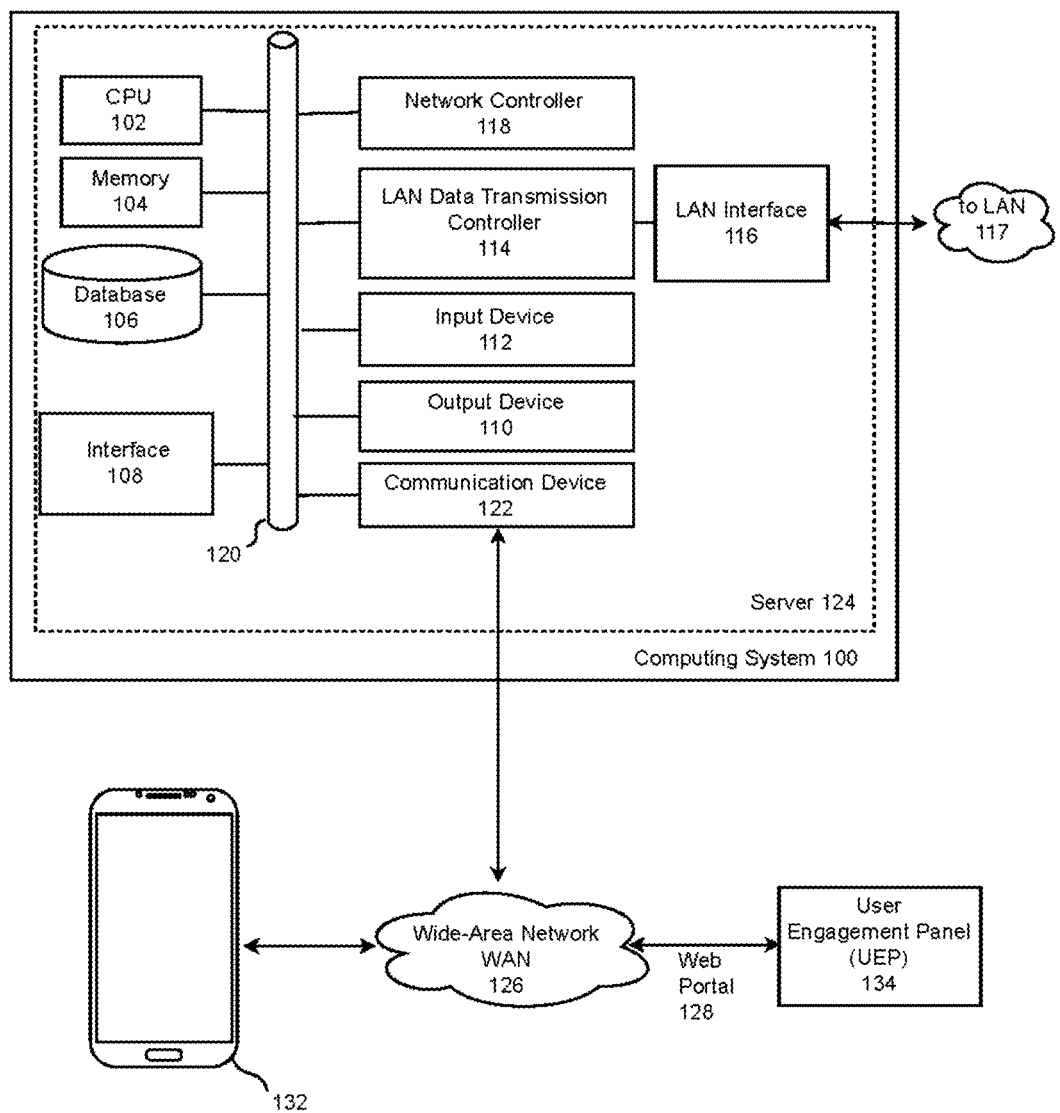
FIG. 1 is a schematic diagram illustrating a system for identifying potential legal parking and/or to request assistance with finding legal parking or refilling an expiring parking meter in accordance with exemplary embodiments of the inventive disclosure.

The present disclosure is not intended to be limited to the specific terminology so selected, and it is to be understood that each specific element includes all technical equivalents which operate in a similar manner. As required, a detailed illustrative embodiment of the inventive disclosure is disclosed herein. However, techniques, methods, systems, compositions and operating structures in accordance with the inventive disclosure may be embodied in a wide variety of sizes, shapes, forms and modes, some of which may be quite different from those in the disclosed embodiment. Consequently, the specific structural, functional and step-by-step details disclosed herein are merely representative, yet in that regard, they are deemed to afford the best embodiment for purposes of disclosure and to provide a basis for the claims herein which define the scope of the inventive disclosure.

In the following detailed description, specific embodiments that may be practiced are shown by way of illustration and explanation. The embodiments are described in sufficient detail to enable those skilled in the art to practice the embodiments, and it is to be understood that the logical, mechanical, and other changes may be made without departing from the scope of the embodiments. The following detailed description is therefore not to be taken in a limiting sense. In describing exemplary embodiments of the inventive disclosure illustrated in the drawings, specific terminology is employed for sake of clarity. However, the present disclosure is not intended to be limited to the specific terminology so selected, and it is to be understood that each specific element includes all technical equivalents which operate in a similar manner.

The term "driver(s)" herein may be used interchangeably with "user(s)," which is intended to encompass driver(s) and include those individuals who might not be drivers but, nevertheless, receive assistance or provide assistance by using the inventive disclosure. In addition, "user" is also intended to cover a wide array of subjects. A "user" may generally encompass private individuals and entities through its one or more representatives interested in finding potentially available legal parking; in essence, the word "user" is intended to describe any interested individual or interested individuals affiliated with entities registered with the inventive disclosure, not limited only to private individuals, such as artificial intelligence or self-driving vehicles. The terms "parking citation(s)," "parking ticket(s)," or "parking violation citation(s)" may be used interchangeably, and their meanings may be the same (e.g., ticket(s) received by a driver for a parking violation).

An exemplary embodiment of the inventive disclosure, as described herein, is not limited to applications involving conventional computer programs or programmable apparatuses that run them. It is contemplated, for example, that embodiments of the invention could include an optical computer, quantum computer, analog computer, or the like. Each element in the flowchart illustrations herein may depict a step, or group of steps, of a computer-implemented method. Further, each step may contain one or more sub-steps. For purposes of illustration only, these steps (as well as any and all other steps identified and described above) are presented in a particular order. However, it will be understood that an embodiment of the inventive disclosure can contain an alternate order of the steps adapted to a particular application of a technique disclosed herein.

According to an exemplary embodiment of the inventive disclosure, multiple "data types" corresponding to multiple "user types" may be disclosed herein. Though the inventive disclosure might be contemplated for use with numerous types of data corresponding to numerous types of users, it is also contemplated that the inventive disclosure be used to process one type of data for one type of user (e.g., only processing taxi related data and notifying taxi drivers about legal parking for taxis, or only processing truck data and notifying truck drivers about legal parking for trucks). In addition, it is also contemplated, and falls within the scope of the inventive disclosure, that data types and/or user types might be combined or separated in any conceivable manner. In another example, truck and taxi related data might be processed to alert truck and taxi drivers about legal parking for trucks and taxis, respectively. It will be obvious to one of ordinary skill in the art that embodiments of the inventive disclosure described herein are intended to be exemplary.

All such variations and modifications are intended to fall within the scope of this disclosure. The depiction and description of steps in any particular order is not intended to exclude embodiments having the steps in a different order, unless required by a particular application, explicitly stated, or otherwise clear from the context. The elements depicted in flowchart illustrations and block diagrams throughout the figures imply logical boundaries between the elements. However, according to software or hardware engineering practices, the elements depicted and the functions thereof may be implemented as parts of a monolithic software structure, as standalone software modules, or as modules that employ external routines, code(s), services, and so forth, or any combination of these. All such implementations are within the scope of the present disclosure.

In the description of the figures below, it is understood that the details described above may be combined with or used in place of similar attributes described below and that the figures are used only to illustrate particular exemplary embodiments of the inventive disclosure. It is to be understood, that for the purpose of providing simplified figures that are easy to understand, many of the details above have been omitted from the figures. However, it is contemplated that the details described above may be incorporated into the approach of the description below in any feasible manner. Exemplary embodiments described herein are illustrative, and many variations can be introduced without departing from the spirit of the disclosure. For example, elements and/or features of different exemplary embodiments may be combined with each other and/or substituted for each other within the scope of this disclosure. In view of the foregoing, it may now be appreciated that elements of the schematic diagrams and flowchart illustrations support combinations of elements for performing the specified functions, combinations of steps for performing the specified functions, program instruction media for performing the specified functions, and so on, whether the steps are performed automatically or not.

An exemplary embodiment of the inventive disclosure comprises to the implementation of a system and method through a combination of hardware and software that operates on a portable computing device, which further comprises various pre-programmed features combined and integrated with components including but not limited to one or more servers, databases, mobile end applications, web portals, network settings, etc. With the support of these components, information may be provided through user interfaces, such as a website, an application, or an in-vehicle navigation system. In addition, there may be one or more servers that may be in a distributed structure with support from data centers that may be located anywhere around the world. These implementations may be communicatively linked and cross-platformed with the electronic map display, indicators which convey legal parking related information, profile, setting information, etc., so that a user on a computing device may be provided with legal parking related data relevant to a specific location.

It will be appreciated that computer program instructions may include computer executable code. A variety of languages for expressing computer program instructions are possible, including, but not limited to, C, C++, Java, JavaScript, Python, assembly language, Lisp, and so on. Such languages may include assembly languages, hardware description languages, database programming languages, functional programming languages, imperative programming languages, and so on. In some embodiments, computer program instructions can be stored, compiled, or interpreted to run on a computer, a programmable data processing apparatus, a heterogeneous combination of processors or processor architectures, and so on.

In some embodiments, a computer enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more threads. The one or more threads can spawn other threads, which can themselves have assigned priorities associated with them. In some embodiments, a computer can process these threads based on priority or any other order based on instructions provided in the program code.

Unless explicitly stated or otherwise clear from the context, the verbs "execute" and "process" are used interchangeably to indicate execute, process, interpret, compile, assemble, link, load, any and all combinations of the foregoing or the like. Therefore, embodiments that execute or process computer program instructions, computer-executable code, or the like can suitably act upon the instructions or code in any and all of the ways just described.

The invention may be described in the general context of computer-executable instructions, such as program modules, being executed by a computer. Generally, program modules include routines, programs, objects, components, data structures, etc., that perform particular tasks or implement particular data types. The computer program and data may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed hard disk), an optical memory device (e.g., a CD-ROM or DVD), a PC card (e.g., PCMCIA card), or other memory device. The computer program and data may be fixed in any form in a signal that is transmittable to a computer using any of various communication technologies, including, but in no way limited to, analog technologies, digital technologies, optical technologies, wireless technologies, networking technologies, and internetworking technologies. The computer program and data may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system. It is to be appreciated that any of the software components of the inventive disclosure may, if desired, be implemented in ROM (read-only memory) form.

An exemplary embodiment of the inventive disclosure may be used by users of different user types, where "users" can be members of the general public and/or computer systems which include but are not limited to: professionals, civilians, vehicles, websites, robots, in-vehicle systems, global positioning satellites (GPS), and/or other systems. It is also intended that the inventive disclosure may be used not only within an application of a computing device 132, which may include smartphones, tablet computers, laptop computers, in-dash vehicle systems, etc., but may also be enlarged to encompass other systems or services which may process, utilize, and display the legal parking related data, for example, contributions to the field of information services for online mapping companies and GPS manufacturers, smart phone or mobile device manufacturers, wireless service providers, application creators and developers, and mobile operating system developers and distributors, automated vehicle systems such as self-driving vehicles, etc.

Referring first to FIG. 1, depicted is a schematic diagram illustrating a system for identifying potentially legal parking in accordance with an exemplary embodiment of the inventive disclosure. System components in communication with computing system 100 may include computing device 132, WAN 126, web portals 128, and user engagement panel 134. A combination of hardware and software preferably operates on an application of computing device 132 and computing system 100, such as a computer, generally with one or more connections to wireless wide-area network 126 (WAN) (e.g., the Internet). Computing system 100 may include, for example, server 124 comprising one or more of the following: central processing unit (CPU) 102, memory unit 104, database 106, interface 108, output device 110, input device 112, (e.g., a keyboard, mouse, scanner, etc.), local area network (LAN) data transmission controller 114, LAN interface 116 in communication with LAN 117, network controller 118, which can be connected to PSTN (public switched telephone network), and internal bus 120. As shown, the system may be connected to a data storage device, for example, a hard disk comprising database 106 via a link. Computing system 100 can include one or more servers configured the same or similar to server 124 shown in this depiction, or one or more servers configured in a different manner, which may include different hardware or software. For example, computing system 100 may comprise multiple servers hosted in multiple spaces such as data centers or server farms.

Computing system 100 may be configured to communicate with a network service coordinated through communication device 122. Communication device 122 may include any approach for communicating data over one or more networks or to one or more peripheral devices. Communication device 122 may include, but is not limited to, circuitry and control systems for providing wireless connections, wired connections, cellular connections, data port connections, Bluetooth connections, or any combination thereof and the device or means may include devices enabled to communicate using such communications approaches. One of ordinary skill in the art would appreciate that there are numerous approaches for communications that may be utilized.

Server 124 and computing system 100 may also be communicatively linked, through communication device 122 and WAN 126, to peripheral devices such as a computing device 132, which may be a device allowing a user to interact with the computing system 100. Through computing device 132 and web portal 128, the user can access a remotely or locally provided user engagement panel 134. Computing device 132 may be a handheld mobile device, an in-vehicle navigation system, or another device or system such as a laptop computer, desktop computer, tablet, etc. User engagement panel 134 according to an embodiment of the invention may be a discussion board that can be accessed through an interactive display on computing device 132, which allows users to hold discussions relating to parking, and which might include recommendations for finding legal parking, suggestions for disputing tickets, a way for users to assist each other with meter fees, or refilling expiring parking meters, etc.

Figure 2:
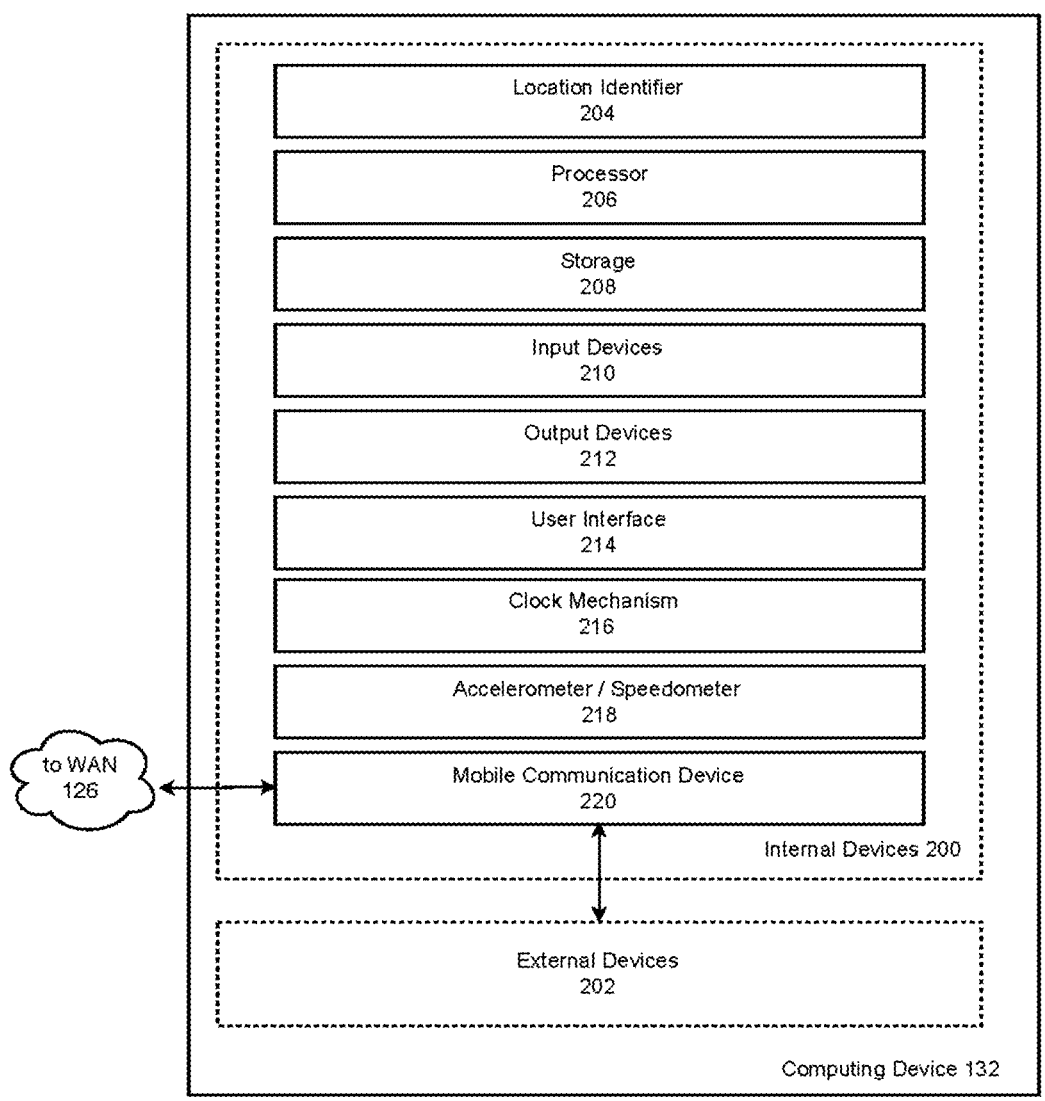
FIG. 2 is a schematic diagram illustrating the composition of a computing device for enabling a user to interact with the computing system in accordance with an exemplary embodiment of the inventive disclosure.

Turning to FIG. 2, shown is a schematic diagram illustrating the configuration of computing device 132 for enabling a user to interface with computing system 100 and for reporting parking violations, for reporting other information relating to potentially available legal parking locations, as well as receiving a notification with legal parking related data, all in accordance with an exemplary embodiment of the inventive disclosure. Remote computing device 132 may be in communication with all its components, tangible or intangible, and may incorporate internal devices 200 and external devices 202. Remote computing device 132 may also include and utilize mobile communication device 220 for receiving voice, text, and data for connecting to the computing system 100 such as over a WAN 126. A location identifier 204, such as a GPS receiver, may also be included in remote computing device 132 for identification of a present location. The location identifier 204 may determine the location of a remote computing device 132 in different ways, for example, through receiving location-based resources. One of ordinary skill in the art would appreciate that there are numerous approaches for providing location identification and location-based services. In one example, location identifier 204 can be instantiated through processing of received GPS data from location-based or geo-aware resources of computing device 132. In addition, location identifier 204 can also receive GPS data from other applications or programs that operate on computing device 132. For example, computing device 132 may communicate with one or more other applications using one or more application program interfaces (APIs). The application can use the location information to cause a user interface component to configure a user interface framework based on the location information.

Computing device 132 may also include one or more of processor 206, storage 208, input devices 210, output devices 212, user interface 214, clock mechanism 216 and/or accelerator/speedometer 218. Processor 206 may be used for executing instructions, software, or program modules on the computing device 132. Remote computing device 132 may also contain storage 208, such as random-access memory (RAM) or flash storage. Input/output ("I/O") devices 210 may be used to connect computing device 132 to other system implements, especially depending on the available functionalities of computing device 132. For example, an in-vehicle navigation system might not have a camera, while a mobile device may have a built-in camera. In this instance, a mobile device's camera may be used as an input for the in-vehicle navigation system. Other I/O devices 210 may include a scanner, a microphone, a speaker, etc. Remote computing device 132 may also include display 212, which may display a notification or other data to a user received from computing system 100. Display 212 may, for example, be an electronic touchscreen display such as an LCD display, an LED display, or an active-matrix organic light emitting diode (AMOLED) display. Computing device 132 may also utilize internal clock mechanism 216 to determine the time at any given moment during its use. Accelerometer or speedometer 218 may also be in communication with computing device 132, which may be used to measure speed, acceleration, directional changes, etc. Also, user interface 214 may be implemented where content is displayed based on other user selections and preferences.

One or more of these components of remote computing device 132 might be combined to provide user features that are specific to user selections and user locations, and/or real-time conditions to enable a user to receive legal parking related information. These selections can be displayed to the user, and the user can use user interface 214 to interact with information. For instance, user interface 214 can correspond to a program that is downloaded onto a smartphone or other portable computer device such as a tablet computer or personal digital assistant (PDA). A user can download and install the application on remote computing device 132 and register. An exemplary embodiment of the inventive disclosure may utilize pre-programmed features combined based on certain protocols or methods of integration of basic components, such as servers, databases 106, mobile end applications, web portals, network settings, etc., where the applications could be applications written for ANDROID, a mobile platform developed by Google and the Open Handset Alliance, IOS, a mobile platform developed by Apple, Inc., WINDOWS PHONE, a mobile platform developed by Microsoft Corporation, etc.

A possible user interface 214 may include, but is not limited to, a homepage user interface, access to user engagement panel 134, which may be used for one or more users to share ideas about finding legal parking, a summary interface, a location user interface, database 106 access interface, or a combination of any of the features described. One of ordinary skill in the art might appreciate that there are numerous user interfaces that could be utilized or contemplated for use with any appropriate user interface 214. External devices 202 may also be connected to the remote computing device 132 through either a wired or wireless connection, and may be one or more devices that could provide additional or enhanced functionalities to computing device 132, whether it be a mobile device such as a tablet or smartphone or an in-vehicle navigation system or other computing device, etc. Computing system 100 can retrieve a user's information and other data that is stored in database 106. In some implementations, database 106 can be stored remotely and user information can be retrieved from there.

Other integrated devices may include utilization of vehicle equipment, for example cameras, inertial sensor, gyroscope sensor, GPS sensor, and any other applicable equipment, etc. Utilization of this vehicle equipment may be used to obtain comprehensive real-time and historical activity information about the vehicle, for example its direction, speed, orientation and acceleration, etc. in order to issue an applicable and accurate notification to the user. An exemplary embodiment of the inventive disclosure can, for instance, be integrated with in-dash systems to enable full function within a vehicle. This integration is not limited to in-dash systems and may also be integrated in the vehicle by original equipment manufacture or third-party add-on equipment that may be mounted within a vehicle. The inventive disclosure uses direct integration of the disclosed parking space information system into the navigation and GPS in an onboard computer of original equipment manufactured vehicles. In such embodiments, the disclosed architecture can be integrated directly into a vehicle's computer system.

When integrated into an in-dash navigation system, the vehicle's display may be used to show a legal parking related notification in accordance with an exemplary embodiment of the inventive disclosure as described above. The in-dash integrated system embodiment can provide remote updates and communications to the user through an installed legal parking application on the user's computing device 132 to notify the user for example, when the parking time limit is approaching its expiration, impending street cleaning or street cleaning which just ended, or of other legal parking related data. The installed legal parking application can run on computing device 132 and utilize resources which may include microprocessor, memory, GPS, wireless connection and display. The invention may be useful with respect to automated vehicle systems, such as self-driving cars, where data can be integrated in to the vehicle's navigation system and notifications can be sent directly to the vehicle. Though self-driving vehicles do not require drivers, the vehicle itself is still subject to parking violations that may be issued to the owner of the vehicle. Legal parking notifications integrated with the automated vehicle's navigation system may help the owner of an autonomous vehicle to avoid parking violations as the owner may not be present at the time the vehicle is in operation and in need of parking.

An exemplary embodiment of the inventive disclosure may optionally include a geographical information system (GIS) to capture, display, and otherwise analyze data. The GIS may integrate an electronic or digital map, for instance, as a layer (such as GOOGLE MAPS, which is an electronic mapping service provided by Google, a subsidiary of Alphabet Inc., etc.) to be viewed on computing device 132. With this integration, roadways may be displayed from a map database which presents the analyzed data as to the location of potentially available legal parking and route planning to a parking zone with a greater potential of finding legal parking, where the options can be displayed to the user to help plan his/her route accordingly, or see automatically generated suggestions about routes, etc. For example, the user can be given a suggestion of a potential route to a parking zone where there is more available legal parking than in another area. Since parking locations may be occupied by vehicles of non-users and therefore might not be accounted for, the suggested route may direct the user to a parking zone with a greater number of available legal parking identified by registered users. However, a user may have the option to select an alternate route based on additional route criteria. For example, a user may select a parking zone based on distance even though the closer parking zone has less available legal parking. The GIS may integrate different layers, and data points with similar attributes can then be isolated and output as a layer. That output layer could show instances of certain data points that have similar attributes. Then, an inventory of other data points such as meter parking, locations of bus stops, commercial vehicle parking, taxi lanes, bus lanes, bicycle lanes, emergency lanes, locations of parking garages/facilities, street parking locations, parking restrictions, locations of fire hydrants, etc., can be gathered and applied through a GIS and output to the user's computing device 132 and visualized on a base map. This provides a way to usefully sort, access, and send the data to users of computing device 132.

The GIS might include certain hardware, which might be another computing device or secondary device attached to it that enables the GIS to be functional, and software such as algorithms written using executable programming languages to store, analyze, and display geographical data and information. The GIS can be used to process certain data such as parking locations, maps, etc. The GIS might be maintained by a technician, or other qualified personnel, with knowledge of upkeep procedures, especially those concerned with adjusting system functions to what might be required of a GIS.

Figure 3:
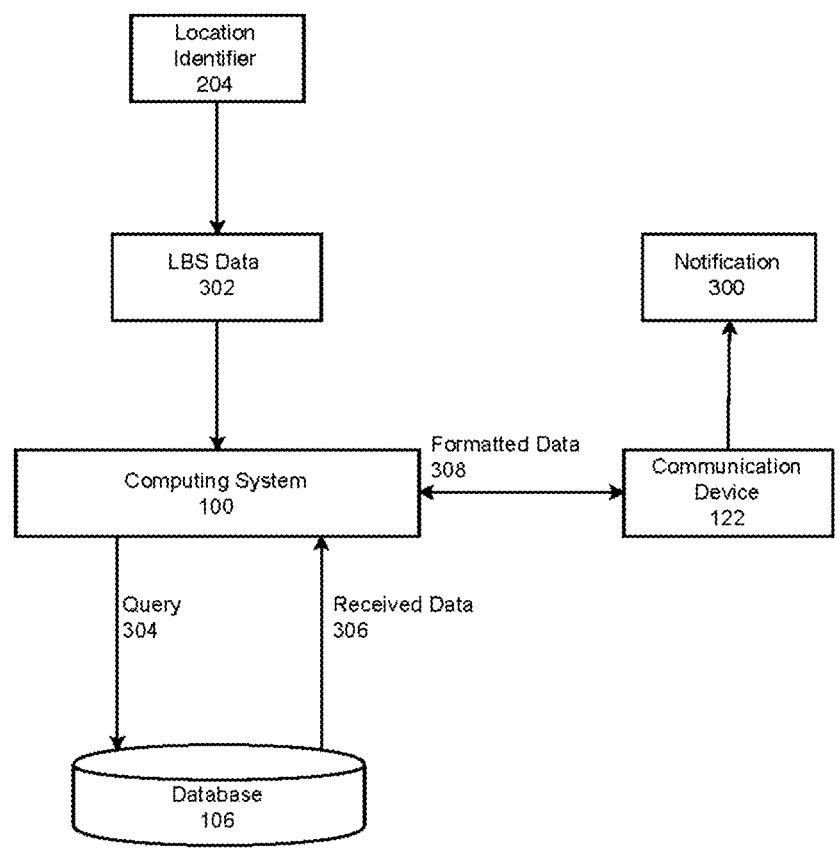
FIG. 3 is a schematic diagram illustrating a system and method for generating a notification in accordance with an exemplary embodiment of the inventive disclosure.

Next, FIG. 3 shows a schematic diagram illustrating a system and method for generating and transmitting a notification relating to the identification of legal parking, illegal parking, areas of available legal parking, and the like, in accordance with an exemplary embodiment of the inventive disclosure. In operation, remote computing device 132 connects to the computing system 100 in order to transmit a notification when relevant. A user may be provided with a visual and/or audio notification. Computing device 132 and/or location identifier 204 send location-based services (LBS) data 302 to computing system 100. When certain conditions are met (e.g., the user shows parking intent or manually requests parking information) computing system 100 can query 304 data in database 106. The computing system 100 might use a user type of the user (e.g., the user drives a Camry with commercial plates), which can be cross referenced with the location of the user (e.g., approximate address, geolocation, etc.) and the time (e.g., time of day, week, month, season, etc.) and identify relevant data for generating a notification, and tailor it to the user's customizable preferences (e.g., how the user wants to be notified, when the user wants to be notified, how many times the user wants to receive a notification, a time the notification(s) is/are issued, a distance to an intended destination, an amount of time before a user reaches an intended destination, a form of the notification(s), a number of times the notification(s) is/are requested, a content of the notification(s), and a location where the notification(s) is/are issued, etc.). Computing system 100 may periodically query 304 certain data sets in database 106 to keep requests current or to look for new or different information in database 106. Alternatively, computing system 100 might access database 106 using specific APIs, by subscription, or by this data being pushed as it is made available. During the process, computing device 132 may connect with internal devices 200 and external devices 202 in order to communicate with computing system 100 to relay data (i.e., time, date, location etc.), receive a notification, and process and display that notification to the user.

In an embodiment, the customizations may not be based on user preferences but may be automated from collected data from the database. The system may use a customization based on a predetermined number or percentage of users selecting a specific preference, or based on reasons, or based on randomization. For example, the system is using 75% as a predetermined percentage of users, so if 90% of users choose to be alerted one time for a specific location, then the system may automatically customize a one-time alert for that location. In another example, a majority of users chose to receive recommendations at a specific location, so the system automates recommendations for users at that location. Thus, customizations may be discretionary and selected by users, or may be automated by the system based on past user data. The received data 306 from database 106 based on query 304 may be formatted at the computing system 100. The formatted data 308 can then be transmitted as notification 300, through communication device 122. To generate notification 300, computing system 100 may query 304 different data sets within database 106 (e.g., any historical citation information currently available; the user's identified location and present time; or any administrative notices or temporary notices applicable to the user type of that user, present location, and present time, etc.). Furthermore, computing system 100 can search for weather related information, where weather patterns or conditions could have an effect on parking rules and regulations.

Notification 300 can be configured to be integrated with an interactive electronic map API or displayed on an electronic screen. Notification 300 that is specific for a commercial vehicle, for instance, might include specifically relevant information for commercial vehicle users in it. The information contained within notification 300 can be based on specific data from the combination of data for commercial vehicles, as notification 300 may be selectively issued based on the user's user type, further based on type of vehicle and type of vehicle plate. A notification may be short, conveying legal parking related data applicable to the location.

Computing system 100 may alert the user to potentially available legal parking locations by notifying the user through email, text message, phone call, phone alert, voice mail etc., automatically at the choice of the user who set this in advance in the settings. Notification 300 to the user can include reasons for the availability or unavailability of parking, such as if the legal parking is currently occupied or not. While referenced as "reasons," one of ordinary skill in the art would appreciate that in practice this phrase could be described in numerous manners, including, but not limited by phrases such as "cause," "explanation," or any other terms. No matter what term is used, the key point is that the term may be used herein to describe that the user is given an explanation as to why parking is unavailable or illegal at a given location. In addition to reasons for legal parking availability, notifications may also provide recommendations for where the user may find available legal parking. For example, if a user is near a location where prohibited parking time limits are about to expire, notification 300 may recommend to the user that parking at that location might become available in a given amount of time. While referenced as "recommendation," one of ordinary skill in the art would appreciate that in practice this phrase could be described in numerous manners, including, but not limited by phrases such as "suggestion," "advice," or any other terms. No matter what term is used, the key point is that the term is herein to describe an alert issued to a user about available legal parking and/or illegal parking in order to secure a legally available parking space while avoiding parking violations.

The system may display a comparison of parking rules applicable at different jurisdictions. The comparison may be displayed in different ways, such as notification 300, through user engagement panel 134, or by any other format. The comparison is made based on the information obtained from the user data provided from the user, such as driver license, driving history, preferences, etc. The system may use not only the driver license itself, but information associated with the driver license, such as the city, town, state, and authorities that issue the parking rules for the driver license jurisdiction, and which parking rules apply in that jurisdiction. For example, the system may compare rules that apply at the current location with the rules of the state that issued the user's driver license. A comparison of the relevant rules is necessary to notify users of the differences between the rules of their current locations and those from where the user's driver license was issued. This allows the user to find potentially available legal parking locations in other jurisdictions, or to plan a route to a specific location with more potentially available legal parking locations. This is important because parking rules may differ in different jurisdictions, for instance, local parking rules in one city may not be the same as another city, which has its own parking rules. It is important to identify which rules apply in which jurisdiction so as to provide efficient and accurate information about potentially available legal parking locations. A user may want to plan parking arrangements in advance before traveling to a specific location. The stored legal parking related data from those locations are summarized, compared, and analyzed to alert the user of potentially available legal parking locations, or of parking violations, based on the different parking rules between the user's original location and the current location determined by the user. The user may provide a specific location and view the potentially available legal parking at that specific location within a predetermined distance from the specific location. Or, the user may check the potentially available legal parking and comparison of parking rules of any location at any time. The user may select to view the potentially available legal parking, as well as the comparison of parking, of a specific address, or more broadly, of a specific town, city, jurisdiction, etc. In another scenario, a user may select and compare the parking rules of multiple other locations, for instance, locations that are not related to the user's current location or to the jurisdiction associated with the user's driver license. The differences may then be displayed on the user's computing device 132.

The system may provide notification 300 automatically, or the user may manually select when and where to receive notification 300. For example, the user may be able to view notification 300 information by pressing a button on the screen of computing device 132 at the location to check for different parking rules. Or, the system may be set to automatically alert the user within a predetermined distance from a determined location. A user may then rate the information on notification 300 in part or in whole and also report notification 300 to the system administrator if the user believes there is inaccurate or false information.

The system preferably records and stores accurate geolocation GPS coordinates (longitude and latitudes) of the user's computing device 132, and notification 300 sent to a user can be customized and localized to the user's location. Since the database 106 stores and analyzes RRLC from different municipalities and/or other authorities, geolocation and applicable RRLC may be matched to send notification 300 according to the user's user type and current location or a location indicated at a user's request. For example, location identifier 204 may transmit the location of computing device 132 to place the user within a particular set of jurisdictions. This function may be useful for a user who drives across local, county, state or country lines and is unfamiliar with the RRLC from different cities, counties, states, countries, etc. Database 106 may have the user's driver license information, as the user may enter and store the information of the driver license with the state or country who issued the driver license when registering a profile. Using the location from where the user's driver license was issued with a user's current location data, computing system 100 may send a notification for different rules or a summary of different parking rules to the user according to the location as it changes. The user may press a button on the display of computing device 132 to view the summary of the different parking rules when comparing the location of the entity that issued the user's driver license with the user's current location.

The system may also be integrated with third-party weather APIs to retrieve historical weather information for general or specific parking zones to predict future parking situations where weather may have an impact on legal parking availability based on indications of increased issuance of parking violations during certain weather conditions. For example, if computing system 100 detects through a weather API an identified location that the user is looking for available parking in a location subject to any expected snowfall or flooding, it may compare this information to the historical legal parking related data within database 106 to find out if there may be any weather-related parking restrictions and increasing number of parking violations in the zone which may be applicable. The user may receive a notification when the weather forecast is similar to situations from historical data that reflect an increase in the number of violations for a certain area due to the same weather conditions. For example, the historical data for a certain location showed an increase in parking violations when there is snowfall, such as an increase in parking violations as a result of the snow covering up a fire hydrant, leading drivers to believe they can park in the location since they cannot see the fire hydrant.

A user may customize notifications 300 in accordance with his/her preferences. Thus, in addition to having notification 300 issue on the basis of the data type corresponding to at least the user type that the user belongs to, the user can optionally specify further what he/she does or does not want to be notified about, which may result in precluding a single notification or a whole category of notifications. The notification preferences may include, but are not limited to time(s), location(s), distance to an intended destination, time before an intended destination, form or format of the notification(s), content of the notification(s), number of times the notification(s) is/are requested, a time the notification(s) is/are issued, an amount of time before a user reaches an intended destination, and a location where the notification(s) is/are issued, etc. As to time(s), a user may want notifications on nights and weekends while being turned off during business hours or can make other customizations to limit notifications to certain times. As to location(s), a user who often parks in the same area each day could specify that notification 300 relevant to that parking location might not need to be displayed, as the user may be familiar with the rules. As to distance to an intended destination, a user may predetermine a distance to an intended destination at which he/she would like to start receiving notifications. As to time before an intended destination, a user may predetermine an amount of time before an intended destination that he/she would like to start receiving notifications. As to format, a user may want to receive notifications in the form of text, image, audio, video, etc. or a combination of any. As to content, a user can specify the type of information he/she would like to see in a notification 300. For example, a user may specify that he/she does not wish to see any image of a sign or signage, instead opting to simply view a short description of that sign or signage. As to number of times, a user may also set the number of notifications the user would like to receive. For example, a user may want to receive an inquiry or notification once or twice, or the user might not want to receive any notification, etc. If the user does not respond to notification 300, computing system 100 may stop sending notification 300 after it repeats for the number of instances set by the user. Whole categories of notifications 300 or specific parts of each notification 300 may be able to be turned off, too. For example, a user might not feel the need to see notification 300 that serves as a reminder to pay meter fees or any other legal parking related data that the user feels to be well informed about. However, these are only examples and not intended to limit in any way the time customization that the user can specify with regards to which notification 300 is issued, nor is it intended to limit what information does get incorporated into database 106.

Figure 4A:
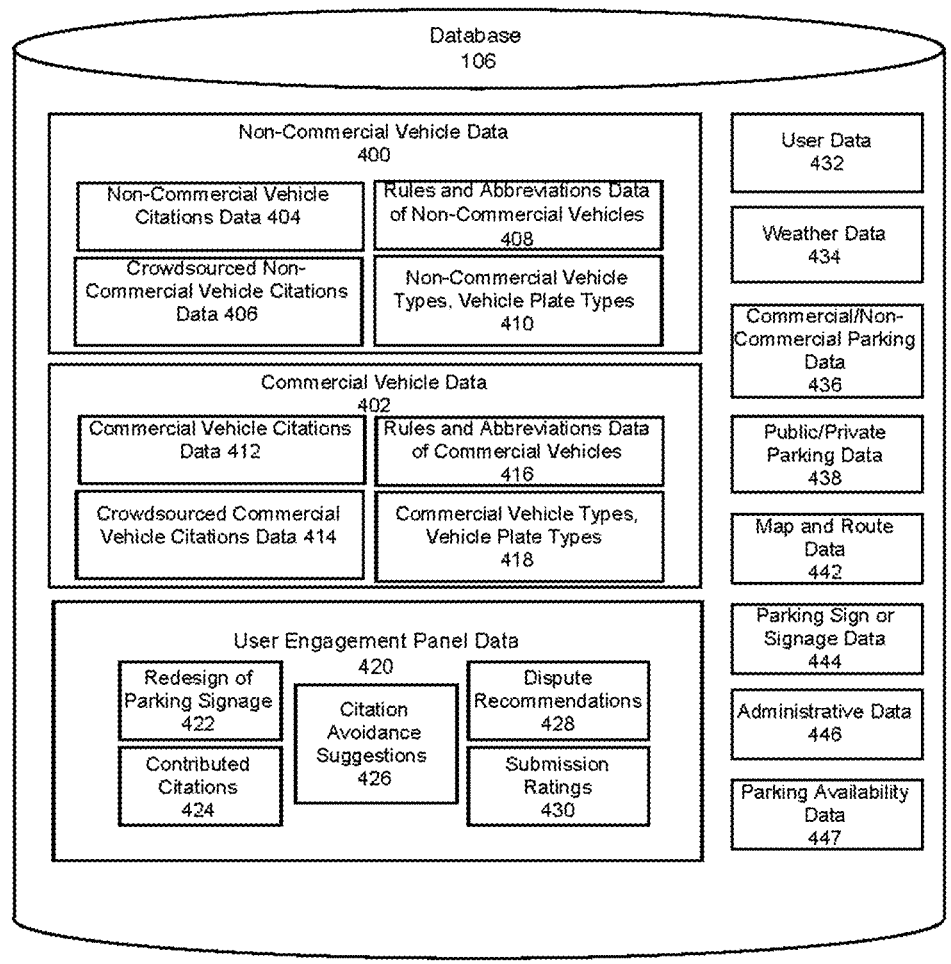
FIGS. 4A-4B are schematic diagrams illustrating database content and organization in accordance with exemplary embodiments of the inventive disclosure.

As seen in FIG. 4A, a schematic diagram illustrating the content and organization of database 106 in accordance with an exemplary embodiment of the inventive disclosure, the system may use database 106 or a set of databases (or data storage media) disposed on a hard disk, one or more hard disks, or other storage means. The information in database 106 may be stored in a non-relational or unstructured manner. One of ordinary skill in the art may appreciate that there are numerous methods for providing, storing, and organizing data in database 106 or other data storage media. Additionally, there may be at least one backup database that may back up a primary database periodically in case of data loss in the primary database. While referenced as a "database," one of ordinary skill in the art might appreciate that in practice this could be implemented in numerous manners, including but not limited to a data storage medium, whether structured or unstructured, relational, or otherwise. One of ordinary skill in the art would also appreciate that there are numerous methods of providing databases and data storage media for the organization and retrieval of specific information, contemplated for use with any appropriate database 106 or other storage means. Further, as stated, the exemplary embodiments disclosed herein are contemplated for use with one type of data processed and stored corresponding to one type of user, though certain embodiments of the inventive disclosure may incorporate multiple types of data corresponding to multiple types of users, or one type of data corresponding to multiple types of users, or multiple types of data corresponding to one type of user.

Legal parking related data can be categorized in database 106 according to different data types or data sets. For example, drivers of non-commercial vehicles may receive tickets for parking in commercial vehicle only standing zones, which only permit commercial vehicles to load and unload cargo. Therefore, database 106 may store a record of citations that may include citation data from non-commercial vehicles 404, 406 and citation data from commercial vehicles 412, 414, which may be labeled and sorted accordingly. Legal parking related data based on vehicle type may show different types of vehicles which commit the parking violations. Based on this organization, different types of users may then be issued a notification with the type of data that correspond to at least their user types. A notification may be made more accurate, since citations can be grouped in separate categories depending on the type of vehicle and types of vehicle plate, which may be included in commercial vehicles, non-commercial vehicles, types of vehicles, or types of vehicle plates.

User type is intended to cover every type of vehicle that may be subject to or restricted by parking regulations under various legal parking regimes. User types may be categorized into any one or more of the following: commercial vehicle user types, non-commercial vehicle user types, user types based on type of vehicle, user types based on type of vehicle plate, or any other user type. For example, trucks and taxis may be classified differently under the law and each may have its own distinct vehicle plate with parking rules affecting each type of vehicle differently. Therefore, a specific user type may be selected to access legal parking data that is corresponding only to that user type while precluding legal parking data for all other user types. Optionally, a user may select more than one user type to access legal parking data related to only the selected user type. Therefore, a user can receive notifications or updates based on data corresponding to each user type that has been selected, or for just one user type.

Database 106 may contain several data categories or groupings that establish data sets, including but not limited to non-commercial vehicle data 400, commercial vehicle data 402, user engagement panel data 420, user data 432, weather data 434, commercial/non-commercial parking data 436, public/private parking data 438, map and route data 442, parking sign or signage data 444, administrative data 446, and parking availability data 447. Non-commercial vehicle data 400 may further include non-commercial vehicle historical citations 404 and non-commercial vehicle real time citations 406, where the real time and historical sections of database 106 may be independent or synchronized in order to retrieve information from both sections at the same time. All historical legal parking related data in database 106 may also be corrected, updated, supplemented or otherwise modified by real-time legal parking related data or legal parking related data that had as of yet been unknown or unavailable. Real-time legal parking related data is considered to be real-time when one or more users share legal parking related data immediately. "Immediately" can be within a predetermined period of time close to the present time, such as fifteen minutes from receiving the parking violation or five minutes after street-cleaning is complete, or it may be virtually instantaneous with the present time. If the data does not meet requirements to be considered real-time data, then the data is considered historical data, but it may be used to update other historical legal parking related data already existing in database 106.

Non-commercial vehicles data 400 may further include rules and abbreviations data (and their common meanings) relating to non-commercial vehicles 408 as used by law enforcement. On a ticket, abbreviations may appear in the area where the officer specifies the violation and/or location of the violation. Abbreviations may be processed and stored in database 106 by gathering data from publicly available sources to provide the most accurate and up-to-date meanings. The user may be able to check the language to automatically change the abbreviations to plain-language meanings according to location when typing them into computing device 132. The function may also be used when the user reports a ticket that contains abbreviations. For example, a user may receive a ticket for parking a vehicle in violation of the law at a certain location and intends to report it. The ticket violation may state, the "Place of Occurrence" is "E/S Main St. Oft N/of Second Ave." The user may, for example, type the abbreviated language into the computing device 132 when reporting, and then computing system 100 may automatically change the abbreviations to plain and easily understandable explanations and then convert the address into a geolocation. For example, tickets with confusing abbreviations, "E/S Main St. Om N/of Second Ave." would be changed to "East side of Main Street zero meters North of Second Avenue" and then used to create the accurate geolocation through a third party's geolocation API to be entered into database 106. This geolocation may then be precluded for purposes of identifying potentially available legal parking for a user at a relevant time, because a user has received a ticket for parking illegally. Non-commercial vehicles data 400 may also include data relating to non-commercial vehicle types and non-commercial vehicle plate types 410, which can be stored in database 106 as such. This may include types of vehicles that fit the non-commercial vehicle type or have non-commercial vehicle plates for users, so that the users can be grouped properly by data type.

Database 106 can also store commercial vehicle data 402. This data set may include commercial vehicle historical citations 412, including past citations issued to commercial vehicles, commercial vehicle real-time citations 414, including real-time citations just issued to commercial vehicles, rules and abbreviations data of commercial vehicles 416, including abbreviations and rules that apply to commercial vehicle parking citations, and commercial vehicle types and commercial vehicle plate types 418, which include types of vehicles and types of plates associated with commercial vehicles. With respect to the type of vehicle or type of vehicle plate, the data type might correspond to at least the type of vehicle or type of vehicle plate. For example, trucks and taxis may each bear a different type of vehicle plate specialized for their respective industry, although they may both be classified as commercial vehicles, and each of these user types can receive data corresponding to at least a user type while precluding data for all other vehicle types. In other words, data corresponding to a particular user type, may be focused to that user type, whether based on type of vehicle or vehicle plate, or other specification, especially in a scenario where a parking prohibition or parking availability is based on the vehicle (e.g., commercial vehicle parking only).

Database 106 may also include user engagement panel data 420, which may include any information or data submitted by one or more users using user engagement panel 134. This user engagement panel data 420 may include one or more of the following: submitted redesigns of parking sign/signage 422 (e.g., to make the parking sign or signage clearer), citations contributed by users 424, which might include the discussion and/or comments related to that contribution, parking citation avoidance suggestions 426 that can be collected from users, which can include suggestions for a specific location or generally, dispute recommendations 428 from users who might give advice to others on effectively disputing parking tickets, and submission ratings 430 for user engagement panel data 420. Ratings can be used as a way to sort or weight information within user engagement panel 134 so that users might be able to see the most accurate or helpful information, and so that users who contribute meaningfully for doing so can be rewarded for their contributions.

Database 106 can also include user data 432 (i.e., information about the users), which can include where the user parks or has parked, and possible user registration information, such as the user type selected by the user, etc. A user may be asked to register with the service by providing driver license pertinent information such as name, type of vehicle plate, type of vehicle, the state or country issuing the driver license, and an email address to create a user ID for each user of the application. User IDs may be used for the purposes of tracking reports and ratings made by each user. Credit card and/or debit card information may also be requested for subscriber fees for certain services provided for a certified user. A registered user may be allowed to use various features of the application which include but are not limited to reporting data and rating data. The subscriber fees collected may also directly or indirectly fund the monetary or non-monetary rewards implemented as an incentive for providing legal parking related data, including but not limited to received parking tickets. The system may include a user profile database 106 configured to store user information and associations between each user and the user's remote computing device 132 after registering. Once registered, a user may set and change the information in their user profiles, if desired. Settings that may require a user's input or preference may be subsequently changed by the user within the settings (e.g., on/off). For example, the user may change the type of vehicle the user is currently driving. Accordingly, this is also applicable to the type of plate associated with the vehicle. This can be included and stored with user data 432.

Weather data 434 may also be stored in database 106, which might relate to past weather patterns and how they affect parking availability and the legality of potential parking places. For example, in certain bad weather situations rules regarding metered parking, legal parking time windows and limits, etc. might not be in effect.

Database 106 can also store data relating to commercial/non-commercial parking 436, and public/private parking 438, all of which can include alternative parking locations, government/public, commercial parking garages/facilities, or private garages/facilities where the user can legally park. Alternative lots listed with price and location can be used if a user would like to know in a notification a nearby parking garage, price, drive time to it, how full the garage or a parking lot is or how full certain sections or levels of the garage are, etc. These parking options may be listed with information from third parties, whether government or public parking, commercial parking garages or facilities, or private parking garages or facilities, which may have registered their parking garage information with computing system 100 (i.e., name, address, price, hours of operation, availability, and height, size, or weight restrictions, if any), and that information can be stored in database 106 for reference. By having parking garages or facilities register information with the system, the garages/facilities can also indicate in real-time whether parking is available currently or if the garage is full so computing system 100 may indicate availability when notifying the user, where garage capacity and/or occupancy can be shown through a format that displays how full a garage might be. If the parking garage is full, then it may not be displayed as an available option. Additionally, when the user is viewing the list of alternative parking options, the user may press on the name of the garage whereby the mobile application may automatically start routing the user from the user's current location to the parking garage. In addition, this can be also done with surface lots or other aboveground parking, etc. Furthermore, a user can register and submit that parking in a garage might be full, a submission which can be subject to ratings by other users.

Users may also be allowed to pay for parking directly on a remote computing device 132 if available through a web portal or a third-party API that connects to the applicable parking garages' or facilities' payment systems and/or website. Commercial/non-commercial parking 436 can include surface lots which might be used by patrons of a business or employees at a company which makes a certain amount of parking available. Public/private parking 438 can also include parking spaces that individuals might list and offer for free or for a certain price. These types of parking spaces might be made available for special events or at any time. Similarly, map and route data 442 can be stored in the database 106. Map and route data 442 might additionally be stored in an individual map database or within a general database, where map and route data 442 can be queried for ETA information through cross reference with traffic conditions, road density, etc.

Database 106 may also include parking sign/signage data 444, for example, parking sign or signage location information and parking sign or signage images from the websites of various government sources. Parking signs that apply to a user's current location or the location of a vehicle may be automatically displayed for the user on computing device 132 after a user temporarily stops or parks in a location. In some embodiments, applicable parking signs can be displayed through the user engagement panel and can be rated by the user, or applicable parking signs can be displayed to the user through one or more notifications. Accordingly, a user might not have to physically leave the vehicle to spend time walking to the sign to figure out if parking is allowed, putting them at risk of receiving a ticket during this time. In addition, a concise, easy-to-understand description of the parking rules indicated on the sign may be provided to the user so as to avoid any misunderstanding of the sign, potentially with a translation into another language or explanation in plain language.

Database 106 may also include rules and administrative data 446 as well as user data 432. Administrative data 446 may include, but is not limited to, data related to dispute resolution, quality control, etc. Historical data is kept track of partly by assigning a tracking number or service ID number that would be assigned to ticketing or related information to help refer back to it if it comes into question. Information that could be held within this identification may be information, such as the reason a ticket may have been issued, who or what agency issued it and where it took place, such as address-specific information including house or building number, zip code, borough, city, or state, how much the fine is and how the payment for the service took place if it did.

Figure 4B:
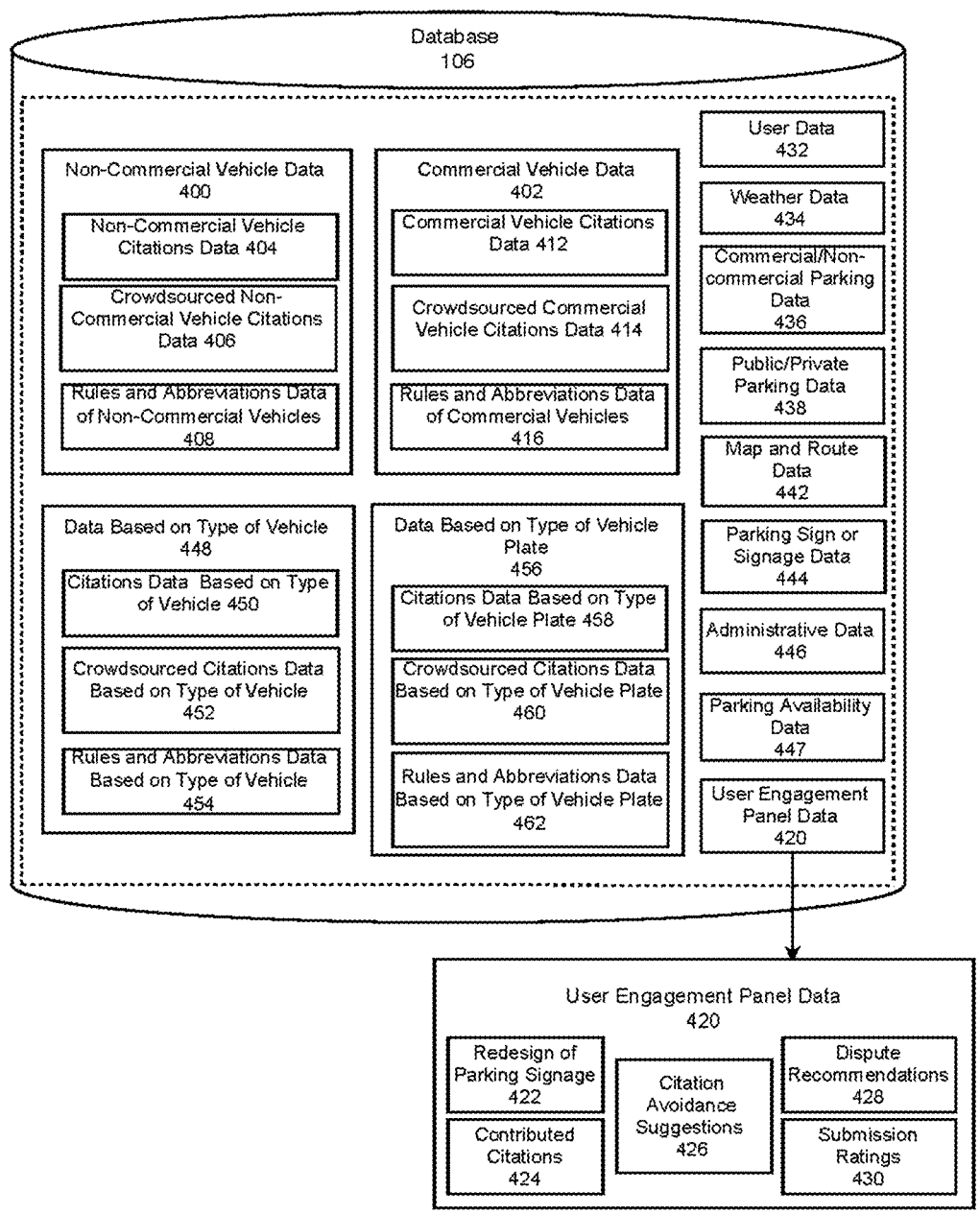

In an alternative embodiment of database 106 in accordance with the inventive disclosure, FIG. 4B shows that database 106 may contain several data categories or groupings that establish data sets, including but not limited to non-commercial vehicle data 400, commercial vehicle data 402, data based on type of vehicle 448, data based on type of vehicle plate 456, user engagement panel data 420, user data 432, weather data 434, commercial/non-commercial parking data 436, public/private parking data 438, map and route data 442, parking sign or signage data 444, administrative data 446, and parking availability data 447. Non-commercial vehicle data 400 may further include non-commercial vehicle historical citations 404, non-commercial vehicle real time citations 406, and rules and abbreviations data of non-commercial vehicles 408. Similarly, commercial vehicle data 402 may further include commercial vehicle historical citations 412, commercial vehicle real-time citations 414, and rules and abbreviations data of commercial vehicles 416. Data based on type of vehicle 448 may further include historical citations based on type of vehicle 450, real-time citations based on type of vehicle 452, and rules and abbreviations data based on type of vehicle 454. Data based on type of vehicle plate may further include historical citations based on type of vehicle plate 458, real-time citations based on type of vehicle plate 460, and rules and abbreviations data based on type of vehicle plate 462. User engagement panel data 420 may further include redesign of parking signage data 422, contributed citations data 424, citation avoidance suggestions 426, dispute recommendations 428, and submission ratings 430. This organization of data in the database 106 allows for data based on type of vehicle 448 as well as for data based on type of vehicle plate 456 to be its own data set within database 106.

An exemplary embodiment of the inventive disclosure may promote transparency and accuracy of legal parking related data in database 106 gathered from various sources by utilizing a platform for a user to access the data in database 106 in a user-friendly application interface. To build database 106, raw legal parking related data, which may include but is not limited to parking violation citation data, may be obtained from various sources, uploaded, and formatted to include relevant data used for running analysis and providing notifications. This parking violation citation data may be crowdsourced and may comprise real-time or historical data. The uploaded legal parking related data may then be split into two sets of data for cleaning (i.e., updating, correcting, supplementing or otherwise modifying). The first set of data may be legal parking related data which is already verified as to having all the necessary information in the right format, while the second set of data may be legal parking related data that needs to be reformatted to include all the necessary information.

Some of the historical legal parking related data may be provided as public open data from the government agencies and may also be available through a request for records, if not available through public government websites. Legal parking related data, such as parking violation related data, may also be obtained by crawling (e.g., systematic internet browsing) or otherwise connecting to relevant government or law enforcement websites that store legal parking related data for a specific user. However, in order to access such data, prior authorization may need to be obtained from the user to search for that user's legal parking related data, such as issued parking violation citations. Based on that, computing system 100 might send a notification to the user which provides a warning for pending or unpaid parking violation citations. With the authorization from the user, the information from these citations may be input as data into database 106 to further build the updated comprehensive database 106 to help identify potentially available legal parking. Although locations identified in such government released legal parking related data might not be as accurate as geolocation coordinates, such data is nevertheless useful. And, to better identify locations from government released data, these locations may be transformed to geolocation coordinates, through any qualified third-party software that provides a location geocoding service for latitude and longitude coordinates before the citation location data is input into database 106.

Computing system 100 or the system administrator may additionally or alternatively obtain legal parking related data through the input from a user and/or interested individuals as well as private entities, for example, transportation companies, or any other organizations that specialize in transportation who may have access to issued parking violation citations or other legal parking related data. Database 106 may utilize a collection method for the collection of legal parking related data. Legal parking related data may be collected and summarized manually, for example, by a system administrator or system employee, or automatically, for example, by an artificial intelligence algorithm, to correct, update, and supplement database 106.

It is to be understood by one skilled in the art that database 106 updates and syncs dynamically whenever there are changes or updates in data blocks. Server 124 and database 106 may dynamically update the data to reflect the latest changes. Any backup database 106 related to database 106 may also change accordingly to also reflect the latest changes. Such information may be organized or structured in a manner allowing for effective sorting and retrieval.

A user may access historical records, may explore database 106, and may retrieve related data by using a search function or other means. Each time an input or request from a user who wants to see related information is made, a safe access channel with database 106 may be opened and computing system 100 may send out the query sentences through the access channel to database 106 management module. If database 106 is a relational database, then the data tables may have one kind of relationships, such as one-to-many relationships, many-to-many relationships and one-to-one relationships with other data table(s). Based on the relationships between data tables, the database management module follows the query sentences and finds the specific data table(s) by using ID(s), table names and columns names of the tables with or without joining two or more data tables together. If database 106 is a non-relational database, instead of data tables, the data may be stored in key-value pairs, then the database management module follows the query sentences and finds the specific data by using keys that query sentences provide. Whether a relational or non-relational database is used, after the database management module retrieves the targeted data, computing system 100 may send a search result back to the server through the secured access channel. Then the secured channel is closed until the next time it is opened. The relevant data that has been organized within database 106 may thus be retrieved.

The raw legal parking related data entered, processed, stored, and analyzed may include but is not limited to legal parking related data, parking violation related data, parking sign or signage information, alternative parking data, parking availability or unavailability data, parking availability data, street cleaning data, and parking meter data. Parking violation related data may include parking rules and regulations, type of violation, the causes or reasons for the violation, the name of a law enforcement officer who issued the ticket, law enforcement officer comments on the ticket, registration state, plate type, vehicle type, issue date, violation code, violation statutory code, issuing agency, violation time, house number; street name, law section, subdivision, days parking in effect, from hours in effect, to hours in effect, violation description, any other relevant factors, and/or other legal parking related data from database 106, etc.

Reasons for parking ticket violations may include but are not limited to: standing in a no standing zone, where it is prohibited to wait or stop to load or unload packages or merchandise at curbside and only allows for stopping to expeditiously drop off or pick up passengers; stopping in a no stopping zone, where it is prohibited to wait, stop to load or unload packages or merchandise or drop off or pick up passengers, parking tickets related to blocking areas, such as parking in front of or blocking an entrance, exit, or crosswalk, as well as blocking a mailbox, parking within a prohibited zone based on a distance from a bus stop or fire hydrant; parking too close to a railroad crossing, parking restrictions based on timing such as holiday, parade route, or other special event parking that only applies selectively, or parking prohibitions that relate to double parking, whether for a certain amount of time or any time at all. Some parking prohibitions relate to a revolving schedule, such as street cleaning parking prohibitions, which happen on given days of the week between two different times. Prohibitions can also relate to user oversights, such as remaining parked after a time expiration. Parking tickets can also relate to parking within a zone or area that is restricted to certain types of vehicles or people, such as parking in a handicapped space or within handicapped zone or in a bike lane, in addition to parking in a private parking zone or a zone with a required permit. Furthermore, parking tickets can relate to prohibitions or limitation for parking for certain for certain kinds of types of vehicles, such as motorcycle-only parking or parking a bicycle in areas banning bicycle parking. In addition, there may be selective zones that have different penalties associated with them, such as parking in a tow-away zone. Thus, parking violation related data may be mined for identifying a potential parking violation applicable directly or by inference at a specific location and for precluding illegal parking locations.

Figure 5A:
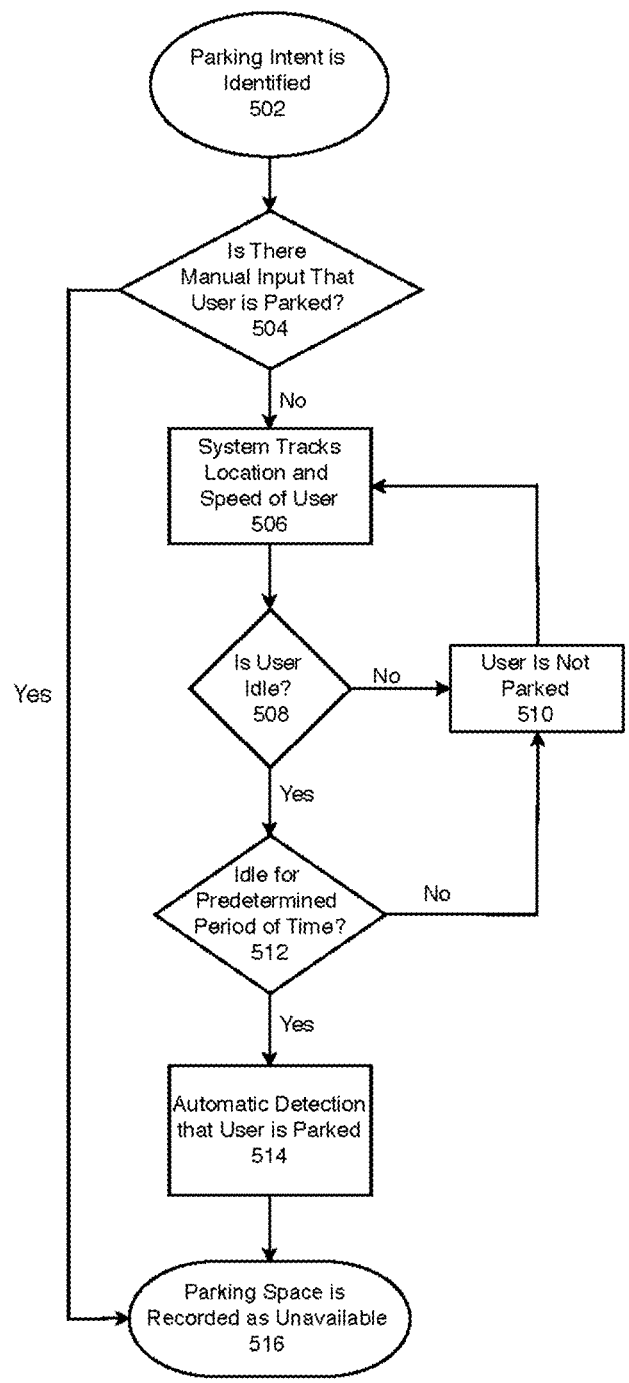
FIGS. 5A-5B are flowcharts illustrating approaches for obtaining and processing parking occupancy related data as part of potentially available legal parking related data in accordance with exemplary embodiments of the inventive disclosure.

Referring next to FIG. 5A, shown is a flowchart illustrating an approach for obtaining and processing parking occupancy, availability, or unavailability related data as part of potentially available legal parking related data in accordance with an exemplary embodiment of the inventive disclosure. For purposes of identifying potentially available legal parking locations, in addition to precluding illegal parking locations, parking locations which are identified to be legal but currently occupied are precluded from identification as potentially available legal parking locations as well. Thus, once parking intent is identified (Step 502), the system determines whether there is manual input, i.e. by pressing a button on the computing device, that the user is parked (Decision 504). If there is manual input that the user is parked, the system then records the location, or parking space, as unavailable (Step 512). Alternatively, if there is no manual input the system may automatically track the user's speed and location (Step 506) to determine whether the user is idle (Decision 508). If, however, the user is determined to still be moving, then the user is determined to not be parked (Step 510), at which point the system continues tracking the user's speed and location. If the user is determined to be idle based on the user's traveling speed going down to no movement, the system then determines whether the user has been idle for a predetermined period of time (Decision 512). If so, the system recognizes this as automatic detection that the user is parked (Step 514) or at least that the location is not available and records the parking location as unavailable (Step 516). If not, and the user's travelling speed has gone down to no movement for less than the predetermined period of time, the user is determined to not be parked (Step 510). For example, this may be the case if the user is briefly waiting at a traffic signal.

When the user leaves the space he/she is occupying, a leaving intent of that parked user is identified (e.g. automatically through leaving intent detection or manually input by the user), the parking availability or unavailability data, which may include data regarding the occupancy status of a parking location, may be updated to reflect that the location is now available for parking. Essentially, the more registered users including, but not limited to, drivers, motorcyclists, cyclists, and automated vehicles, utilize the invention, the more comprehensive and accurate the data in the database might be, and therefore more data can be used in identifying potentially available legal parking locations. As a result, notifications of potentially available parking locations can be more accurate. By recording one or more locations where users are currently parked in addition to identifying illegal parking locations, the system can more effectively notify users of potentially available legal parking.

As a result, these parking locations, whether occupied, illegal, or potentially available and legal can be displayed to the user using, for example, different formats such that the user can tell what may be an illegal parking location, an occupied parking location, or a potentially available parking location. If the user wants the computing system to identify all parking locations, the computing system might employ three different formats, such as three different colors or shapes, to clearly separate the three groups of parking locations from each other. However, since not all parking locations identified by the computing system as potentially available might indeed be available, at least due to the fact that not all drivers may be registered with the system, the user might prefer the computing system to identify only occupied and illegal parking location. In this case, the computing system may only employ two different formats. It is possible that the user may wish to use the system for the sole purpose of identifying occupied parking locations, in which case only one format might be needed. This may be through a notification or on an electronic map display, for example. Further, a notification may include reasons for the intended destination not having legal parking, such as legal parking locations are occupied, parking locations are illegal for the user type the user belongs to, etc. These reasons may factor into route planning for the user. Users may be concerned with parking locations that are illegal and are occupied or unavailable. In some situations, users may only be concerned with occupied parking locations and only want to receive legal parking related data about parking locations that are occupied. Or, users may only be concerned with illegal parking locations and only want to receive legal parking related data about parking locations that are illegal.

Figure 5B:
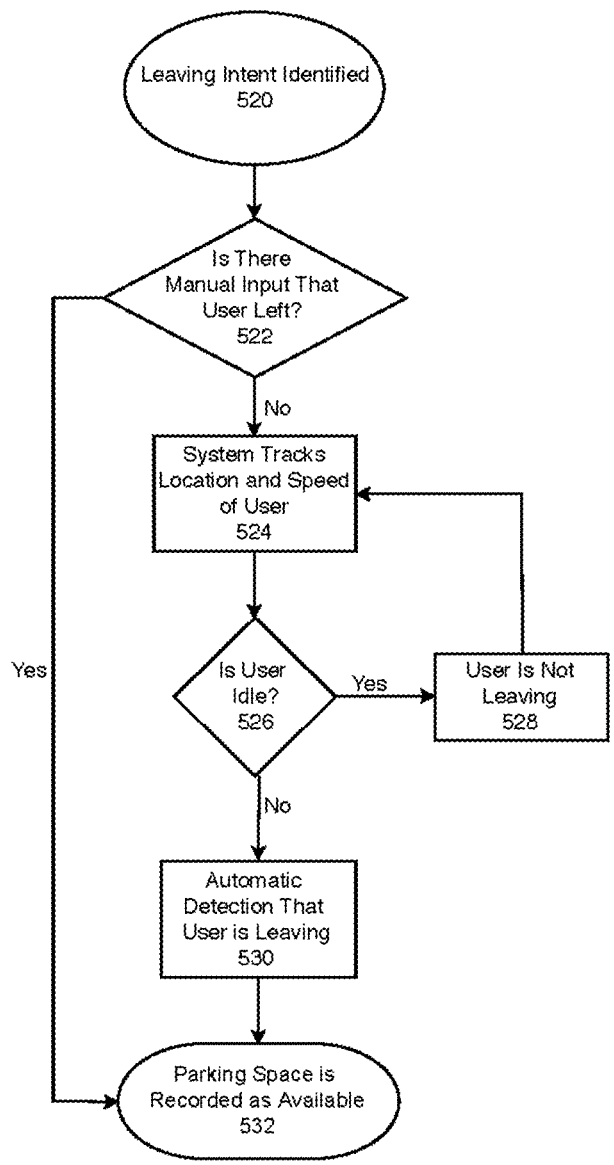

Referring next to FIG. 5B, shown is a flowchart illustrating an approach for obtaining and processing parking occupancy, availability, or unavailability related data as part of potentially available legal parking related data in accordance with an exemplary embodiment of the inventive disclosure. For purposes of identifying potentially available legal parking locations, in addition to precluding illegal parking locations, parking locations identified as being legal but currently occupied are also precluded from identification as potentially available legal parking locations. Thus, once leaving intent is identified (Step 520), the system determines whether there is manual input, i.e., by pressing a button on the computing device, that the user has left (Decision 522). If there is manual input that the user has left, the system then records the location, or parking space, as available (Step 532). Alternatively, if there is no manual input the system tracks the user's speed and location (Step 524) to determine whether the user is idle (Decision 526). If, however, the user is determined to still be idle, then the user is determined to not be leaving (Step 528), at which point the system continues tracking the user's speed and location. If the user is determined to no longer be idle based on the speed of the user's traveling speed, the system recognizes this as automatic detection that the user is leaving (Step 530) or at least that the location is now or may become available and records the parking location as available or potentially available (Step 532).

The system may recognize at least one of the following four user types: commercial vehicle user type, non-commercial vehicle user type, a user type based on type of vehicle, a user type based on type of vehicle plate, or any other user type. A person of ordinary skill in the art would appreciate that the system may recognize only one user type at any time, all user types at any time, or any combination of the user types at any time. Since different RRLC may apply differently to different users depending on a user type resulting in different types of parking violations, a user who indicates in the user's profile that he/she drives a commercial vehicle may be automatically marked in the category for only commercial vehicles; whereas a user who indicates in the user's profile that he/she drives a non-commercial vehicle may be automatically marked in the category for only non-commercial vehicles. Additionally, users may differ based on a type of vehicle they are driving. Types of vehicle may include, but are not limited to, tractor-trailers, trucks, buses, taxis, and limousines, etc. An even further differentiation of users is based on type of vehicle plate. For example, two users both driving Toyota Camry's may nevertheless belong to two different user types based on the fact that one of them drives a Toyota Camry that has a taxi license plate. While referenced as "user type," one or ordinary skill in the art would appreciate that in practice a user may choose to select one or more or any combination of user types.

In order to accommodate users of different user types, i.e., to effectively assist every user in finding potentially available legal parking, the system provides for selective notification of users, that is based on at least the data type corresponding to at least the user type that the user belongs to. Accordingly, the system may recognize at least one of the following four data types of legal parking related data in the database: commercial vehicle legal parking related data, non-commercial vehicle legal parking related data, legal parking related data based on type of vehicle, and legal parking related data based on type of vehicle plate, or any other type of data. The data in the database may also be categorized according to the issuing agency of the parking violation citations. A person of ordinary skill in the art would appreciate that the system may recognize only one data type at any time, all data types at any time, or any combination of data types at any time. To notify a user of potentially available legal parking, the system may pair the data type with at least the corresponding user type. For example, commercial vehicle legal parking related data would correspond to at least commercial vehicle user type. Since some legal parking related data may apply to more than one user type, a notification with that same legal parking related data may be sent to all applicable user types. However, if any of the legal parking related data applies to only a single user type, for example a taxi, that data may then be isolated for notifications of only taxi users, while precluding all other user types. In the case that a user selects more than one user type, the system may utilize the database to retrieve data of the data type corresponding to each of the selected user types, so that all applicable data may be made available to that user.

The system may include self-driving and self-parking technology. This technology may be integrated within the autonomous car sensors, which measure the distance from the car to obstacles, and within the cameras that detect traffic objects like lights and road signs, and help recognize moving objects like other vehicles, pedestrians, and bicyclists. Although self-driving cars might not have a need to park because they can vacate a space when needed, for example to minimize the number of idling or double-parked vehicles during times of high traffic, self-driving cars may be integrated with a comprehensive system for identifying potentially available legal parking as provided by the inventive disclosure.

The system may be configured to integrate algorithms to detect duplicate data. If the tickets issued on dates and times match those in database 106, they may be labeled as duplicate data and automatically removed from the data set. However, tickets issued on dates and times not included in database 106 may be added to database 106, and notifications may be updated to properly reflect added data to then properly alert a user with updated information.

Figure 6:
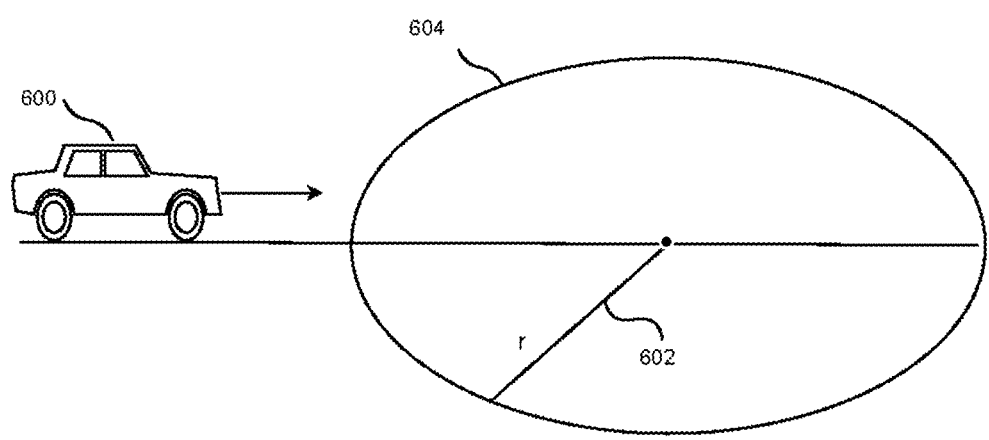
FIG. 6 is a schematic diagram illustrating an approach for when a notification is transmitted to a user in accordance with an exemplary embodiment of the inventive disclosure.

Referring now to FIG. 6, shown is a schematic diagram illustrating an approach for sending a notification to a user in accordance with an exemplary embodiment of the inventive disclosure. Computing system 100 may determine when the user shows parking intent through identifying speed and location, or through an actual request. As depicted, computing system 100 may provide the user with a notification of potential parking violations at a time when vehicle 600 (i.e., having remote computing device 132 located in it) is within a predetermined radius "r" 602 of a destination. The destination may, for example, be a desired location or region the user wishes to park or may be a determined location having available legal parking. The area which is established by this radius 602 is referred to herein as impact zone 604. When computing system 100 detects parking intent of the user by identifying the current speed and location of vehicle 600, or otherwise, computing system 100 may query database 106 for the legal parking related data and parking rules data stored in database 106, and then generate a notification as disclosed, for example, in FIG. 3.

The location of each individual user may be recorded while driving, along with the user's speed, in which a slow speed (e.g., 1-5 km/h), may be indicative of the intent to park within predetermined radius 602 of the intended destination as preset by the user. Based on the user's location and speed, an inquiry may be sent which asks for example, "Parking?" If the user chooses "Yes" then any potentially available legal parking locations within predetermined radius 602 of a destination may be identified. Alternatively, the user may proactively indicate to computing system 100 that he/she is looking for parking or to start looking when he/she is within a certain distance of the desired destination, as well as indicate the desired location for such parking. Predetermined radius 602 may be preset by the user to be a certain distance, because a user may prefer predetermined radius 602, say, of or within 150 meters from a destination, whereas another user may prefer predetermined radius 602 of at least 300 meters. If a user does not preset this, there may be default settings for predetermined radius 602, which may vary depending on the location. For example, a default setting for predetermined radius 602 may depend on the city in which a user is located. Since a road map may be integrated in database 106, if the vehicle slows down or stops in the middle of the road due to traffic or other reasons, or is too far from the intended destination, computing system 100 may recognize such location through the geolocation GPS coordinates and speed data and may automatically know to not send a parking intent notification, since parking is not allowed in the middle of the road.

A notification may be sent regarding alternate-side of the street parking, as historically determined by authorities, for streets that do not allow parking during certain times due to government street cleaning services, which, for example, may be applicable for only one half an hour (e.g., 9 AM-9:30 AM). The street cleaning parking restrictions often cause problems and are a disruption to one's schedule, as they typically are of a limited (e.g., 30 minutes) duration on the sign but may in actuality take only a few minutes for the street cleaning vehicle to clean a street. Computing system 100 may also inform users of temporary changes in alternate-side parking rules (e.g., when alternate parking rules are suspended to severe weather conditions, emergencies, holidays, etc.). Computing system 100 can be connected with remote computing device 132 to provide the user with a notification reminding the user to move a vehicle due to street cleaning rules that may be in effect soon. The user may set up and/or adjust one or more different advance reminder alerts with varying lengths of time. The alert may remain in effect until the user indicates they have seen the alert and/or moved their vehicle. The user may turn these alerts on or off in the settings of a mobile application. The system of remote computing device 132 might have information on the exact location of where the user may have parked, since the user may press a button on the display of the screen of their mobile communications device after parking to lock in and record the location as occupied with the system, or the location can be recorded by the system automatically, using location identifier 204.

Also, government street cleaning regulations may be tracked. Normally, a vehicle would not be able to park during the time frame designated for street cleaning. However, after the street cleaning has been completed, a vehicle may park on that street, despite a 30-minute time frame. To maximize parking location efficiency, the system may notify users in accordance to when the street cleaning starts and finishes. This street cleaning information might come from crowdsourcing. Additionally, the system administrator may work in cooperation with municipalities or street cleaning companies to obtain this data. For an even more complete logging of street cleaning times, the administrator may hire an employee or a third-party company for the purpose of driving a vehicle and following the street cleaning vehicles around to provide the most up-to-date information. This may ensure that users are able to utilize these parking spaces as soon as possible, and do not have to wait for the 30-minute time frame. Additionally, computing system 100 may inform users of temporary changes in alternate-side of the street parking rules, e.g., when alternate side of the street parking rules are suspended due to severe weather conditions, emergencies, holidays, etc. Computing system 100 may issue a notification to the user reminding him/her to move a vehicle due to street cleaning rules. The user may set up and/or adjust one or more different advance reminder alerts with varying lengths of time depending on the particular rule in effect. The alert may remain in effect until the user acknowledges the alert and/or indicates to have moved the vehicle. The user may turn these alerts on or off in the settings of a mobile application, for example, using remote computing device 132.

After the data is processed, it may go through a subsystem for information provisioning, and then be delivered to a user's in-vehicle navigation system. In vehicles that do not have an in-vehicle navigation system, legal parking related data may be integrated into one or more computing devices, which may be GPS enabled.

The system may increase the user's chance to find legal parking by processing and analyzing data for at least three types of situations, for example, when parking is legal all the time (i.e., no restrictions), when parking has a limitation (e.g., certain hours, certain days of the week, certain months of the year, rules for certain types of vehicles), and when parking is illegal at all times (i.e., no standing anytime zone), and then sending a notification to the user based on available information, where a notification can include a parking sign image that displays automatically to the user. Some areas contain on-street parking that do not have any applicable parking signs where parking is legal all the time. This is common to residential areas but may also exist in other areas. Usually on-street parking might contain some sort of limitation which allows or disallows parking during either certain time frames of the day, certain days of the week, certain months of the year, or may require a certain type of vehicle or permit to be allowed to park. The variety of possible restrictions is often a source of confusion for drivers as there may be multiple signs indicating different applicable rules. These areas may be precluded as legal parking options if the time falls within the provided illegal parking time frame. If the signs indicate that there are limitations, then the times outside the limitations in these areas may be shown as a legal parking option through a notification or on an electronic map display. Other on-street parking that may be precluded at all times is areas where parking is illegal all the time because it is a no standing anytime zone.

Figure 7:
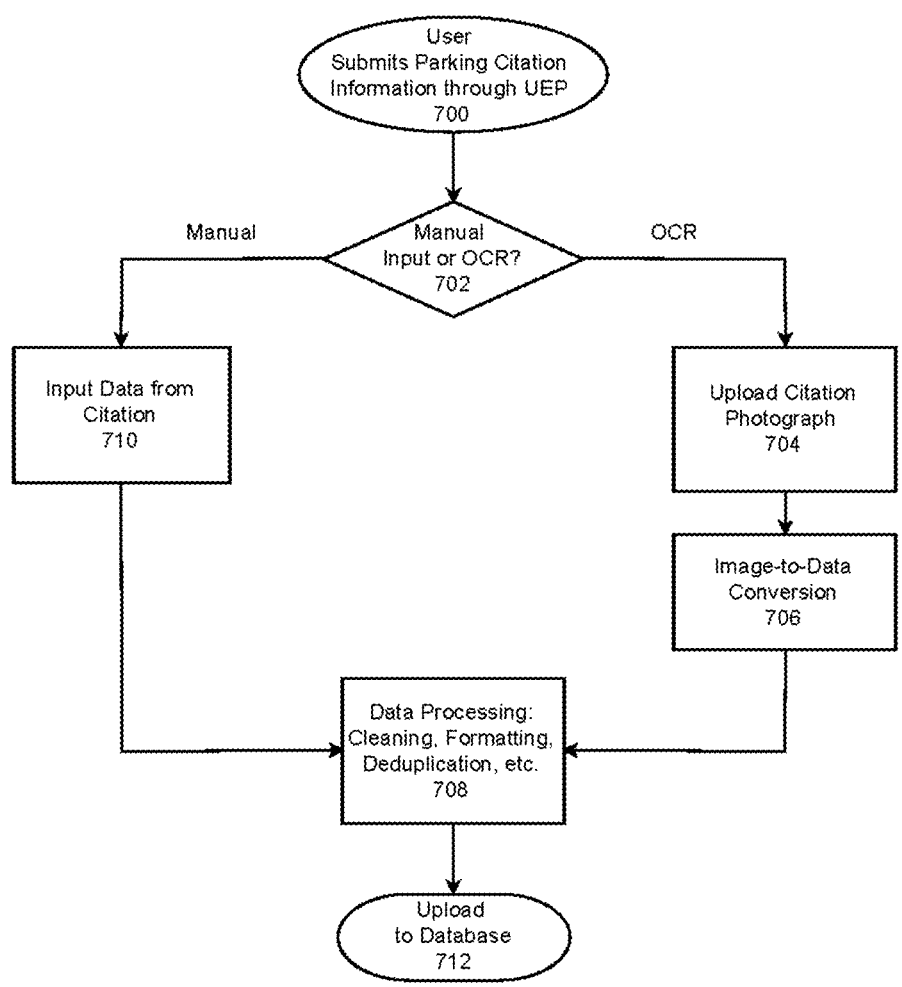
FIG. 7 is a flowchart illustrating how the parking ticket information reported through the user engagement panel is recognized, processed, and uploaded to the system in accordance with an exemplary embodiment of the inventive disclosure.

As shown in the flowchart of FIG. 7, parking ticket information reported through user engagement panel 134 may be recognized, processed, and uploaded to the system. That is, various legal parking related data as reported by a user (i.e., crowdsourced data) may be collected through user engagement panel 134 (i.e., a platform for the collaboration and sharing of legal parking related data). It will be understood by one of ordinary skill in the art that "user engagement panel" herein is used to denote a panel or interface that a user can access and through which the user may exchange legal parking related data as well as share relevant ideas. Other potential terms may be used to describe this function, such as "forum," "discussion group," "online meeting," etc. User engagement panel 134 may be used by one or more users, or other interested individuals, or entities such as the government, government agents, municipalities, non-governmental organizations (NGOs), private entities, and community organizations, or media sources. User engagement panel 134 may be accessible through a terminal or remote computing device 132, where the user may interact with user engagement panel 134 through display 212 of computing device 132.

Crowdsourced data may be periodically or continuously collected through user engagement panel 134 and analyzed to build a more accurate, up-to-date database 106. As used herein, "crowdsourcing" is a distributed data collection method that utilizes online and offline resources to compile services, ideas, and/or content by the solicitation and/or capturing of data from a variety of people native to a special community that is targeted by the crowdsourced subject. Crowdsourcing may be used in gathering data that is not provided through other sources. Crowdsourced data may be in the form of real-time data or historical data.

As depicted in FIG. 7, a user may submit parking citation information through user engagement panel 134 (Step 700), which can include but is not limited to accurate location according to GPS, time of receiving violation citation, reason for receiving violation citation, type of vehicle and type of vehicle plate, and any other additional relevant information, etc. Parking citation information may be input manually by the user, or computing system 100 may perform optical character recognition (OCR) to obtain the information (Decision 702). Where the input is through OCR, the user may provide a photograph, scan, or other image of the relevant citation (Step 704). If the user takes a picture of the ticket to upload to database 106, the application may allow the user to edit the image with an image editing function by covering, blurring, or redacting information and/or sharpening the image prior to uploading the picture, or this may be done automatically by recognizing certain private information such a license plate number or vehicle registration information. Using OCR or another image to data converter to sharpen unclear images increases the success rate for computing system 100 to recognize the information in the image and convert it to data (Step 706). As an alternative, database 106 may also allow a user to scan the parking violation citation by utilizing camera or scanner software downloaded on remote computing device 132. Where the input is manual, the user may enter data related to a received parking violation citation by selecting available options (Step 710). This may include input through drop-down menus or accordion fields on an interactive touch screen display, or the user can input through voice commands, etc. After conversion or after manual user input, the data can be processed or modified, which might include cleaning, formatting, and deduplication of redundant data (Step 708). After it is processed, the data can be uploaded to the database 106 (Step 712) according to the data set by which the data can be sorted.

Figure 8:
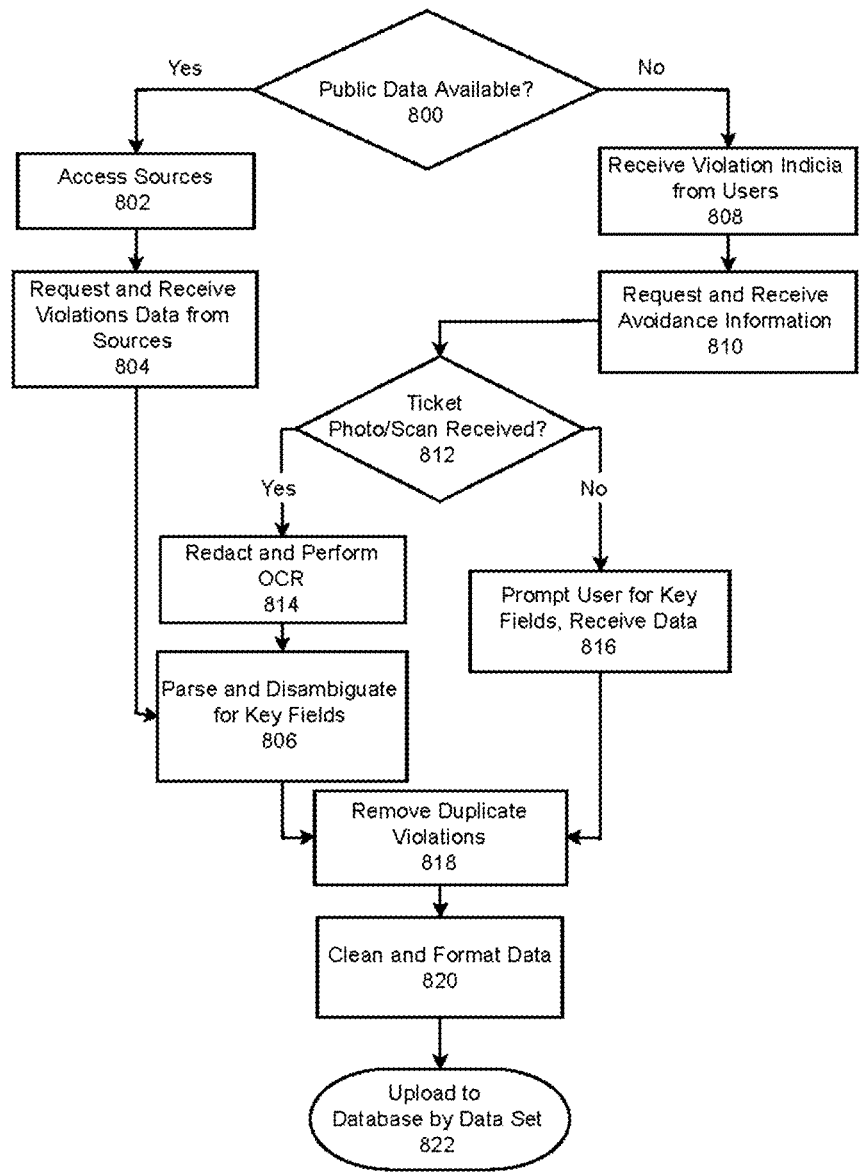
FIG. 8 is a flowchart illustrating an approach for obtaining and processing parking violation related data as part of legal parking related data in accordance with an exemplary embodiment of the inventive disclosure.

Next, in FIG. 8, the flowchart illustrates an approach for obtaining and processing parking violation related data as part of legal parking related data, in accordance with an exemplary embodiment of the inventive disclosure. Legal parking related data may be grouped by historical parking violation related data set for non-commercial vehicles and commercial vehicles, and real-time parking violation related data set for non-commercial vehicles and commercial vehicles. The first determination to be made is whether or not there is public data available (Decision 800). If so, sources of this available public data may be accessed (Step 802). These sources may be any source that makes parking violation related data publicly accessible may be accessed. This can include but is not limited to entities such as the government, government agents, municipalities, non-government organizations (NGOs), private entities, and community organizations, or media sources. Media sources may include, but are not limited to, websites, blog posts, social networks, newspapers, magazines, professional articles, broadcasts, television programs, and any other resources where legal parking related data generally available to the public can be collected. Access may be automatic and periodic. Once access has been established, legal parking related data may be requested from the sources and received once a request is granted (Step 804). As this data may be in a form defined by the source, the received violations data may be parsed for key fields, and the key fields can be disambiguated (Step 806).

Legal parking related data may additionally originate from private data, such as one or more users or interested individuals or private entities. Thus, if there is no data publicly available from a public agency or posted in a location accessible publicly such as a published website, then indicia of a parking violation citation may be received from another user (Step 808). Indicia inform computing system 100 that the user has received a citation for a parking violation, and thus the process for collecting citation data from the user may begin. During this process, computing system 100 may request the pertinent citation data from the user as well as solicit potential suggestions on how to avoid a citation (e.g., avoidance information) (Step 810). Next, it is determined if a photograph or scan of the citation is received (Decision 812). If a photograph or scan is received, OCR may be performed on the photograph image, which may have been redacted (Step 814). Once OCR has been performed, the OCR text may be parsed for key fields and key fields can be disambiguated (Step 806). It may be understood that in writing the citations, the same location may be described in many different ways. For example, the parking space may be referred to by the address that it is in front of, or, in some cases, across from. This address may also be provided in many different ways. For example, a single street may be written as "sixth ave," "sixth avenue," "6th ave," etc. Disambiguation therefore converts all data into a single format, for example, a location can be geocoded into latitude/longitude coordinates so it is more exact. Disambiguation may also be used to standardize violation names, for example, with reference to the abbreviations.

However, in situations where the user does not provide a photograph or scanned image of the citation, the user may be prompted to fill in the key fields with pertinent data (Step 716), for example, in an unambiguous way such as by selecting from various options or manually typing into a text field or text box. Disambiguation may or may not be necessary in this case. Further, computing system 100 might provide recommendations for address input for the user, so that entries can be standardized before final entry. In either event, all of the collected data may have duplicate violations removed (Step 818) and may be cleaned and formatted (Step 820) for database 106. Format can include how the data can be presented, such as leaving data as a human-readable address or geocoding, if necessary, to ensure that the same instance of a citation is not counted twice. This may be done, for example, with reference to a citation number that is specific to the issuing agency. Once the data is cleaned and formatted, it may be added to database 106 by the data set (Step 822).

After relevant legal parking related data has been cleaned, the location data can be extracted in a data frame to be used in a third party geocode API, for example, GOOGLE GEOCODING API, which is a location geocoding service provided by Google, a subsidiary of Alphabet Inc., or SMARTYSTREETS, which is a location geocoding service for latitude and longitude coordinates provided by SmartyStreets, LLC, etc., to output a file with all the geocoded information of relevant locations, where the file may be a file such as a.csv file. Assuming the geocoding methods disclosed herein do not provide accurate geolocation, any other type of technology may be adopted or developed to more accurately identify the location or geolocation related to a parking violation as well as to a potentially available legal parking location. The output may be reviewed and corrected by the system administrator for accuracy and completeness. Parking sign or signage data and RRLC data files may also be uploaded, cleaned and merged with the citation data into database 106. The data can be added to database 106 based on data set. For example, if new data pertains to a non-commercial vehicle, the data may be stored in non-commercial vehicle data set 400. If the new violation data pertains to a commercial vehicle, the data may be stored in commercial vehicle data set 402. In addition, new data may be sub-grouped by type of vehicle and type of vehicle plate. Data may include time, day, and location-linked rules for commercial and non-commercial vehicles for the system to determine parking rules.

Turning next to FIGS. 9A-9B, shown are schematic diagrams of an exemplary embodiment of the invention illustrating a user's interaction with computing system 100 using remote computing device 132 when reporting a parking ticket in accordance with an exemplary embodiment of the inventive disclosure. For purposes of this illustration, computing device 132 is depicted as a mobile device such as a smartphone; however, it is to be understood that remote computing device 132 is not so limited, and it may be a vehicle integrated information or entertainment unit or any other computer device or communications module. When a user is issued citation 900 for a parking violation, the user may use ticket scanner panel or module 804 on computing device 132 to take a picture or scan of citation 900, as depicted in FIG. 9A. As citation 900 may include sensitive information such as the vehicle identification number (VIN) and other personal data, such as name, residential address, etc., sensitive information can be redacted to create a redacted citation image 902 either automatically or manually by the user. Alternatively, as seen in FIG. 9B, the user may input ticket information manually into computing device 132 using ticket information panel or module 906, for example, by selecting from menu subheadings 908 and/or by entering it, and other information, into free text fields. The menu subheadings may include type of vehicle, type of vehicle plate, reason for violation, time frame, location of violation, or price. The user may also use remote computing device 132 to choose the type of vehicle or type of vehicle plate, or to provide a photograph, a video and/or an audio message with the ticket or other relevant information using still image camera 910, video camera 912, or microphone 914 of remote computing device 132.

After reporting a parking ticket as depicted in FIGS. 9A-9B using remote computing device 132, the system may provide an interface for the user via the user engagement panel 134. Referring to FIGS. 10A-10B, shown are schematic diagrams of remote computing device 132 shown in FIGS. 8A-8B further illustrating a user interface of the user engagement panel 134 on user computing device 132 showing a "Tickets Sharing" panel or module 1000 (FIG. 10A) and a "Q/AIC" (i.e., questions, answers, comments) panel or module 1002 (FIG. 10B) based on a specific location. Here, a user may rate posts positively or negatively by clicking on the appropriate button or icon 1012 (e.g., by selecting the check-mark for a positive rating and the "X" for a negative rating) within user engagement panel 134 of user computing device 132, as well as add any comments by using button or icon 1004. Information 1006 on user engagement panel 134 can include reasons, location of the violation, ticket penalty amounts, the number of tickets previously issued for the location, and other comments about a citation. In Q/A/C panel 1002 of FIG. 10B, the user can submit question 1008 about, for example, a particular location, and then receive answer 1009 from computing system 100. A user may also choose to submit questions, answers, and comments by using button or icon 1010 in the Q/AIC panel 1002. Here too users can rate posts positively or negatively by clicking on the appropriate button or icon 1014 (e.g., by selecting the check-mark for a positive rating and the "X" for a negative rating) within user engagement panel 134 of user computing device 132, as well as add any comments by using button or icon 1010.

Similarly, FIGS. 10C-10D show diagrams illustrating a user interface related to user engagement panel 134. In these depictions are shown a "Signs" panel or module 1014 (FIG. 10C) and an "Other" panel or module 1022 (FIG. 10D). "Other" panel 1022 can show any information related to miscellaneous subjects and might be based on a specific location or a general location. Signs panel 1014 might be a resource for a user to access clarifications of parking signs 1016, where potential questions may have been asked or can be added that might be or have been answered by another user and rated by those who might view it or are qualified to rate it. Here too a user may rate posts positively or negatively by clicking on the appropriate button or icon 1018 (e.g., by selecting the check-mark for a positive rating and the "X" for a negative rating) within user engagement panel 134 of user computing device 132, as well as add any comments by using button or icon 1020. Users may toggle between the Tickets Sharing, Q/A/C, Signs and Other interfaces at any time using buttons 1001, 1003, 1014 and 1022, respectively.

Figure 11:
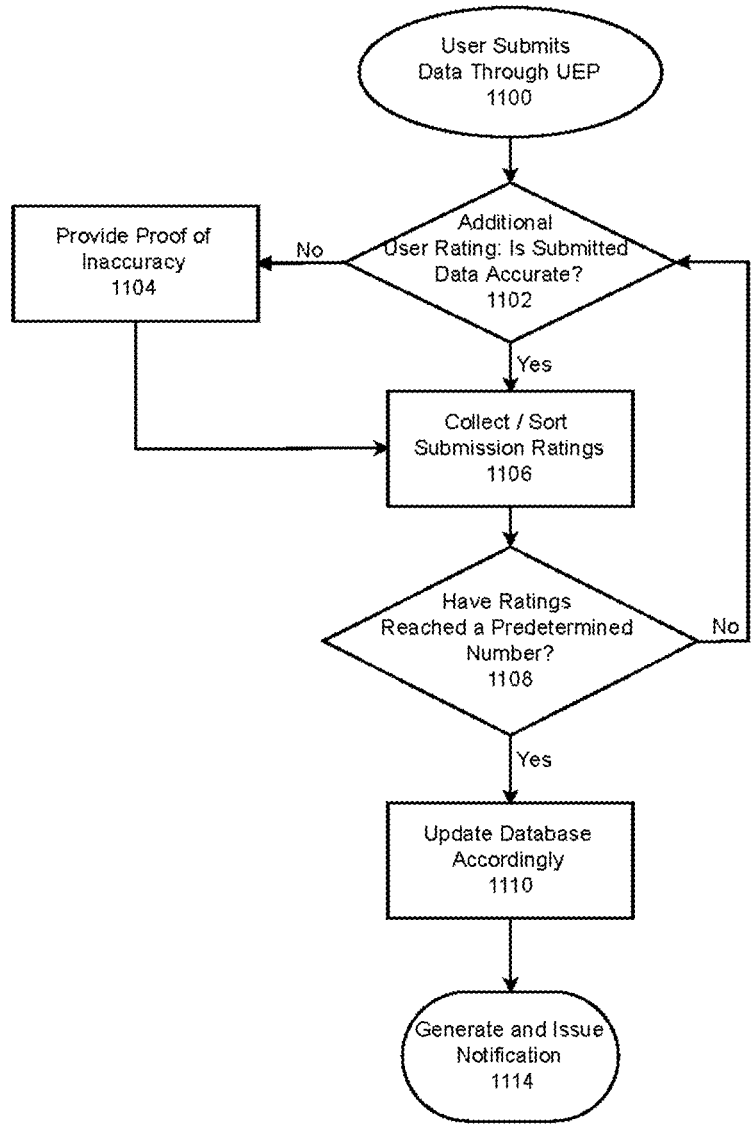
FIG. 11 is a flowchart illustrating a process of rating legal parking related data submitted using the user engagement panel and how those ratings of the submitted data affect the data within the database according to an exemplary embodiment of the inventive disclosure.

Referring next to FIG. 11, shown is a flowchart illustrating the process of rating legal parking related data submitted through user engagement panel 134 in accordance with an exemplary embodiment of the inventive disclosure, and how those ratings of the submitted data affect the data within database 106. The first step in this process might be the user submitting legal parking related data to user engagement panel 134 (Step 1100). This legal parking related data may include, for example, a parking sign or signage redesign regarding translation into a different language or clarification of content, suggestions on how to avoid parking violation citations, etc. That information may then be rated by other users. The user might be prompted to rate the data based on whether or not the submitted data is accurate (Decision 1102). User ratings (i.e., positive or negative) are collected and used to sort the contributed legal parking related data. If any user rates the submitted legal parking related data negatively as to its accuracy, that user has an option to provide proof of why that legal parking related data may be wrong (Step 1104). All submitted ratings, positive and negative, may be collected and sorted (Step 1106) by computing system 100 until a predetermined number of ratings (i.e., positive, negative) has been reached (Decision 1108).

If the number of ratings has not reached the predetermined number (Decision 1108), computing system 100 may continue to collect more ratings from other users (Decision 1102). If the number of ratings has reached a predetermined number (Decision 1108), then the additional legal parking related data may be used to correct, update, supplement, or modify database 106 accordingly (step 1110). Thus, correcting, updating, supplementing, or otherwise modifying database 106 may be from positive or negative ratings. Positive ratings may be used to replace or reinforce the data in database 106, and negative ratings may be used to identify or invalidate inaccurate data. Once in database 106, the contributed legal parking related data may be used to issue a relevant notification regarding that legal parking related data. For example, if the legal parking related data submitted to user engagement panel 134 was a suggestion on how to find a free parking space at a particular location, that suggestion or its data may be included within the notification that is relevant to that location and that is subsequently generated and issued to an applicable user (Step 1114).

The process by which database 106 is kept current involves, in part, a user rating the notification that the user receives. However, the user may only rate the notification if the user has firsthand experience. A user having firsthand experience is identified as a user who has received a notification with legal parking related data about a specific location by passing within a predetermined radius of that specific location. This radius may be set by default or preset by the user through the settings. For purposes of identifying the firsthand experience, remote computing device 132 capable of determining a location and transmitting the identified geolocation of the user having firsthand experience with such location to computing system 100 may be used.

This process can be illuminated through an example of a notification informing a user that there were no parking prohibitions in effect when in fact the user's parking location was subject to a temporary prohibition regarding street cleaning. In this case, the user may, on the user interface, rate the notification, e.g., provide a negative rating. A user may substantiate a negative rating by submitting proof that the notification was inaccurate. The user in this example may take a picture of the sign that announced when the street cleaning was in effect, or any other relevant signage. This feedback is collected along with the ratings, which may update database 106 to reflect the new user-submitted data. If the data that the user provides through this negative rating turns out to be accurate, it may be used to correct, update, and supplement database 106. However, the data or information provided by negative ratings would have to exceed a predetermined number to overturn a notification. If a negative rating and its corresponding information have not passed the predetermined number, the user's negative rating may be shown in the notification by including an indication that a small percentage of users have rated the notification negatively and/or as inaccurate. When those negative ratings do reach the predetermined number, the new information provided through those ratings may replace the existing relevant data in database 106. This in turn updates the content of the notification that is issued. In the above street cleaning example, if the user is the first to indicate that there is a relevant street cleaning regulation, and user engagement panel 134 receives ten more negative ratings saying that the notification in effect is incorrect, supported with information similar to or the same as the first user, then once there have been enough submissions or ratings, database 106 may be corrected, updated, and supplemented based on this corroborated information.

The number of submissions or ratings sufficient to be "enough" for purposes of correction, updating, supplementing or otherwise modifying database 106 may be a predetermined number (e.g., 10, 25, 35 ratings or submissions, etc.), or may be a predetermined percentage of total ratings (e.g., a 25%, 10%, or 1% negative rating threshold may trigger a data review), or may be based on some other predetermined information setting. The predetermined number of ratings may also differ based on location. In a busy location such as a central business district or downtown area, the density of parking violations and the demand for specific parking locations may be higher than in more rural areas. In addition, there may be more users sharing or rating the legal parking related data. Therefore, these different locations may have different standards for predetermining a number of ratings.

The positive ratings are used to verify that the data provided in the notification is accurate. When the notification reaches a certain number of positive ratings that may be predetermined, computing system 100 can confirm the validity of the legal parking related data that the notification is based on. If the notification that reaches a predetermined number of positive ratings is based on and inferred violation, such inferred violation may turn thus be determined to be accurate. When an inference is substantiated by a citation at some later point (e.g., a parking violation citation is issued at a certain time), that information regarding the inferred potential violation may be changed to reflect a direct application of database 106 data.

The user who is the first to provide corrective or new information through user engagement panel 134 that then is incorporated in one or more notifications that receive a predetermined number of positive ratings may be provided with a monetary or non-monetary reward or award for being the first to contribute useful information (e.g., information and/or data that reaches a predetermined number of positive ratings). This feature provides incentive to users to provide accurate and timely information, thereby keeping database 106 current and accurate. An incentive to the user is rewarding efficient and useful reporting of information to help other users. Incentives are useful in obtaining both active participation from one or more users and also for obtaining accurate and truthful information. Active participation is important because statistical analysis can be made more accurate with large groups of data and it is important to continuously obtain real-time data of current situations.

Additionally, incentives may be used to encourage reporting of legal parking related data by a user to correct, update, supplement, or otherwise modify the data in database 106. This incentive structure paired with an administrative quality control center may be used to ensure the quality and reliability of the data in database 106, as this data is subsequently used to identify potentially available legal parking and therefore needs to be kept to high standards of accuracy and reliability. Each data input, whether crowdsourced or sourced elsewhere, historical or real-time, may be assigned a unique tracking number, allowing at least the system administrator to track the data back to its original source if necessary.

For example, a reward or award may be issued to a user who reports ticket information at a location that has no prior ticket history of parking violations in the database 106, if that ticket is incorporated in the notification that reaches a predetermined number of positive ratings from one or more additional users having firsthand experience. The amount the user may receive may be the total amount stated on the user's ticket or an amount that is set by the system administrator according to the amount of positive ratings received for providing ticket information along with comments and recommendations on how to avoid parking violation citations. Through rewards a user may potentially incur no net losses from ticket violations and may also educate others to better comply with RRLC by sharing ideas to avoid future parking ticket violations.

The reward system may involve several steps. For example, in order to be eligible, the user may be required to be the first user to fully report new ticket information in detail for that specific location that did not have any prior ticket history by reporting the date; the time from the issued ticket with specific information on the reasons for the ticket; and giving beneficial suggestions, ideas, and/or advice on how to avoid the same violation. However, other users may be allowed to enter ticket information if a ticket for the same location indicates different reasons or violations which may qualify for a reward. The application may allow a user to take a photo of the ticket, which may be redacted or sharpened before submission as described. Each location may allow for the submission of one original ticket report which may allow one user to receive a reward. The system administrator may change the type of reward and/or amount of reward to different users who report parking ticket information by descriptions in different circumstances. For example, a reward for the first user may pay double amount of the reward or give a gift as a monetary reward. Also, a user who actively participates in supplying user-collected (i.e., crowdsourced) information may do so without expecting to be rewarded (i.e., by opting out of receiving rewards through settings in user engagement panel 134 or may simply decline a reward when one is being offered).

Additional users having identified firsthand experience may rate the data provided in the notification as a whole. If, however, an additional user having firsthand experience happens to agree with part of the data conveyed by the notification but disagrees with another part because the user finds the latter part being inaccurate, the user may rate the part he/she agrees with positively and the inaccurate part negatively. The user may then provide any information in support of a negative rating. Additionally, in the case where only a part of the data in the notification reaches a predetermined number of positive ratings, the user who was responsible for submitting that data through user engagement panel 134 in the first place may still receive an award but such award may only be partial. In the case where the inaccurate part of the notification receives a predetermined number of negative ratings, the data of that part may be removed from database 106. The dual process of rating of the data submitted through user engagement panel 134 as well as subsequent rating of the notifications allows for correcting, updating, supplementing, or otherwise modifying data in database 106. This may be the cycle that keeps the data in database 106 dynamically updated regarding any changes or inaccuracies.

Since a notification is short and meant to alert the user with quick, summarized information about the potentially available legal parking locations, the user may utilize the user engagement panel, including but not limited to a forum module, to obtain more comprehensive and detailed information from posts which include but are not limited to inquiries, responses, discussions, pictures, videos, written descriptions, and any other information that may be posted. The combination of receiving a notification and accessing a user engagement panel 134 may provide more useful and extensive information for a user because a notification provides quick, time-sensitive information while user engagement panel 134 provides the detailed, extensive information useful to gain full knowledge of the situation.

User engagement panel 134 may incorporate two aspects: a specific user engagement panel that connects to a specific location on the electronic map, and a general user engagement panel where a user may discuss general ideas not related to specific locations. The user can select a specific location or zone within the map display to choose "Panel," to access the user engagement panel, which may include different categories where information may be exchanged between users (e.g., Tickets Sharing; Questions or Answers or Comments; Parking Signs; and/or Other categories not included in the above, if any etc.), as shown in and discussed more specifically with respect to FIGS. 9A-9B and 10A-10B herein. The content that is automatically supplied in user engagement panel 134 might be based on the user's current location. The questions or answers or comments category may allow a user to ask any questions, input any answers, and input any comments related to legal parking related data for the location in addition to viewing all this information contributed by other users. The parking signs category may allow a user to exchange information regarding parking signs, such as redesign of a parking sign regarding, or translation to a different language or clarification of content. Other categories not included in the above may be added or deleted at the discretion of the system administrator. When a user might have an inquiry regarding legal parking related data for a location, the application may allow the user to post such inquiry using user engagement panel 134 to obtain more information. The terms "general" user engagement panel or "specific" user engagement panel is meant for identification purposes only, in order to distinguish the type of information that is conveyed. The terms are not intended to limit the scope to a particular kind of device, application or system. In fact, the name "general user engagement panel" and "specific user engagement panel" can be changed by a user or by the system and the name of the user engagement panel can be labeled as a forum, section, part, or even re-named as "Panel A" or "Panel B," for example. No matter what name is used, the purpose to identify the portion of the system and the functions that it performs under the user engagement panel remains the same as disclosed herein in the inventive disclosure.

User engagement panel 134 may also be accessed for content in other areas. For example, this may refer to a user in one location who intends to rent a truck to move to another town in a different part of the country. The user might like to see legal parking related data applicable to a certain area where the user intends to unload the truck. Since a truck is often considered a commercial vehicle, and different areas might have different regulations regarding parking and unloading a commercial vehicle in the street, it might be convenient for the user to become familiar with legal parking related data applicable to that certain area in advance. It is to be understood by one of ordinary skill in the art that this is one example out of many possible reasons a user may want to access user engagement panel 134 content for areas other than the user's immediate surroundings.

The user may also be allowed to do a general search for potentially available legal parking locations in the specific parking zone within user engagement panel 134 and may further search according to type of vehicle or type of vehicle plate. According to an embodiment herein, there are different formats to identify the density of previously issued parking violation citations at specific locations. For example, the higher the density of issued parking citations in any particular location, the darker the color. This format is applied for both broad and narrow geographic areas; whether that area be a borough or a street. Furthermore, this format identifies a fluctuation in number of issued parking violation citations based on the time of day. Additionally, the parking spaces may be indicated by different formats, such as different colors or shapes. For example, a solid red line would represent that the space is illegal, whereas a dotted red line would represent a legal parking space but is occupied by another user; green color between the dotted lines would represent an available legal parking space. The user or users who view this information might be split into two categories: commercial vehicle users and non-commercial vehicle users. Each type of user might view a different format at least related to the type of vehicle that they are driving or type of vehicle plate they have and can further categorize into different vehicle type or different type of vehicle plate. For example, users in commercial vehicle user types may see a green format for a particular location to indicate that legal parking is available, while users in non-commercial vehicle user types may receive red color format in the same areas as the commercial users to indicate that the parking is illegal because that location is restricted for non-commercial use.

Different formats, such as different colors or shapes, may be utilized to indicate and differentiate legal parking data. However, in one embodiment, there may be at least three formats used to display at least legal parking related data. These formats may include potentially available legal parking, complete illegal parking, and occupied or unavailable parking. A user may choose to display one of the formats, all of the formats, or any combination of two formats. The system may automatically display at least one or more of the above formats. These formats and the information associated with these formats may be dynamically changing based on the data in the database. For example, at one minute in time a parking location may be illegal for a particular user type due to street cleaning, but the next minute that parking location may be legal for the user type because the street cleaning is over. Similarly, at one moment a parking location may be occupied, but only shortly thereafter, the same parking location may be available. This information is dynamically changing, therefore the database is dynamically updated and changing the at least three formats. Such data may be changed according to the time of day, location, etc. To view this data on the electronic map display, the user may input a specific location along with current time, a time frame, and/or a certain point in time or a period of time in the future and is presented an electronic map on their mobile phone. This helps the user save time and resources by not having to first drive to the location itself in order to ascertain whether legal parking is available. If, for instance, the user is able to see on the map that at the same time tomorrow the possibility of finding legal parking at the same present location is not available because alternate side of the street parking rules are in effect, the user may simply plan to go to another location with prior knowledge of available legal parking.

In essence, the user may view potentially available legal parking for the current time, a time frame, or a certain number of hours in the future at any location and at any time, for example by hour or half hour increments and, if parking is illegal, choose an alternative legal parking location. Therefore, the user may look into the current situation or the future situation at the location for when the user expects to arrive at the intended destination. The information on the charts can be changed depending on if the user indicates he/she is driving a non-commercial vehicle or a commercial vehicle. The user may also press on a specific location within the electronic map display of the mobile application to view this information.

If the self-search does not result in an answer that satisfies the user, the user may have the option to post inquiries in user engagement panel 134 regarding a specific location or area. By educating other users through sharing at least their own legal parking related experience, users may be more conscious of their parking actions, which may help in compliance with legal parking.

An exemplary embodiment of the inventive disclosure may use a third-party service and/or API, for example, GOOGLE TRANSLATE, which is a language translation service provided by Google, a subsidiary of Alphabet Inc., or the system administrator may hire professionals with expertise in parking compliance and also competent translators to translate the content to different languages or provide explanations in plain English. A user may also translate information, which may be subject to positive and negative ratings.

Another exemplary embodiment of the inventive disclosure of the application may also connect to a third-party electronic map, for example, GOOGLE MAPS, to provide a street view function on user engagement panel 134 for specific places with a high number of previously issued parking violation citations. Other media, for example, photos, videos, etc. for the location may also be provided by a user or employee of the system. This is especially useful for those locations with a predetermined number of violations where more information should be provided or for those locations where a user may be unfamiliar. The user's privacy or the public's privacy may be protected when uploading photos, videos, etc.

Although government websites may provide information on locations and the applicable rules for parking signs, the data might not be complete or may be unavailable. Therefore, user engagement panel 134 allows for user reporting of parking sign information, which may be used in identifying potentially available legal parking locations by precluding illegal parking locations.

A user can also upload legal parking related data to the user engagement panel, for example, parking violation citation data. There may usually be two types of tickets: either a handwritten or machine-generated ticket from a law enforcement officer or a machine-generated ticket from a street camera image. Different law enforcement agencies may also use different forms for ticket violations. Any user reported information may include the information such as location, time, reasons, and also any suggestions, advice and/or solutions the user can contribute in order to share knowledge to educate other users to avoid the same type of violation again. The person who receives the ticket may be in the best position to submit suggestions, advice and/or solutions based on firsthand experience.

A user may also use user engagement panel 134 to post a picture of a parking or street signage at a specific location and ask about the plain language of the sign. Drivers often experience difficulty in understanding parking signs, especially when there are multiple signs for different parking rules. In addition, many drivers might not have a strong command of the meaning of the signage language, which leads to further difficulties in interpreting the signs. Therefore, user engagement panel 134 may provide information on the parking signs associated with a specific location and translate these parking signs not only into another language, but also into easy-to-understand, plain-language terms. Since some parking signs are confusing, a user may participate in redesigning them to make new designs. A user may create redesigns or translate traditional parking signs to different languages to be more understandable. Their design images may be subject to a rating system, where the top-rated design may remain at the top of the list so other users can view and easily understand the meaning of the signs.

User engagement panel 134 may also allow a user to update parking restriction conditions to indicate for example, the condition has been changed temporarily or permanently, etc. The government agency or law enforcement agency, such as the police department may release information on their websites or post a temporary notice on the street regarding a temporary notice of "No Parking" areas on certain streets for certain time. Temporary notices also include no parking notices due to some special events, for example gatherings, road repairs, movie productions, etc. However, people might not know of or might not necessarily see these notices posted on the parking sign or the notices might not readily be apparent. When a user parks his/her vehicle, the user may be notified by computing system 100 of any applicable temporary notices.

When a user discovers the information, the user can report the notice to user engagement panel 134 and upload a picture of the notice, whereby database 106 may apply the stated parking rule to the whole street. As a result, a user who has parked his/her vehicle on the applicable street during the applicable time frame and/or distance frame restrictions or who has indicated in the settings that he/she wants to receive a notification for any temporary notices on the street may receive a notification. Computing system 100 may prevent this user from potentially receiving a ticket or being towed away since the notification may warn the user of the temporary notice. This reporting method may also be applicable to other situations where any RRLC may be updated if database 106 does not detect it by itself. A user may submit and upload any relevant information through various media that include but are not limited to: photos or images from cameras, sensors, videos, hand drawn pictures, written descriptions, and any other mediums to accurately describe the situation for the location through the user engagement panel. To encourage a user to report the discovery of any changes in RRLC, a user may earn rewards. The system administrator may also hire employees or third-party contractors to report the temporary notices so a notification may be sent to the user.

Reported information may be subject to review and/or ratings by the system administrator and also other users to ensure that credible information is being collected to provide a notification. Comments, suggestions, etc. may be listed in user engagement panel 134 according to ratings, and the ones with the highest number of positive ratings may be listed at the top, so other users can clearly view the posts that are rated as the most accurate. The user may be allowed to report to the system administrator any potentially inaccurate information with applicable proof. The system administrator may be able to open a case where an employee and/or user may be sent to conduct an investigation of the purported inaccurate information to verify the quality of the information.

In addition, when legal parking related data is identified as time-sensitive, whether submitted through user engagement panel 134 or collected from another source, the system administrator may be given the discretion to immediately incorporate this time-sensitive data into a notification, because there may be a need to notify a user as soon as possible, such as in the case of a temporary notice or a tow away zone, and because some information regarding a time-sensitive prohibition may be preferable to no information. In this scenario, the time-sensitive data may not need to reach a predetermined number of positive ratings prior to being incorporated into a notification. If a notification with time-sensitive legal parking related data reaches a predetermined number of negative ratings, this time-sensitive data may be removed from database 106.

Figure 12:
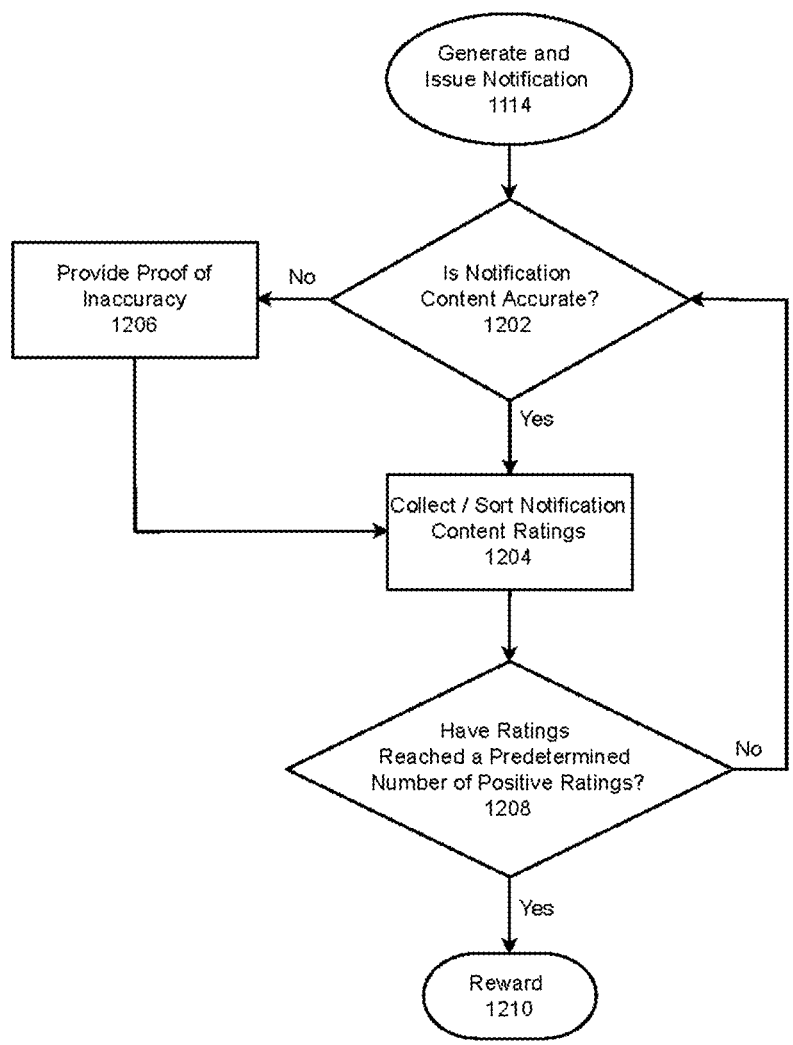
FIG. 12 is a flowchart illustrating a process of rating a notification according to an exemplary embodiment of the inventive disclosure.

Turning now to FIG. 12, shown is a flowchart illustrating a process of rating a notification in accordance with an exemplary embodiment of the inventive disclosure. Once a user's intent to park is identified, the system may use legal parking related data contained within database 106 to generate and issue a notification (Step 1114) according to the process described herein. A notification may be in part based on the legal parking related data from an informational source, or it may be in part based on legal parking related data from a submission to user engagement panel 134 which received enough ratings to be incorporated into a notification as described in FIG. 11 herein. In any case, this information allows the user to park knowing the parking rules that apply to the current parking location.

After a notification is generated and issued (Step 1114), the user having firsthand experience may judge on whether the content of it was accurate by rating it (Decision 1202). If the user rates the content of notification positively (e.g., that the notification was accurate), the system may collect and sort the notification content ratings (Step 1204). Accordingly, accurate data that leads to an accurate notification may be reinforced and otherwise kept in place. If the user rates the notification content negatively (e.g., that it was inaccurate either in part or in whole), the user may then provide proof of why the notification was inaccurate (Step 1206). A negative rating may be given to the content of a notification when, for example, the parking prohibitions in effect for a particular location are in fact different from those cited in the notification, such as incorrect timing or day of the week information. In the case where the notification does not accurately reflect the parking rules, a user would submit a picture of the parking sign or another type of evidence as proof of that notification's inaccuracy in that situation. The ratings, both positive and negative, are recorded and collected until a certain type of rating has reached a predetermined number (Decision 1208). If the number of ratings does not reach the predetermined number, the system continues to collect and sort notification ratings. If the number of ratings reaches that predetermined number, then a monetary or non-monetary reward may be issued to the user who first submitted legal parking related data contained in the rated notification (Step 1210).

After a notification has been issued, of the system receives feedback about the notification's accuracy from a user to correct, update, supplement, or otherwise modify legal parking related data within database 106 in accordance with an exemplary embodiment of the inventive disclosure. When a user is approaching a specific parking location that computing system 100 has identified as a potentially available legal parking location for that user, then the computing system 100 may issue a notification to the user to park. After that, three different situations may occur. First, the notification issued by computing system 100 is inaccurate, where the user parks and finds out that a parking violation may potentially be issued. Second, the notification issued by computing system 100 is inaccurate, where the user parks and receives a ticket. Third, the notification issued by computing system 100 is accurate and the parking location is indeed legal, where the user parks and does not receive a ticket. In the case that the notification is inaccurate and a user finds out that a potential parking violation may be issued, the user may proof of inaccuracy through the user engagement panel that may be subject to ratings collected from additional users having firsthand experience. In the case that the notification is inaccurate and the user receives a ticket, the user may submit the ticket through the user engagement panel, which may also be subject to ratings from additional users having firsthand experience. If the user's submission reaches a predetermined number of ratings, computing system 100 may update or otherwise modify the data in the database along with any corresponding notification and issue a reward to the user who made the submission (e.g., with payment equal to the amount of the citation received). Alternatively, however, the computing system may wait until the notification updated or otherwise modified by the user's submission reaches a predetermined number of ratings and only then issue a reward as described in FIG. 11 starting with step 1110 and further in FIG. 12.

Figure 13:
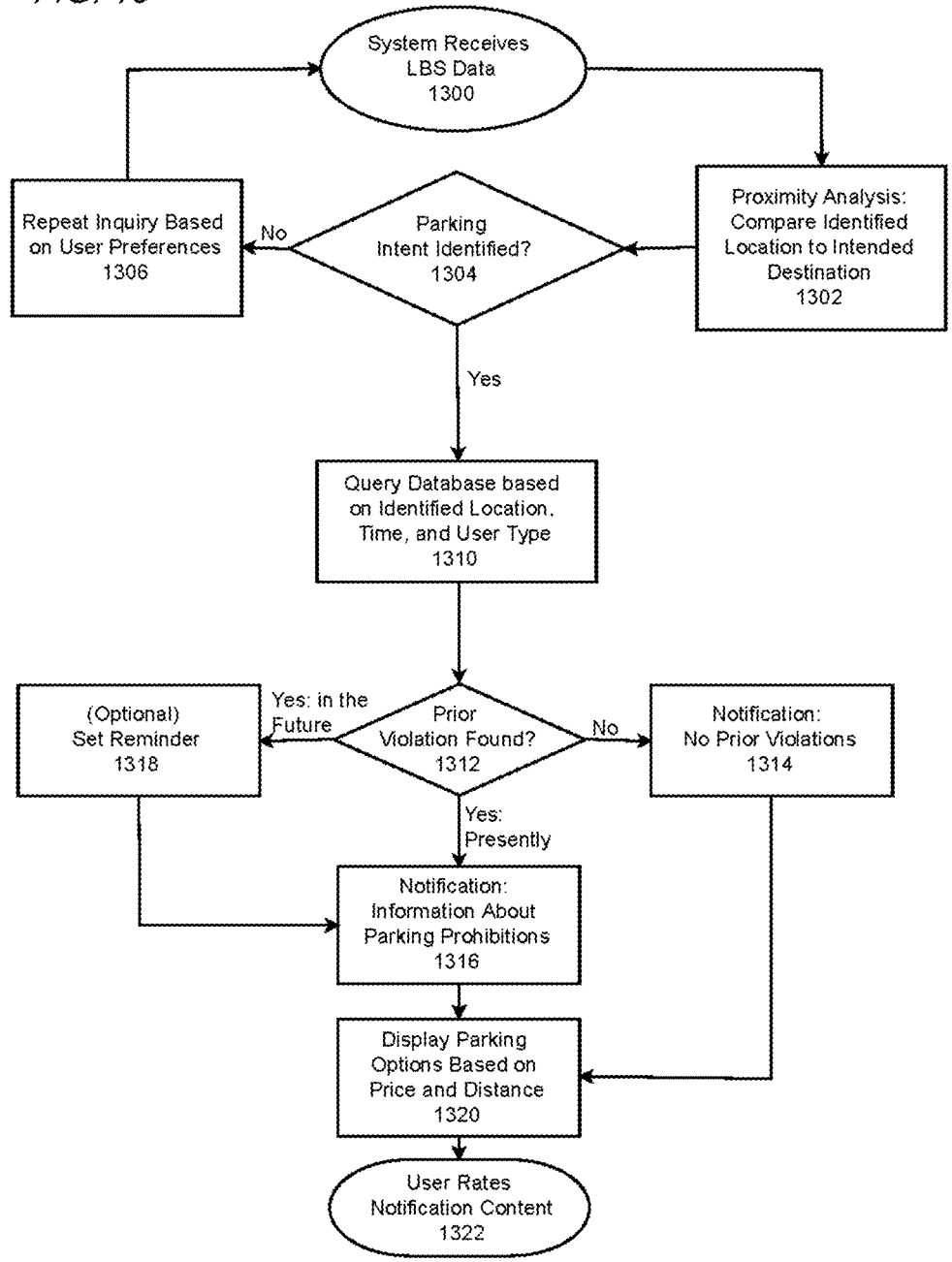
FIG. 13 is a flowchart illustrating a process of alerting the user to potentially available legal parking, among other things, based on the data in the database according to an exemplary embodiment of the inventive disclosure.

Next, FIG. 13 is a flowchart illustrating a process of alerting the user based on the data in the database 106 in accordance with an exemplary embodiment of the inventive disclosure. The location coordinates (e.g., location data from a location-based service (LBS)) of remote computing device 132 may be periodically transmitted to and received by computing system 100 (Step 1300). Computing system 100 can then compare the identified location to the intended destination of the user (Step 1302). If the user is close enough or otherwise indicates a desire to park (e.g., within a predetermined distance, moving at a certain speed, inputs a certain command), computing system 100 may attempt to identify parking intent (Decision 1304). If no parking intent is identified, computing system 100 may repeat the parking query based on the user's preferences (Step 1306) (e.g., a user may only want two notifications asking about parking intent). Computing system 100 may continue to receive location data from remote computing device 132, in addition to data such as the vehicle's location and speed.

Once parking intent is identified, computing system 100 may correlate the information it has received with the current time. Database 106 may be queried by computing system 100 based on the identified location, the present time, and the user type (Step 1310) to determine if there is any applicable prior parking violation within an impact zone (Step 1312), in order for computing system 100 to preclude potentially illegal parking locations. Where it is determined that database 106 does not contain data of prior violations for that location, then the user may be issued a notification that the user may park at that location if it is available (Step 1314). Where it is determined that citations have occurred at the location and are applicable to the driver's user type and to the present time/day, then a notification may be issued to the user about applicable parking prohibitions that apply (Step 1316). Where it is determined that citations have occurred at the location at a time or day or there are prohibitions that might be applicable in the near future (e.g., within a period of time that the user is to be parked for), then an optional follow-up notification or reminder may be set (Step 1318), so that the user may be provided by computing system 100 with a notification (Step 1316) at a later time to remind the user of the need to leave the parking location prior to potentially receiving a parking violation citation.

Additionally, available parking options can be displayed to the user based on the user's preferences or on a default regarding the price and/or distance from the identified location (Step 1320). Computing system 100 may obtain ratings from the user (Step 1322) as to whether the notification he/she received is accurate. Optionally, the system may be configured to automatically provide an alarm or other alert to the user once parked to indicate that the user is parked in an illegal parking location.

Figure 14:
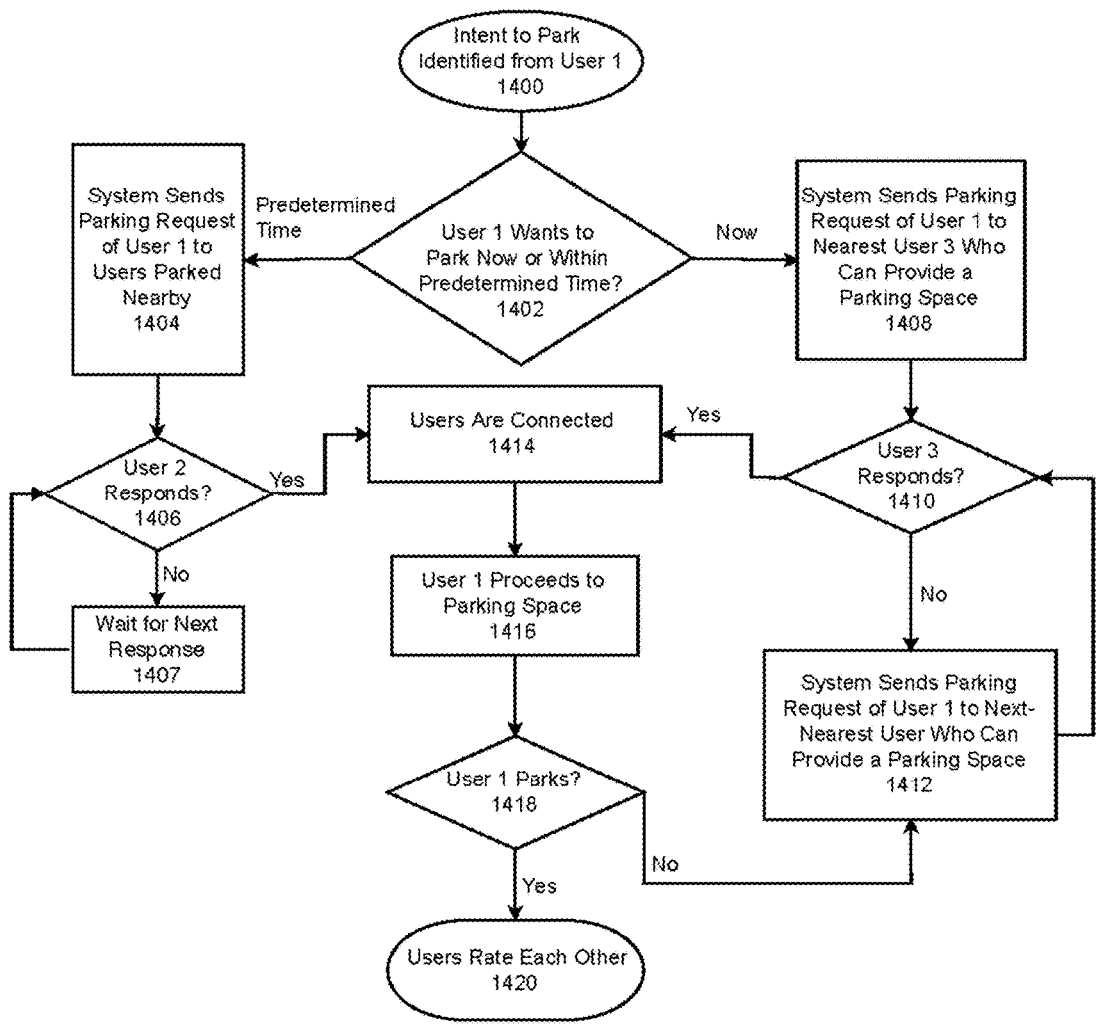
FIG. 14 is a flowchart illustrating an approach for users to post a request for a parking space to find another user about to vacate or might be willing to give up a parking space to the user according to an exemplary embodiment of the inventive disclosure.

The system can be implemented so that a user can either submit a request or receive an offer for a parking space. FIG. 14 shows a flowchart illustrating an approach for users, using the system of the inventive disclosure, to post a demand or request for a parking space in order to find another user who is about to vacate or might be willing to give up a parking space to the user in accordance with an exemplary embodiment of the inventive disclosure. When parking intent is identified for User 1 (Step 1400), computing system 100 can send an inquiry to User 1 about whether User 1 would like to park now or sometime in the near future (Decision 1402). If User 1 wants to park in the near future, then the computing system 100 can send User 1's parking request to other users who are parked nearby (i.e., within a predetermined range) based on User 1's current, identified, or desired location (Step 1404). The system may determine if there is a first User 2 who responds to User 1's request (Decision 1406). If so, User 2 may be connected with User 1 and subsequently may allow User 1 to park at his/her parking space (Step 1414). Optionally, User 1 may be provided with more than one (1) users responding to User 1's request so that User 1 can choose from a plurality of nearby parking locations. The definition of "nearby" may be based on the user's preference or on a default. If there is no user who responds, the parking request may continue to be sent to users parked nearby for a predetermined amount of time to wait for a response (Step 1407).

If User 1 needs to park immediately, then computing system 100 sends User 1's parking request to the nearest User 3 who can provide an available parking space (Step 1408). User 1 then waits for User 3 to respond (Decision 1410). If User 3 does not respond, then the request goes to the next closest User 3, until the request is accepted or expires (Step 1412). If a User 3 accepts the request, then the users are connected (Step 1414). When User 3 (or the next available user who responds) responds, User 1 and User 3 are connected (Step 1414). User 1 might then drive to the parking space (Step 1416) and attempt to park. If User 1 cannot park because User 3 (or whoever accepted the request) does not eventually leave the parking space (Decision 1418), then User 1 may have to repeat the process, or may just wait and park at the parking space after User 2, 3, and so on, leaves the parking space. Once parked, the users can rate each other (Step 1420). In such an embodiment, computing system 100 may be configured to provide a plurality of legally parked users with the option to indicate a location where they are legally parked and a time at which they may be vacating the legal parking location.

In another embodiment, the system may send a parking request of User 1 to the nearest user within a predetermined distance who can provide a parking space. If that user declines or does not respond, the system may send the parking request to the next-nearest user within a predetermined distance who can provide a parking space. If no users respond to the parking request, the system may expand the predetermined distance for which to send the parking request to additional users.

Indicating parking intent may prompt computing system 100 to lock the user's location and to send a notification to the users who have the intent to leave and may be matched with the original user who wants to park. Indicating leaving intent might also prompt computing system 100 to lock the user's location and to send a notification to the users within a certain radius or distance of the user who has the intent to park. Either indication of parking intent may allow any potential providers to send offers with relevant parking space information to the user who is trying to find a parking space. Matching users may make full use of the social media feature as users are connected in order to successfully send and receive offers within the platform of the system. Additionally, another purpose of matching and connecting users with parking intent or leaving intent is to allow users to communicate with other users with a specific purpose without having users randomly approach or drive around to ask if drivers are leaving. This method may be more time efficient, as users might approach other users with a specific purpose of assisting each other. Socially connecting users also promotes future transactions between the users due to prior successful parking transactions. Users may be able to control whether or not they receive these notifications by either turning this function on or off in the settings of the system. Social connections are also helpful because the government may not allow for the exchange of parking spaces for a user's monetary gain. However, if allowed by law, the system may also allow for monetary payment and/or non-monetary rewards as a consideration option for accepting parking related information.

Figure 15:
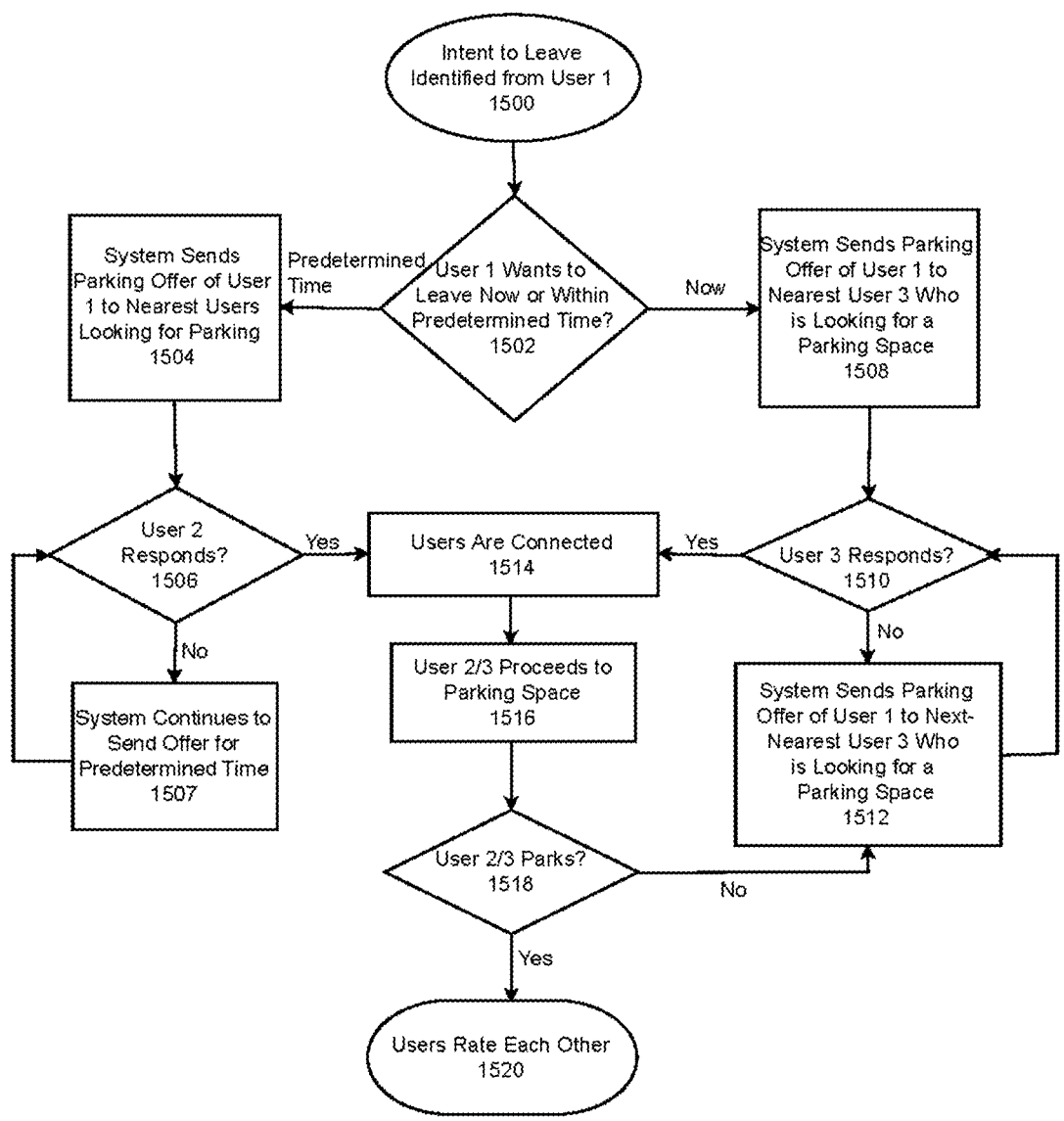
FIG. 15 is a flowchart illustrating an approach for users to post an offer for a parking space to find another user looking for available legal parking and willing to accept the offer of a parking space according to exemplary embodiment of the inventive disclosure.

Similarly, FIG. 15 shows a flowchart illustrating an approach for users to post offers for a parking space to find another user looking for available legal parking and willing to accept the offer of a legal parking space in accordance with exemplary embodiments of the inventive disclosure. As discussed above, exemplary embodiments of the system and method of the invention may be used to find a match and/or generate a notification when a User 1 shows intent to leave his/her parking space (Step 1500). After computing system 100 receives User 1's offer of an available parking space, it determines if the offer is for now or within a predetermined time (Decision 1502). If User 1 is offering a parking space at some later predetermined time, then the computing system 100 may send User 1's offer to other users located nearby (User 2) based on the identified location (Step 1504). The system may determine whether a first User 2 responds to the parking offer (Decision 1506). If so, the first User 2 to respond may then be connected to User 1 to discuss being able to park at User 1's parking space (Step 1514). If there is no user who responds, the system may continue sending the parking offer to nearby users for a predetermined amount of time to wait for a response (Step 1507).

If User 1 is offering his/her parking space now, then the computing system 100 may send User 1's offer to the closest other user (User 3) who is looking for a parking space (Step 1508). If the nearest User 3 does not respond (Decision 1510), then the offer may be sent to the next closest User 3 until the request is either eventually accepted or expired (Step 1512). If a User 3 responds to the offer, then User 3 may connect with User 1 (Step 1514). After connection, the computing system 100 may send the parking space location to User 3 who accepted the offer, allowing him/her to drive to User 1's parking space (Step 1516) and wait for the space to become available by User 1 leaving. After User 1 leaves and/or User 3 parks (Step 1518), the users can rate each other (Step 1520). The system may also be configured to issue monetary or non-monetary awards or rewards to users giving up their legal parking spaces through the system. Alternatively, the system may be configured to enable User 1 to compensate User 2 or 3 for giving up their legal parking space through the system.

In another exemplary embodiment of the inventive disclosure, a user (e.g., User 1) may post a demand or request for a continuous parking space for duration of 10 hours and an amount he/she is willing to spend (e.g., $15) in a neighborhood. Those who have the authority to manage parking spaces or parking garages/facilities in that neighborhood and are registered with the system, may see this demand or request, and based on their own availability, pricing, and/or other factors affecting parking space availability, may make an offer to User 1 with details on how long they can provide a space, pricing information, and the location of the parking space/garage. Alternatively, another user, for example User 2, may see User 1's demand and offer User 1 a space at User 2's garage to negotiate for $20 for the 10 hours. A third user, for example User 3 may offer User 1 a space at User 3's garage in another nearby neighborhood, for $10 for the 10 hours. User 1 may have several options when viewing these offers. User 1 may, for example, decide to message User 2 or 3 to make a counteroffer and negotiate the terms of the pricing or duration depending on User 1's needs. For example, User 1 may ask for a cheaper price from User 2 because User 1 would prefer to make a deal with User 2 since User 2's garage may be in a more convenient area for User 1. Accordingly, users may communicate back and forth until the terms are agreed upon by both parties. Final prices can be kept confidential and the deal may not be disclosed to any third parties. User 1 can also decide not to answer these offers and wait for other possible offers from other users. Additionally, whichever user accepts User 1's offer first may complete the deal and all other users may be precluded. If no other users accept the offer, then the cycle may begin again where User 1 can initiate another demand with a different price, which may create an acceptance from another user, resulting in a successful deal. Communications within the system of the mobile application between the user who needs a parking space and the users who can provide a parking space includes but is not limited to, live-chat, messaging, and any other form of communication as allowed by the Administrator of the proposed Application.

Intent of the user to leave a legal parking space may also be identified by determining and analyzing the speed and location through accelerometer 218 and location identifier 204, respectively. When computing system 100 detects motion after a vehicle has been in park, it may track the geolocation of each individual user along with the vehicle and/or user's speed, in which a change in acceleration or change in location can trigger the system to recognize leaving intent. Based on the change in acceleration and change in location, the system may then send a notification to the user to ask if the user is leaving a parking space, for example, "Leaving?" If the user chooses "Yes" then the system may find other users within a certain radius of the current user's location who are showing parking intent or users who request to be connected because they are looking for parking. However, if the user does not respond to the alert after a certain time, for example, 3 seconds then the inquiry may disappear automatically. Users may also press a button on the screen of the mobile device to show leaving intent and specify that the user is leaving now or leaving at a certain time in the future.

Figure 16:
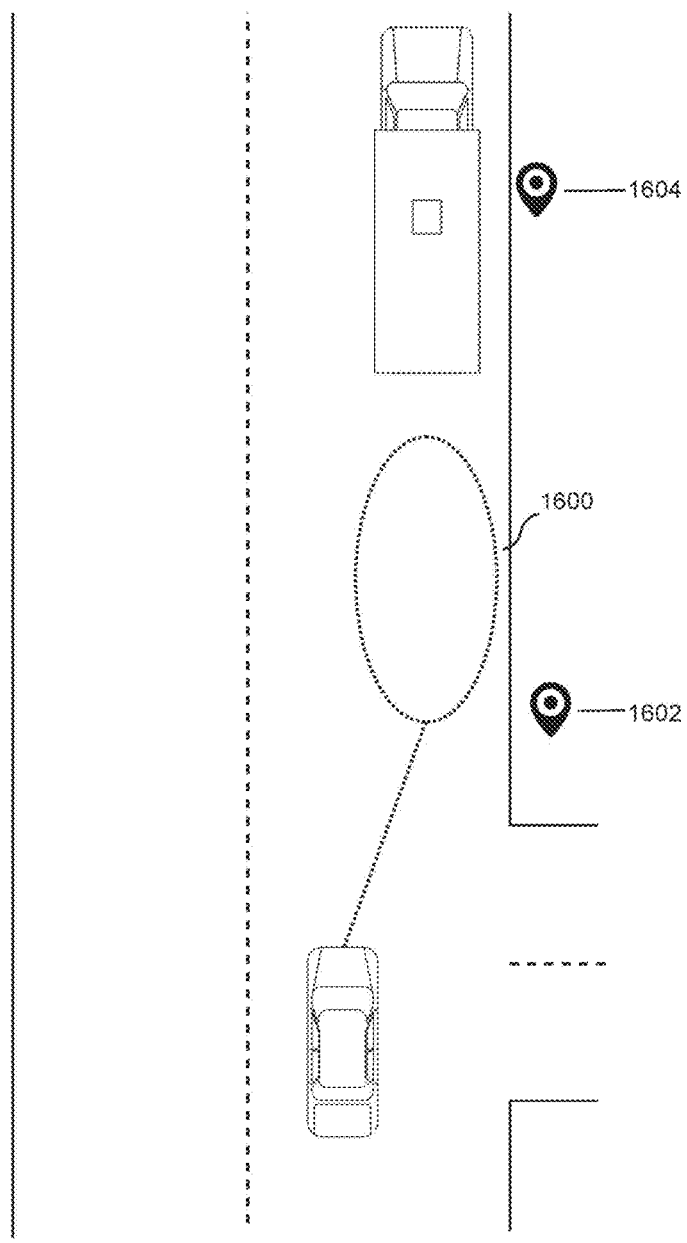
FIG. 16 is a schematic diagram illustrating a system for inferring a potential parking prohibition based on location according to an exemplary embodiment of the inventive disclosure.

Computing system 100 may also be configured to infer potential parking prohibitions based on certain relevant data stored in database 106. In FIG. 16 shown is a schematic diagram illustrating a system for inferring a potential parking prohibition based on a location in accordance with an exemplary embodiment of the inventive disclosure. Here, computing system 100 may infer a parking prohibition based on location to preclude that location from potentially available legal parking locations. Computing system 100 may analyze legal parking related data that is available in database 106 for the surrounding locations and compare such data with RRLC. If the intended parking location 1600 of the user falls between at least two locations, 1602 and 1604, with a record of previously incurred parking violation citations applicable to the user type of the user, computing system 100 may infer that the user may receive a parking violation citation at that intended parking location 1600. This may cause the parking location to be precluded from being displayed as a legal location. Each of the two previously incurred parking violation citations may be based on the same reasons, and those reasons may correspond to the inference. Those reasons may be for the same parking violation citation, such as parking in a No Parking Any Time zone. An inference might not be made accurately if, for example, one parking violation citation is for an expired meter fee while the other parking violation citation is for parking in a loading zone. Furthermore, some parking violation citations may not be the basis of an inference such as a parking violation citation issued for the reason of an expired meter.

The distance between locations where the intended parking location falls may depend on various factors. One factor which may affect the distance between those two locations may be what RRLC applies and based on parking violation data. The computing system 100 may predetermine this distance based on the applicable RRLC. In addition, the distance may be predetermined based on location, where the distance in a denser city with higher instances of parking violation citations may be smaller than that of a rural area with low instances of parking violation citations. The predetermined distance between locations may be on the same side of the street on a city block, or it may be a shorter predetermined distance between locations. Based on the inferred prohibitions of parking violation data, one or more locations where it would be illegal for the user to park can be precluded from being listed as potentially available legal parking.

In order to preclude illegal parking locations for purposes of notifying a user of potentially available legal parking locations, illegal parking locations that are applicable to at least the user type that the user belongs to need to be identified first. There may be an occasion when computing system 100 may find a parking violation by directly correlating the user type with the present location and the present time in mining database 106 for legal parking related data. A direct correlation may be in such a case where there has been a parking violation citation issued at the current location at the current time, which was issued based on a parking prohibition relating to the same user type and relating to the same type of vehicle or type of vehicle plate. For example, a direct correlation may be when a non-commercial vehicle user is given a notification that warns against parking at Location X at 5:15 PM on a Tuesday because there is data in database 106 which matches the situation: a non-commercial vehicle receiving a parking violation citation for parking at Location X at 5:15 PM on a previous Tuesday. At least these three points—type of vehicle, location, and present time all correlate directly, as the two times (e.g., 5:15 PM) occur at identical points in time. In this instance, a potential parking prohibition does not need to be inferred, as there is an exact data point which establishes the basis for the notification.

Since violation codes may be different depending on the agency that issues tickets and collects ticket penalties, violation codes data input into database 106 may include violation codes from various agencies and/or statutory codes as they appear when written into law. Computing system 100 may use these violation codes with the matching section codes and their respective meanings, which are stored in database 106, to infer the time frame and distance frame to which the no standing rule applies as no standing is usually for 24 hours and may extend for a whole street block. If a user does not participate by reporting, then the system administrator may hire an employee to physically inspect the location and verify the distance frame. Computing system 100 may use this information to accurately alert the user based on the vehicle's distance or time frame. Though inferences might not be one hundred percent (100%) accurate all the time, as there are sometimes exceptions to rules on a certain street between two similar locations, the combination of knowing the codes that underlie the reasons for getting a ticket in the first place and having a user rate the notification and the information allows for that potential inaccuracy to be accounted for. Tying a notification back to user engagement panel 134 may increase efficiency and accuracy, allowing the notification to be corrected, updated, supplemented, or otherwise modified, as well.

In addition to precluding locations which are identified to have data of one or more potential parking prohibitions either directly applicable to the user or applicable by inference, the central processing unit may be configured to preclude locations in or near a tow zone area which includes but is not limited to private parking only, permit only, temporary road repairs, access for emergency services, and driveways which cannot be blocked. Other situations may include handicapped parking, reserved parking, permit parking only, and any other parking spaces designated for special purposes, wherein special purposes parking locations may be reported by one or more users, interested individuals, private entities, and the system administrator who may also collect such information from sources. "No parking," "Tow away zone," "24 hours active driveway," etc., are usually indicated with lines, signs and/or words that state for example, "Tow Zone" or "Private Parking Only." Tow away zone information may include a time frame when parking is illegal at an identified location of the user and the user's vehicle; the distance to or from the tow away zone where parking is illegal; and information about private and public tow away zones, along with relevant information about towing companies and costs and penalties associated with the user's vehicle being towed away.

People who are authorized to manage such spaces subject to towing can register towing information, or a user can report this information, which may be used by the computing system 100 to notify other users who are not authorized to park in the space at any time. Important towing information includes but is not limited to location of the tow zone, towing company name and telephone number, penalty for parking in the tow zone, and other relevant contact information. The user may check the parking location by pressing a button on the display of the computing device 132 to show the towing information such as the phone number, towing penalties, and other contact information if it has been registered by the people who are authorized to manage or access such tow zone space. Both time and resources may be saved because a user is deterred from parking in the tow zone. Tow zone areas may also be indicated on the map display through different colors to reflect that temporary parking is not allowed, for example, due to a temporary tow zone notice for road repairs.

Potential parking prohibitions directly applicable to a user are predicted based on parking violation related data including a location identical to an illegal parking location, parking violation related data including a point in time identical to the present time, or parking violation related data including a location identical to an illegal parking location corresponding to a point in time identical to the present time.

Alternatively, computing system 100 can predict potential parking prohibitions applicable to the user by inference based on at least relevant parking locations, relevant parking times, or relevant parking locations corresponding to relevant parking times. Based on relevant parking locations, computing system 100 can predict potential parking prohibitions applicable to the user from at least two relevant parking locations corresponding to one parking time, where each of the two relevant parking locations has at least one previously issued parking violation citation. In this situation, the illegal parking location is between the two relevant parking locations, and the two parking locations are at a predetermined distance from each other.

Computing system 100 can also predict potential parking prohibitions applicable by inference based on at least two relevant parking times corresponding to one relevant parking location. Here, each of the two relevant parking times will have at least one previously issued parking violation citation, and the present time is between the two relevant parking times and the two relevant parking times are within a predetermined time frame. This time frame may be based on a point in time such as a time of day, a time of week, a time of month, or a time of year. In this situation, the illegal parking is at a location with at least two relevant parking times.

Additionally, computing system 100 can predict potential parking prohibitions applicable by inference based on at least two relevant parking locations corresponding to at least two relevant parking times. The illegal parking location of the user here is between at least two relevant parking locations at a predetermined distance from each other corresponding to the present time being between at least two relevant parking times within a predetermined time frame. Also, computing system 100 can predict potential parking prohibitions applicable to the user by inference based on at least previously issued parking violation citations for the same type of parking violation from an issuing agency.

To identify potentially available legal parking locations, computing system 100 may also preclude occupied parking locations as well as parking locations which are predicted to have potential parking violations from being considered as potentially available legal parking locations. Thus, based on the parking locations that are precluded, the remaining parking locations are identified to be potentially available legal parking locations. Thus, in one scenario, if potential parking violations are predicted at a specific location at a certain time or within a certain time frame, the computing system may infer that at all other times not including that certain time or at all other times outside that certain time frame, that specific parking location is a legal parking location. For example, if the only potential parking violations are predicted at a location from 7:00 AM to 7:00 PM, then the computing system may infer that from 7:01 PM to 6:59 AM the same location may potentially be a legal parking location. In another scenario, if potential parking violations are predicted at the identical time or within an identical time frame for at least two relevant locations, computing system 100 may infer that locations that do not fall in between these at least two relevant locations and that do not have any violation at that identical time or within that identical time frame, may potentially be legal parking locations at that identical time or at that identical time frame. For example, if potential parking violations are predicted at 7:00 AM or between 7:00 AM and 8:00 AM at both location A and location B but not for relevant location D, which is not between A and B, then the computing system may infer that at 7:00 AM or between 7:00 AM and 8:00 AM location D may potentially be a legal parking location. Essentially, these predictions of potential parking violations may be used to identify parking locations as potentially legal parking location.

In another embodiment of the inventive disclosure, computing system 100 may identify potentially available legal parking locations directly applicable to a user based on previous available legal parking locations including an available legal parking location identical to the intended parking location, including a point in time identical to the present time, or including an available legal parking location identical to the intended parking location corresponding to a point in time identical to the present time. Computing system 100 may also predict by inference whether a location is a potentially available legal parking location based on whether the present time is associated with previous legal parking locations for the user type of the user at the same time, and that same time is within a predetermined time frame. Computing system 100 may also predict by inference if an intended parking location is a potentially available legal parking location based on whether the intended parking location falls between at least two locations with a record of previous legal parking locations for the user type of the user. Computing system 100 can also predict by inference if an intended parking location is potentially available legal parking location applicable based on at least two relevant parking locations corresponding to one parking time, where each of the two relevant parking locations has a record of legal parking for the user type of the user, at least two relevant parking times corresponding to one relevant parking location, where each of the two relevant parking times has a record of legal parking for the user type of the user (e.g., the present time is between the two relevant parking times and the two relevant parking times are within a predetermined time frame, which may be based on a point in time such as a time of day, a time of week, a time of month, or a time of year), and/or at least two relevant parking locations corresponding to at least two relevant parking times. The potentially available legal parking location of the user would be between at least two relevant parking locations at a predetermined distance from each other corresponding to the present time being between at least two relevant parking times within a predetermined time frame. These predictions which are directly applicable or applicable by inference may cause the parking location to be displayed as a potentially available legal parking location.

Figure 17:
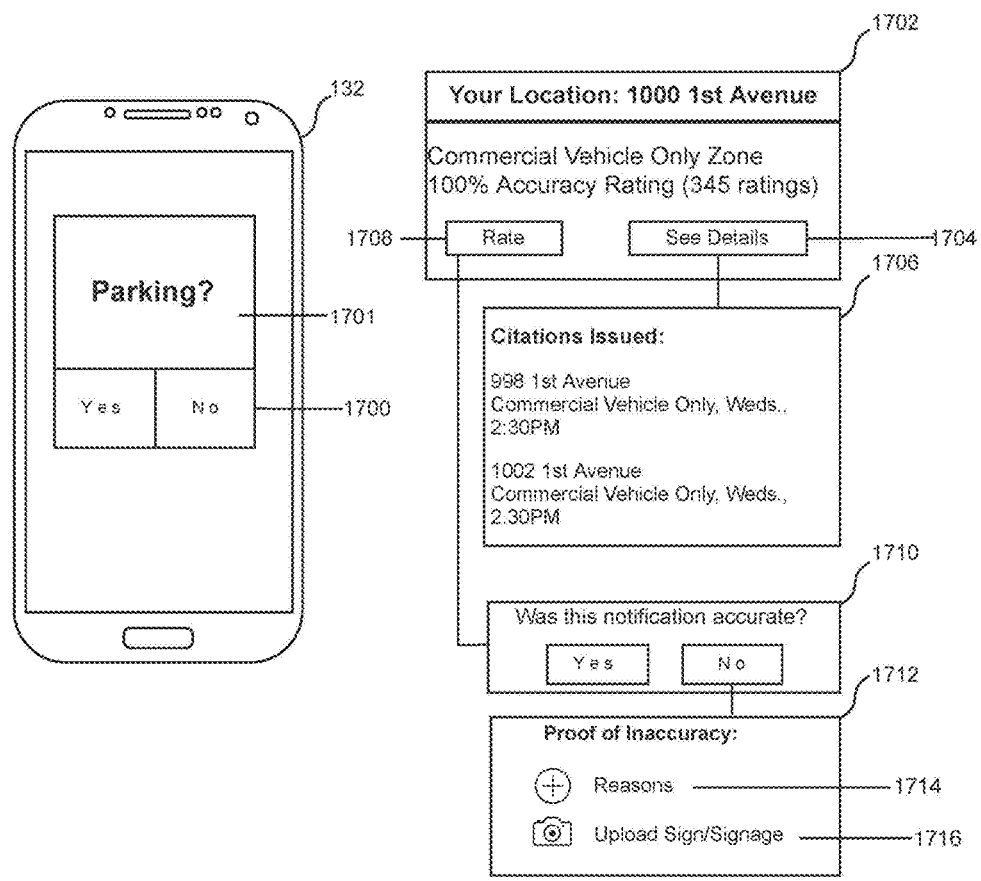
FIG. 17 is a schematic diagram illustrating a user's remote computing device and a notification that a user may receive regarding a potential parking prohibition based on location according to an exemplary embodiment of the inventive disclosure.

Referring next to FIG. 17, shown is a diagram illustrating a user's remote computing device 132 and notification 1802 that a user may receive regarding a potential parking prohibition based on location in accordance with an exemplary embodiment of the inventive disclosure. Once computing system 100 identifies the user's parking intent, it issues prompt 1701 to the user to confirm his/her parking intent on the user's remote computing device 132 by clicking either "yes" or "no" 1700. When the user is parking and has clicked "yes," the system may be prompted to display a notification to the user regarding a parking prohibition 1702 based on the user's current location. Although these windows are not illustrated as being displayed within the user's remote computing device 132, it is to be understood that this depiction is merely for purposes of providing a clear illustration and that these dialog windows would be displayed within the user's remote computing device 132.

In the example shown in FIG. 17, the user's identified location is 1000 1st Avenue. There may be a summary of relevant information, such as what parking rule or regulation applies to the user's intended parking location, which in this case is a prohibition regarding non-commercial vehicles parking in a commercial-vehicle only zone. Also displayed is a comparison of the collected ratings for notification 1702. In this example, the user's notification has been proven to be accurate by 100% of users' ratings. If the user would like to know the reasoning behind this notification, the user may click "See Details" button 1704 to view details relating to why computing system 100 has generated notification 1702. A dialog box containing relevant citations issued 1706 can then be shown to the user. In this example, there are two relevant citations issued on the relevant day of the week at the relevant time, respectively. As shown, both citations were issued to non-commercial vehicle users for parking in a commercial-vehicle only zone. The user can then rate this part of the entire notification and its related information regarding its accuracy by clicking on "Rate" button 1708, which brings up notification rating panel 1710 on the user's computing device 132. This way the user may give a positive rating of "Yes" or a negative rating of "No" to the notification. By giving the negative rating, the system may prompt the user to further submit proof of inaccuracy 1712. In this prompt, the system may ask the user to submit or type in reasons by clicking on button or icon 1714 as to why the notification was inaccurate or submit a picture of signage by clicking on button or icon 1716 in question or a parking violation citation.

Figure 18:
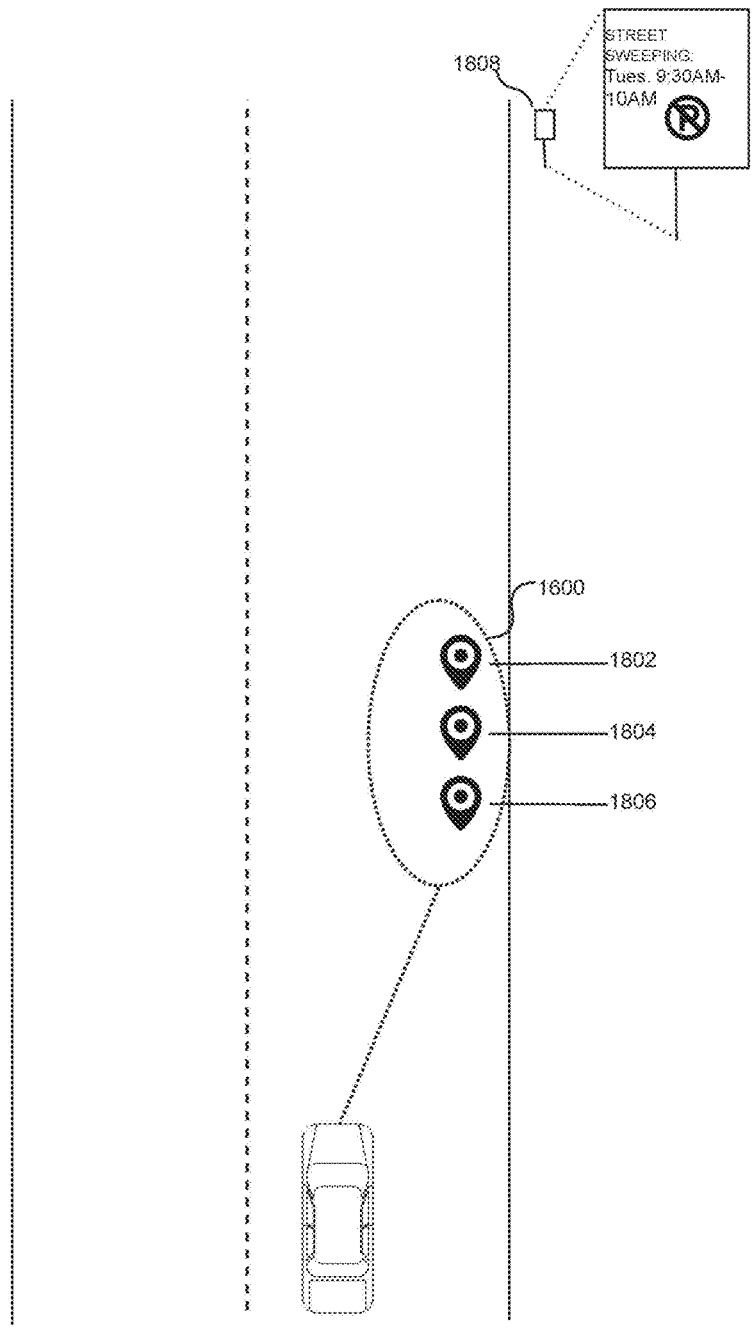
FIG. 18 is a schematic diagram illustrating a system for inferring a potential parking prohibition based on time according to an exemplary embodiment of the inventive disclosure.

Another inference scenario may be seen in FIG. 18, which shows a diagram illustrating a system for inferring a potential parking prohibition based on time in accordance with an exemplary embodiment of the inventive disclosure. Here, computing system 100 may infer a parking prohibition based on time at the user's intended parking location 1600 to preclude that parking location from having potentially available legal parking locations. If the present time is associated with one or more parking violation citations 1802/1804/1806 within a predetermined time frame, which all relate to the same parking prohibition identified on sign 1808, computing system 100 may infer that the user may receive a parking violation citation at that intended parking location 1600 and at the present time, and therefore preclude that parking location as illegal parking location for that user at that present time.

The predetermined time frame may be predetermined based on applicable RRLC, or the predetermined time frame may be a time frame that is based on the time of issuance of a parking violation citation. This time frame may also be a time frame such as one, two, or three hours, or a larger time frame such as ten hours or any other duration depending on relevant factors, such as a prohibition for street cleaning which applies for an hour and a half.

For example, a possible parking prohibition may be no parking between 9 AM and 5 PM, where the time frame may be an eight-hour time frame. Database 106 may have a record of a parking violation citation received by a vehicle parked at Location A at 9:13 AM, where the known RRLC is a parking prohibition due to street cleaning which applies from 9:00 AM-10:30 AM. The time frame in this scenario may be predetermined to be an hour and a half based on the duration of the street cleaning prohibition. Computing system 100 may analyze the parking violation citation to infer that the same or different vehicle parked at Location A may receive a parking violation citation if they park at 9:51 AM, because 9:51 AM is within the predetermined time frame. In another scenario, the database 106 has a record of a parking violation citation at Location K at 7:15 PM. A notification may be issued to a user who intends to park at Location K at 7:21 PM where Location K is precluded from being identified as a potentially available legal parking location, because 7:21 PM falls within the same half-hour time frame as the parking violation citation.

A time frame may be applicable to several situations: for example, "No Standing Anytime" where the time frame would need to indicate 24 hours, so any user whose geolocation data shows a location that is in a No Standing Anytime zone may receive a notification at any time. Time frame data may also be applicable to alternate-side parking, for streets that do not allow parking during certain times due to government street cleaning services, which for example is usually applicable for half an hour (e.g., 9:00 AM-9:30 AM) or temporary tow zones notices, which for example, are usually applicable for a day or a few days. The database 106 may connect with computing device 132 to send an automatic notification, reminding the user to move a vehicle due to street cleaning rules.

Computing system 100 may also infer a parking prohibition based on time by analyzing similar times on different days of the week. If the times are at the same time every day, or at the same time on the same day, the computing system 100 may infer that there may be a parking prohibition at that time on that day, or that time every day. For example, a vehicle at Location B at 9:30 AM on Tuesday receives a parking violation citation. The same or different vehicle at Location B at 9:30 AM on Wednesday receives a parking violation citation. The same or different vehicle at Location B at 9:30 AM on Thursday receives a parking violation citation. The computing system 100 may analyze these parking violation citations to infer that the same or different vehicle parked at Location B at 9:30 AM on a Friday may most likely receive a parking violation citation. In another example, a vehicle at Location C at 9:30 AM on Tuesday, September 1st receives a parking violation citation. The same or different vehicle at Location C at 9:30 AM on Tuesday, September 8th receives a parking violation citation. Computing system 100 may analyze these parking violation citations to infer that the same or different vehicle parked at Location C at 9:30 AM on Tuesday, September 15th may receive a parking violation citation. One of ordinary skill in the art may appreciate that a notification based on an inference may not be completely accurate, as implied by the word "infer." However, it is also to be understood that a notification may be corrected, updated, supplemented, or otherwise modified by ratings from users. A notification containing legal parking related data that is based on inference is valuable for a user because it may be sent to a user even when there may not be much information available; in this manner, a user may be given reasonably accurate information in situations with potentially little data regarding legal parking.

Figure 19:
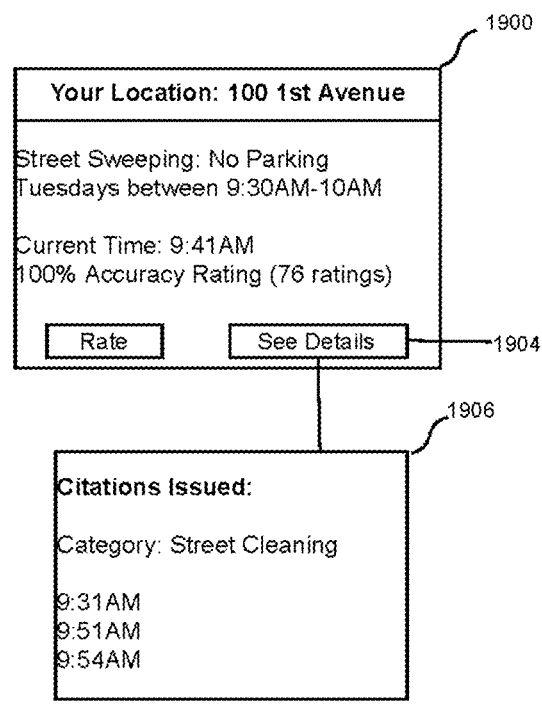
FIG. 19 illustrates a notification that a user may receive on the user's remote computing device regarding a potential parking prohibition based on time according to an exemplary embodiment of the inventive disclosure.

Further to the example provided in FIG. 18, FIG. 19 shows a diagram illustrating an example of notification 1900 that a user may receive regarding potential parking prohibition based on time in accordance with an exemplary embodiment of the inventive disclosure. Based on the user's intended parking location 1600 and the parking violation related data associated with the user's location, 100 1st Avenue, and current time and day, Tuesday, 9:41 AM, the computing system 100 might issue a notification to advise the user against parking at an intended parking location 1600 because, according to the data in database 106, no parking is permitted between 9:30 AM and LOAM due to street cleaning. If the user is curious about the details of this notification, "See Details" button 1904 is available to click. When the user clicks on the button, the user is taken to a details panel that displays the relevant citations issued 1906. In this depiction, the category of applicable citations is street cleaning, which is also the reason for these citations' issuance. Also displayed are the relevant times of when those citations were issued, and since database 106 contains a record of parking citations issued at 9:31 AM, 9:51 AM and 9:54 AM, and the current time is 9:41 AM, the system may infer that the user may potentially receive a parking violation citation at the user's intended parking location 1600 at this current time.

Figure 20:
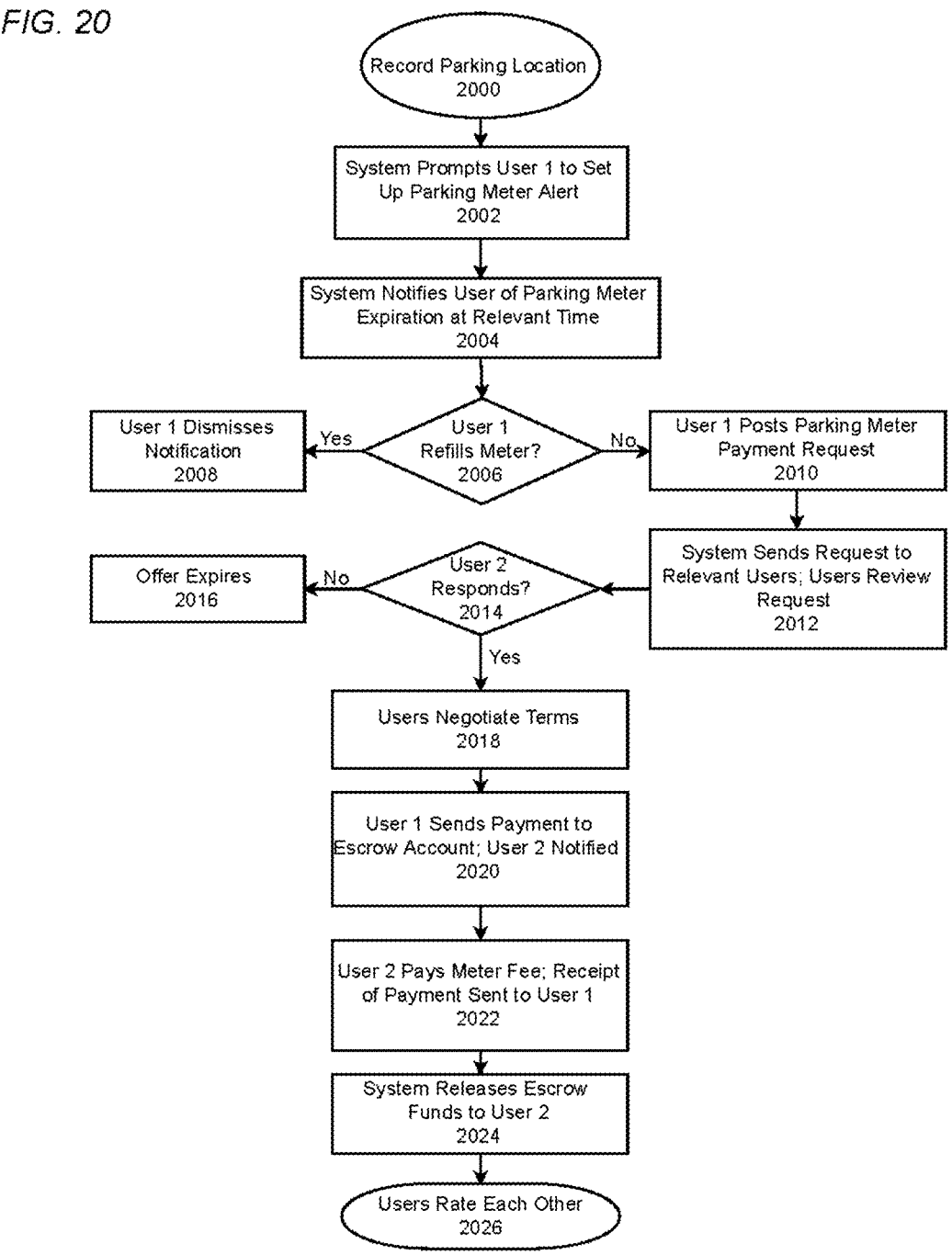
FIG. 20 is a flowchart illustrating an approach for a user to post a request for providing an expiring parking meter payment according to an exemplary embodiment of the inventive disclosure.

The system may also allow a user to post a request or demand for refilling an expiring parking meter, in accordance with an exemplary embodiment of the inventive disclosure, as depicted in the flowchart of FIG. 20. When User 1 arrives at a parking space, the location and relevant prohibitions or conditions relating to enforceability of the parking space may be recorded (Step 2000), where User 1 can be guided by computing system 100 to set up an alert when a meter is to expire (Step 2002). Computing system 100 may send a notification to a user's computing device 132 (Step 2004) to remind the user about the approaching parking meter expiration. Optionally, the system may automatically detect the parking time limit during which the parking meter is in effect (e.g., where the meter is only in effect from 4:00 pm to 10:00 pm, and the present time is approaching 10:00 pm) is approaching its expiration so as to inform the user whether or not there is a need to refill the meter. In other words, in response to determining that the parking meter associated with the parking space requires refilling, i.e. payment of a parking meter fee for the parking space, at the expiration of a certain time, the system can be configured to notify the first user of the approaching expiration time. The location of the parking meter and the expenses required for a time extension can be sent to User 1 through SMS, phone call, email, etc., and the user can decide to refill the meter by himself/herself (Decision 2006). The User 1 can extend the time remaining on the parking meter by refilling the parking meter by himself/herself and dismiss the notification (Step 2008).

A user may be able to pay a parking meter fee from his/her remote computing device 132 if the fee can be paid online or otherwise from remote computing device 132. If the User 1 cannot refill the parking meter, then User 1 may seek the assistance of another user to help in refilling the parking meter (e.g., an assistance request) by posting a parking meter payment request (Step 2010), which is sent to relevant users, who review the request (Step 2012). A parking meter payment request can include the fee of the parking meter and the service fee that the User 1 offers. User 1 waits for a User 2 to respond to the request (Decision 2014). If no user responds within a certain (e.g., a predetermined) amount of time, the offer expires (Step 2016). Upon receipt of the request, users can then choose to accept, reject, or counteroffer the request by proposing a different service fee in response to the request by the User 1. For example, if a user realizes that the parking meter is running out of time and cannot refill the meter for reasons out of the user's control, the user may use remote computing device 132 to send out a message to other users within a certain distance of the location of the parked vehicle, which may have been recorded when the user parked, with information on the monetary offer, such as, "I will pay $5.00 if you can refill my parking meter, which is $3.00 for the parking fee and a $2.00 service charge." The location of the vehicle may be sent with the message, which was recorded by computing system 100 when the user parked. Other users can see the message and decide to either accept the terms or make a counteroffer having a different amount and/or different terms (e.g., "I will refill your parking meter for $6.00 which is a $3.00 parking fee and a $3.00 service charge") or choose not to respond to the message. A User 2 who accepts the offer first may be allowed to complete the transaction by negotiating the terms (Step 2018). Once the users reach a deal, the request may be taken down and other users may be disqualified, i.e. the parking meter payment request is no longer available to other users once the User 1 and a User 2 have reached an agreement. Both users may communicate by using internal communication functions including but not limited to, live-chat, messaging, and any other form of communication. Once the terms are offered and accepted, User 1 sends payment to an escrow account, and User 2 is notified of this (Step 2020). After User 2 is notified of the present funds, User 2 can pay the meter fee; when User 2 pays, User 2 sends proof of payment (e.g., a receipt, a window sticker, a picture of the meter with extended time, etc.) and User 1 is notified (Step 2022). There may be confirmation of the received payment, and the system releases the funds from escrow to user 2 (Step 2024). For certain parking meters, evidence of payment into the meter may have to be displayed in or on the vehicle parked in the parking space. In such cases, the method and system may first determine whether the parking meter associated with the parking space requires display of the payment evidence or the confirmation of the payment on the vehicle. If so, the second user will be notified that he/she should display the payment evidence or the confirmation of the payment on the vehicle and transmit proof that the payment evidence or confirmation of the payment has been displayed on the vehicle (by sending a photo, video, or any other means of image capturing) in order for the user to release the funds from escrow. Upon completion of the transaction, the users may optionally rate each other (Step 2026).

In such an embodiment, the parking meter data in the databases is received from users through user engagement panels 134. The parking meter data may include a location of the parking meter, cost of parking at a parking meter, the start time of the parking meter, and the end time of the parking meter. Furthermore, through user engagement panel 134, users will also be able to indicate whether a meter has stopped functioning or is "out of order," to improve government response time in fixing defective meters as well as alert other users of the potential difficulty.

Figure 21:
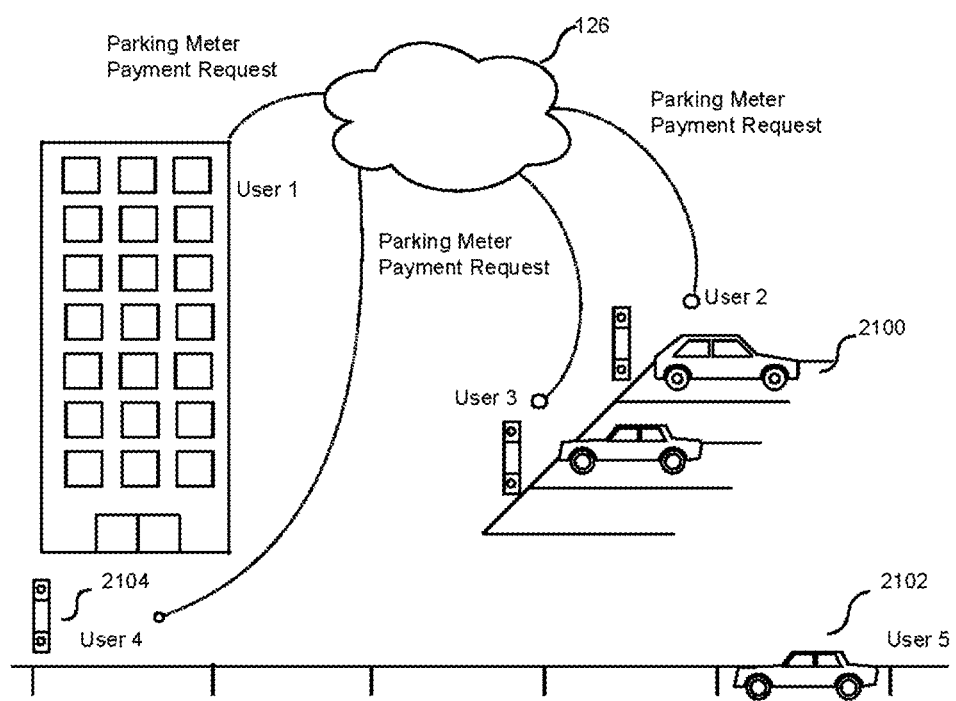
FIG. 21 is a schematic diagram illustrating an approach for a parking meter payment assistance system through a user's request to have an expiring parking meter payment be made by another according to exemplary embodiments of the inventive disclosure.

As seen in FIG. 21, a user may send a request through the system to other users regarding a demand for providing an expiring parking meter payment in accordance with an exemplary embodiment of the inventive disclosure. Here, a User 1 remotely sends a parking meter payment request through a network such as wide-area network 126 to User 2 and User 3. Users 2 and 3 are close to the User 1's parking location 2100. User 1 can negotiate with either of User 2 or User 3 to have the parking meter refilled without having to leave his/her current location (e.g., in his apartment or office), and the other users can be given information about the location of User 1's vehicle and/or the expiring parking meter as recorded by the system. A "user" as described herein does not necessarily have to be a driver or in a vehicle a user could be, for example, a pedestrian or a bicyclist and still refill another user's meter. In certain embodiments, User 1 may have parked his/her vehicle in parked vehicle location or parking space 2102, remote from parking meter station 2104 associated with parking space 2102. In such a scenario, User 1 may remotely send a parking meter payment request through a network such as wide-area network 126 to User 4 and User 5. As shown, User 4 may be close to parking meter station 2104 while User 5 may be close to parking space 2102 where User 1's vehicle is parked. The system may detect that User 4 is closer to parking meter station 2104 and transmit this information to User 1. Based on User 4 being within a certain predetermined distance of parking meter station 2104, and not the vehicle parked in parked vehicle location 2202, User 1 may opt for User 4 to replenish or refill the expiring parking meter, for example, in the manner described with respect to FIG. 20. The system may determine the distance of each potential user from both the parked vehicle and from the parking meter in order to determine whether to send the request to the potential user in accordance with preset distances or rules, and in order to be able to provide the user making the request with this information.

Figure 22:
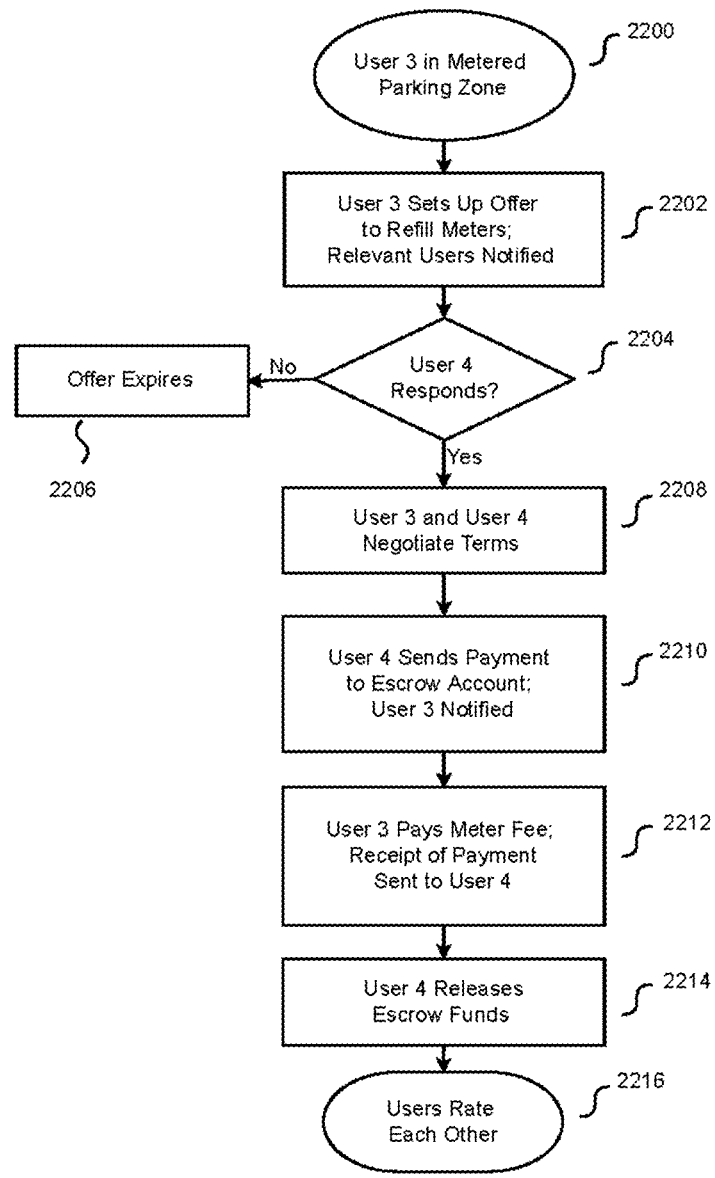
FIG. 22 is a flowchart illustrating a methodology for a user to post an offer to refill an expiring parking meter according to exemplary embodiments of the inventive disclosure.

As seen in the flowchart illustration of FIG. 22, the system offers an approach for a user to post an offer to refill an expiring parking meter, in accordance with an exemplary embodiment of the inventive disclosure. A user, for example User 3, who is in a metered parking zone with parked vehicles (Step 2200), may also offer to help refill parking meters which may be approaching expiration for a fee by making an offer to other users whose parked vehicles are within a certain radius of User 3's current location. User 3 may post an offer such as an offer to refill meters as a message through the system that may include the amount User 3 would like to receive as a service charge (Step 2202). This service charge may be negotiable. Additionally, the Administrator may hire employees to use this method to send out messages with offers to help refill parking meters for a fee. User 3 may wait or remain in the area until a User 4 responds (Decision 2204). If no user responds, the offer might expire (Step 2206). If a User 4 responds (Decision 2204), Users 3 and 4 negotiate the terms (Step 2208). The User 4 may put the total amount of money in an escrow account (Step 2210) created by the system or has the option of transferring funds directly to User 3. The User 3 may receive notification regarding the deposit of funds in escrow and may then replenish the parking meter after receiving the location of the vehicle and/or of the relevant parking meter (Step 2212). Once refilled, User 3 provides proof of payment in the form of an accurate photograph that may include the vehicle plate number, filled meter, and/or receipt of payment as evidence. Once the photograph is uploaded into the mobile application, the User 4 may verify the photograph, the payment may be confirmed, and the system may release the payment placed in escrow (Step 2214), which may be credited to the User 3's account. This method incentivizes both users to participate because the User 4 may avoid receiving an expired meter violation ticket and User 3 may earn extra money through the service charge. There may also be a dispute resolution function incorporated to resolve any disputes between users. Both users may rate each other upon completing the transaction (Step 2216).

Figure 23:
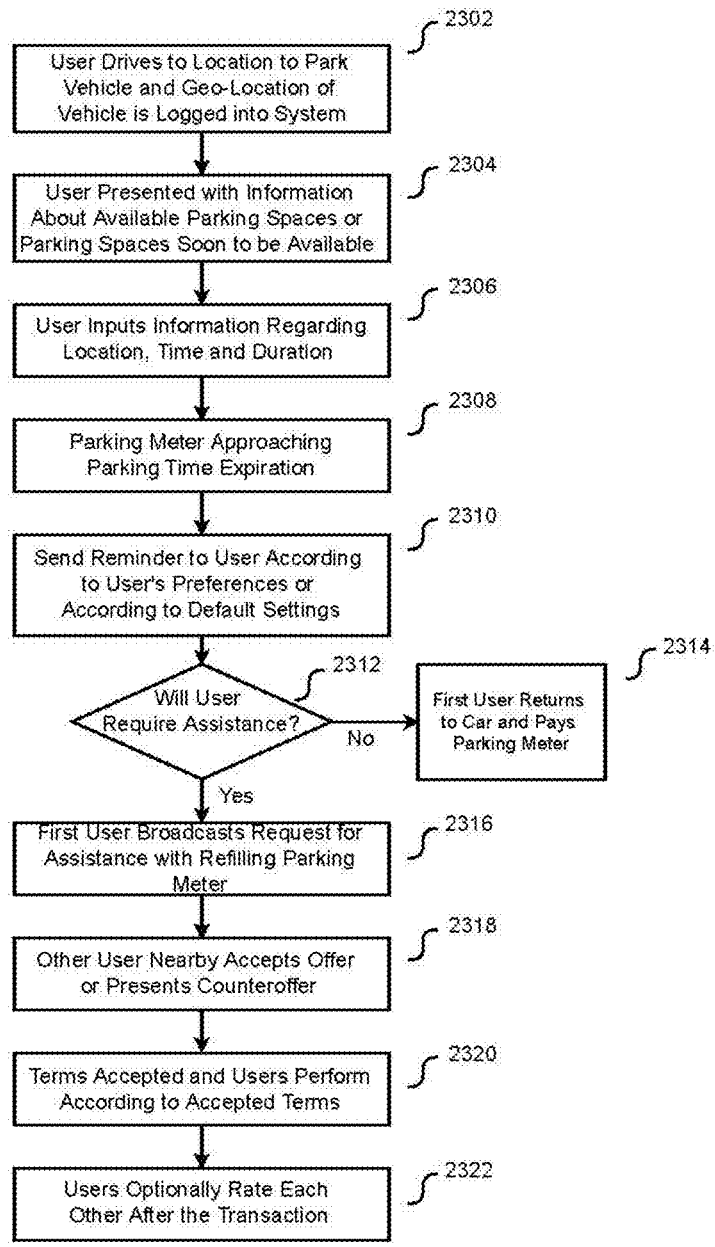
FIG. 23 is a flowchart illustrating a methodology for a user to request assistance with refilling an expiring parking meter according to exemplary embodiments of the inventive disclosure.

As seen in the flowchart illustration of FIG. 23, the system also offers an approach for a parking meter payment assistance system configured to both assist a user in finding available parking spaces at his/her intended location and to refill a parking meter associated with a location where the user parks his/her vehicle. With respect to FIG. 23, the first user may press a button on the display of the mobile device to log the location of his/her vehicle (Step 2302). After the location of the first user's vehicle has been logged, the system may then identify available parking spaces that other nearby users have input into the system (Step 2304). Once the first user is parked, he/she can then input information regarding the location and/or the expiration time of a parking meter (Step 2306). Additionally, the first user can set the number of reminders he/she desires, the specific intervals at which the reminder alerts should be sent, and/or how much time in advance of the expiration time of the parking meter to send the alert. Alternatively, the system may automatically detect the location and time expiration of the parking meter. Once the system detects that the parking meter is approaching expiration (Step 2308), the first user will receive a notification from the system based on the user's preferences or according to default settings (Step 2310).

The system will then inquire whether the user can refill the meter by himself/herself or whether the user requires or desires assistance from another user for this (Step 2312). If the user is able to refill the meter personally (No, Step 2312), then the first user may turn off the alert and refill the parking meter himself/herself before expiration (Step 2314). If the first user requires or desires assistance to refill the meter (Yes, Step 2312), then the first user can broadcast a request for assistance to other users (Step 2316) within a certain distance of the parked vehicle or the parking meter associated with the parked vehicle to seek assistance with refilling the parking meter. The request is sent through the central server and the system will compare the location with other users nearby and send the request for only the nearby users to view. The request may contain information such as the amount of time to be added as well as the cost for such amount of time to refill the meter, a preferred second user's service fee, the time it may take for the second user to travel to the location of the first user's parked vehicle location, the time remaining until meter expiration, etc. One or more nearby users may either accept the first user's request/offer or may present a counteroffer (Step 2318) (e.g., to include a higher service fee). If a nearby user responds, the first user and the nearby user may negotiate the payment details and terms until an agreement is reached. Once the agreement has been reached, then both users must perform according to the terms as agreed upon (Step 2320). The two users may then have the option to rate each other after completion of the transaction (Step 2322).

Figure 24:
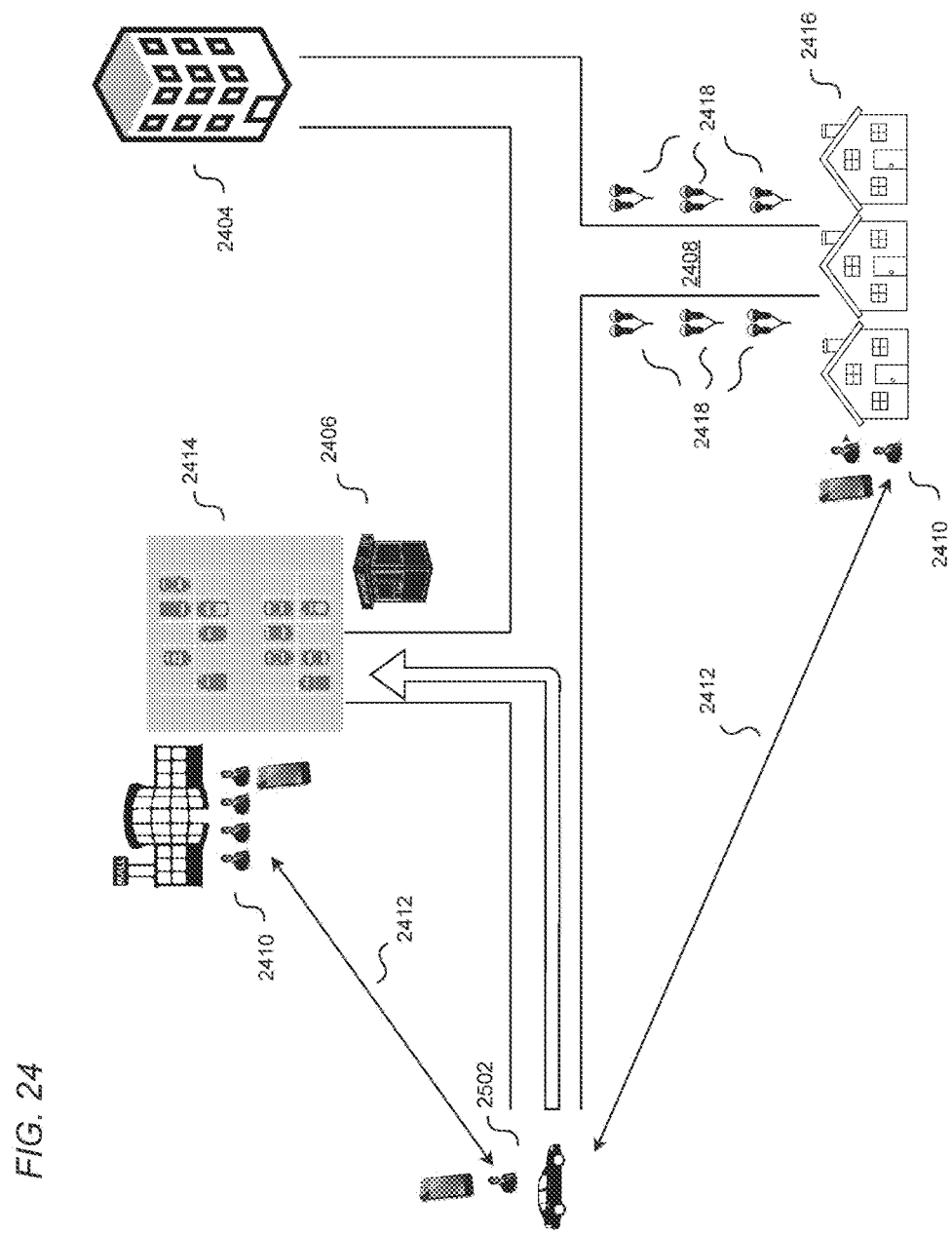
FIG. 24 is a schematic diagram illustrating a user who is approaching a location for parking sending a request through the system to other users for assistance with finding available legal parking, and further illustrating a user sending a request through the system to other users for assistance with refilling an expiring parking meter according to exemplary embodiments of the inventive disclosure.

As illustrated in FIG. 24, shown is first user 2402 approaching a desired destination where, in advance of arriving at the destination, he/she may inquire whether there are any available legal parking spaces. With respect to FIG. 24, first user 2402 intends to approach a certain destination, in this case, apartment building 2404, and uses the application to log his/her for the first user's current location. First user 2402 can then broadcast a message 2412 through the system which is sent to one or more nearby users 2410 who may be offering a parking space. The acceptable number of users nearby may be preset and/or adjusted within the first user's preferences. In broadcast message 2412, first user 2402 can opt to include the duration of time that he/she plans to park, the type of vehicle he/she needs to park, a service fee which may be negotiable or not, etc. In the embodiment shown, there may be two locations within an acceptable predetermined distance of destination location 2404 with available parking spaces, a municipal parking lot 2414 having, for example, central electronic parking meter station 2406, and street parking 2408, for example, in residential area 2416 having single space parking meters 2418. If there is a parking space available, a second user may choose to respond to the first user's request and accept the offer. First user 2402 is then provided with the location of the available parking space remotely on his/her remote computing device, and then first user 2402 drives to the provided location of the parking space.

Upon parking, first user 2402 will fill the parking meter for a desired amount of time and then go about his/her business. When the parking meter approaches expiration, first user 2402 may receive a notification that the meter is close to expiring so as to give him/her sufficient time to return to and leave the parking space or to refill or replenish the parking meter. Should first user 2402 require assistance in refilling the meter, another broadcast message may be sent out to nearby other users 2410. One or more of nearby users 2410 may choose to accept or reject the first user's request after viewing it. Once a second user accepts the first user's request, a channel of communication is opened between them so as to complete the transaction, as discussed in greater detail with respect to FIGS. 20-21. Additionally, if the first user's initial broadcast states that the service fees are negotiable, then the second user may make a counteroffer for the service fee, whereby a negotiation ensues between the users until an agreement has been reached.

Parking spaces are often spaces with limitations related to the size of the vehicle. When offering and demanding parking spaces in general, users may indicate the type of vehicle they are currently driving or the type of vehicle that is currently parked in the space. The system may then compare the relative sizes of the vehicles to determine if the vehicle a user is driving may fit in the parking space. In some exemplary embodiments, the dimensions of the parking space may be entered in or retrieved from the database 106. There may be three applicable categories, for example, bigger vehicles, same-size vehicles, and smaller vehicles. A parking space occupied by a user with a certain sized vehicle may only allow another user with the same vehicle category or a smaller vehicle category. For example, a user's parked four-door sedan may be classified as a regular type vehicle or a compact vehicle. Another user driving a large pickup may not be allowed to park in the user's space because a pickup may be categorized as a bigger vehicle, which may be too large to fit in a compact vehicle space, where only same-size vehicles or smaller vehicles may park in the space.

It is to be understood that the phraseology or terminology employed herein is for purposes of description and not of limitation. Having described at least one of the preferred embodiments of the inventive disclosure with reference to the accompanying drawings, it is to be understood that such embodiments are merely exemplary and that the invention is not limited to those precise embodiments, and that various changes, modifications, and adaptations may be affected therein by one skilled in the art without departing from the scope or spirit of the invention as defined in the appended claims. Therefore, while the embodiments herein have been described in terms of preferred embodiments, those skilled in the art will recognize that the embodiments herein can be practiced with modification within the spirit and scope of the claims. Any exemplary embodiments described herein are merely illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims. The scope of the invention, therefore, shall be defined solely by the following claims. Further, it will be apparent to those of skill in the art that numerous changes may be made in such details without departing from the spirit and the principles of the invention.

What is claimed is:

1. A computer-implemented method for seeking assistance with timely refilling a parking meter, comprising:
receiving data indicating that a vehicle of a first user is parked in a parking space associated with a parking meter;
storing the data in a database;
receiving parking meter time limit information for the parking meter;
identifying an expiration time at which the parking meter time limit expires;
notifying the first user of the expiration time of the parking meter during a predetermined time period prior to the expiration time;
transmitting a request from the first user to one or more additional users for assistance with refilling the parking meter;
identifying an acceptance of the request by a second user selected from the one or more additional users; and
transmitting the acceptance of the request from the second user to the first user.

2. The method according to claim 1, wherein the one or more additional users are located within a first predetermined distance of the parking space or within a second predetermined distance of a parking meter location corresponding to the parking space.

3. The method according to claim 1, further comprising:
storing a period of time the parked vehicle has been parked in the parking space; and
computing cost information associated with extending a remaining amount of time on the parking meter.

4. The method according to claim 1, further comprising:
transmitting information associated with the parked vehicle of the first user to the one or more additional users over a plurality of mobile devices associated with the one or more additional users, the information including at least one of the parking space, a parking meter location, or an estimated distance or travel time to the parked vehicle or the parking meter associated with the parked vehicle.

5. The method according to claim 4, wherein the information further includes an amount to be paid to the parking meter, a proposed service fee for the second user, or vehicle details comprising at least one of a plate number, a color of the parked vehicle, or a photo of the vehicle.

6. The method according to claim 5, further comprising:
enabling the first user to negotiate the proposed service fee with one or more of the one or more additional users, wherein the acceptance of the request includes the negotiated service fee.

7. The method according to claim 1, further comprising:
establishing an escrow account for the user to deposit payment for the refilling of the parking meter;
notifying the second user of the deposit payment in the escrow account;
receiving information from the second user indicative of proof of the refilling of the parking meter; and
transmit the deposit payment from the escrow account to the second user.

8. A computer-implemented method for seeking assistance with timely refilling a parking meter, comprising:
receiving data indicating that a vehicle of a first user is parked in a parking space associated with a parking meter;
storing the data in a database, wherein the data includes a location of the parking meter associated with the parking space and a location of the vehicle parked in the parking space;
receiving parking meter time limit information for the parking meter;
identifying an expiration time at which the parking meter time limit expires;
determining whether the parking meter associated with the parking space requires refilling at the expiration time;
in response to determining that the parking meter associated with the parking space requires refilling at the expiration time, notifying the first user of the expiration time of the parking meter during a predetermined time period prior to the expiration time;
transmitting a request from the first user to one or more additional users for assistance with refilling the parking meter;
identifying an acceptance of the request by a second user selected from the one or more additional users; and
transmitting the acceptance of the request from the second user to the first user.

9. The method according to claim 8, wherein the one or more additional users are located within a first predetermined distance of the parking meter location corresponding to the parking space or within a second predetermined distance from the parked vehicle.

10. The method according to claim 8, further comprising:
transferring into an escrow account an amount to be paid to refill the parking meter and a negotiated service fee;
receiving, from the second user, proof of payment of refilling the parking meter; and
transmitting, by the second user, the proof of payment of refilling the parking meter to a mobile device of the first user.

11. The method according to claim 10, further comprising:
transferring the negotiated service fee and the amount to be paid to the parking meter from the escrow account to an account of the secondary user.

12. The method according to claim 10, further comprising:
determining whether the parking meter associated with the parking space requires proof of payment for the parking space to be displayed on the vehicle;
notifying the second user to display the proof of payment on the vehicle; and
transmitting, by the second user, evidence that the proof of payment is displayed on the vehicle.

13. The method according to claim 8, further comprising:
enabling the first user to set a first time at which the parking meter will expire and a second time at which to transmit to the first user a reminder of the first time.

14. The method according to claim 8, further comprising:
enabling communication between the first user and the one or more additional users to negotiate terms for refilling the parking meter, wherein the communication is at least one of live-chat, messaging, or any other form of communication over a mobile application.

15. A computer-implemented system for seeking assistance with timely refilling a parking meter, the system comprising:
at least one server;
a database for storing parking meter data;
a plurality of remote computing devices associated with a plurality of users in connection with a communication network;
at least one non-transitory computer-readable storage medium for storing computer-readable instructions, wherein the at least one non-transitory computer-readable storage medium is in connection with the communication network and resides on the at least one server; and
at least one processor for executing the computer-readable instructions to:
receive data indicative of a vehicle associated with a first user being parked in a parking space;
store the data associated with the parking space in a database;
receive parking meter time limit information for a parking meter associated with the parking space;
identify an expiration time at which the parking meter time limit expires;
determine whether the parking meter associated with the parking space requires refilling at the expiration time;
in response to determining that the parking meter associated with the parking space requires refilling at the expiration time, notify the first user of the expiration time of the parking meter during a predetermined time period prior to the expiration time;
transmit a request from the first user to one or more additional users for assistance with refilling the parking meter;
identify an acceptance of the request by a second user selected from the one or more additional users;
transmit the acceptance of the request from the second user to the first user;
establish an escrow account for the user to deposit payment for the refilling of the parking meter;
notify the second user of the deposit payment in the escrow account;
receive information from the second user indicative of proof of the refilling of the parking meter; and
transmit the deposit payment from the escrow account to the second user.

16. The system according to claim 15, wherein the one or more additional users are located within a first predetermined distance of the parking space or within a second predetermined distance of the parking meter location corresponding to the parking space.

17. The system according to claim 15, wherein the request comprises an amount of time to be added to the parking meter, a location of the parking space, the parking meter location, and a proposed service fee, and wherein the at least one processor further executes the computer-readable instructions to:
store a period of time the parked vehicle has been parked in the parking space; and
computing a cost associated with extending a remaining amount of time on the parking meter by the amount of time to be added.

18. The system according to claim 15, wherein the at least one processor further executes the computer-readable instructions to:
transmit information associated with the parked vehicle of the first user to the one or more additional users over the plurality of remote computing devices, the information including the location of the parking space or the parking meter location associated with the parked vehicle, and an estimated distance or travel time to the parking space or the parking meter location associated with the parked vehicle.

19. The system according to claim 15, wherein the information further includes an amount to be paid to the parking meter, a proposed service fee for the second user, or vehicle details comprising at least one of a plate number, a color of the parked vehicle, or a photo of the vehicle.

20. The system according to claim 15, wherein the at least one processor further executes the computer-readable instructions to:
receive a counter-offer from the one or more additional users to a proposed service fee offered by the first user for the assistance with refilling the parking meter; and
enable the first user to negotiate the proposed service fee with the one or more additional users, wherein the acceptance of the request includes the negotiated service fee.

* * * * *